(12) United States Patent
Wippermann et al.

(10) Patent No.: US 10,996,460 B2
(45) Date of Patent: May 4, 2021

(54) MULTI-APERTURE IMAGING DEVICE, IMAGING SYSTEM AND METHOD OF PROVIDING A MULTI-APERTURE IMAGING DEVICE

(71) Applicant: Fraunhofer-Gesellschaft zur Förderung der angewandten Forschung e.V., Munich (DE)

(72) Inventors: Frank Wippermann, Meiningen (DE); Jacques Duparré, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/590,935

(22) Filed: Oct. 2, 2019

(65) Prior Publication Data

US 2020/0033588 A1    Jan. 30, 2020

Related U.S. Application Data

(63) Continuation of application No. PCT/EP2018/059443, filed on Apr. 12, 2018.

(30) Foreign Application Priority Data

Apr. 13, 2017    (DE) .................... 10 2017 206 429.3

(51) Int. Cl.
*G02B 26/08* (2006.01)
*H04N 5/232* (2006.01)
(Continued)

(52) U.S. Cl.
CPC ....... *G02B 26/0816* (2013.01); *G02B 27/646* (2013.01); *H04N 5/2253* (2013.01);
(Continued)

(58) Field of Classification Search
CPC .............. G02B 26/0816; G02B 27/646; G02B 13/001; G02B 13/0065; H04N 5/2253;
(Continued)

(56) References Cited

U.S. PATENT DOCUMENTS

| | | | |
|---|---|---|---|
| 8,953,052 | B2 | 2/2015 | Kusaka |
| 9,232,138 | B1 | 1/2016 | Baldwin |

(Continued)

FOREIGN PATENT DOCUMENTS

| | | |
|---|---|---|
| CN | 104782113 A | 7/2015 |
| CN | 104935790 A | 9/2015 |

(Continued)

OTHER PUBLICATIONS

Korean Office Action of patent application No. 10-2019-7033500, dated Aug. 5, 2020.

(Continued)

*Primary Examiner* — Abdelaaziz Tissire
(74) *Attorney, Agent, or Firm* — McClure, Qualey & Rodack, LLP

(57) ABSTRACT

A multi-aperture imaging device includes an image sensor and array of optical channels, wherein each optical channel includes optics for projecting at least one partial field of view of a total field of view on an image sensor area of the image sensor. The multi-aperture imaging device includes a beam deflector for deflecting an optical path of the optical channels. A first optical channel of the array is configured to image a first partial field of view of a first total field of view, wherein a second optical channel of the array is configured to image a second partial field of view of the first total field of view. A third optical channel is configured to completely image a second total field of view. The second total field of view is an incomplete section of the first total field of view.

66 Claims, 31 Drawing Sheets

(51) Int. Cl.
*H04N 5/225* (2006.01)
*G02B 27/64* (2006.01)

(52) U.S. Cl.
CPC ......... *H04N 5/2254* (2013.01); *H04N 5/2259* (2013.01); *H04N 5/23238* (2013.01); *H04N 5/23254* (2013.01); *H04N 5/23287* (2013.01)

(58) Field of Classification Search
CPC ............... H04N 5/2254; H04N 5/2259; H04N 5/23238; H04N 5/23254; H04N 5/23287; H04N 5/2328; H04N 5/23258; H04N 5/23283; H04N 5/23248; H04N 5/2258
See application file for complete search history.

(56) References Cited

U.S. PATENT DOCUMENTS

| | | | |
|---|---|---|---|
| 9,232,140 B2 | 1/2016 | Saitwal et al. | |
| 9,591,241 B2 | 3/2017 | Konno et al. | |
| 10,291,852 B2 | 5/2019 | Wippermann et al. | |
| 10,425,567 B2 | 9/2019 | Wipperman et al. | |
| 10,560,617 B2 | 2/2020 | Wippermann et al. | |
| 2008/0018779 A1* | 1/2008 | Gomi | H04N 5/247 348/369 |
| 2008/0030592 A1 | 2/2008 | Border et al. | |
| 2008/0158371 A1 | 7/2008 | Trescott | |
| 2009/0122195 A1 | 5/2009 | van Baar et al. | |
| 2010/0271511 A1 | 10/2010 | Ma et al. | |
| 2010/0328471 A1* | 12/2010 | Boland | G03B 19/023 348/207.99 |
| 2011/0157381 A1 | 6/2011 | Miyasako | |
| 2012/0075489 A1* | 3/2012 | Nishihara | H04N 5/23296 348/222.1 |
| 2012/0098971 A1 | 4/2012 | Hansen et al. | |
| 2013/0010258 A1 | 1/2013 | Utagawa | |
| 2013/0033577 A1 | 2/2013 | Lo | |
| 2013/0210563 A1 | 8/2013 | Hollinger | |
| 2014/0002674 A1* | 1/2014 | Duparre | G02B 7/005 348/187 |
| 2014/0002679 A1 | 1/2014 | Ikeda | |
| 2014/0111650 A1 | 4/2014 | Georgiev et al. | |
| 2014/0160231 A1 | 6/2014 | Middleton et al. | |
| 2014/0340543 A1 | 11/2014 | Nakada et al. | |
| 2015/0085174 A1 | 3/2015 | Shabtay et al. | |
| 2015/0109468 A1 | 4/2015 | Laroia | |
| 2015/0237257 A1 | 8/2015 | Kang | |
| 2015/0268450 A1 | 9/2015 | Ueno et al. | |
| 2015/0286033 A1 | 10/2015 | Osborne | |
| 2015/0293328 A1 | 10/2015 | Laroia | |
| 2015/0365604 A1 | 12/2015 | Griffith et al. | |
| 2016/0173869 A1 | 6/2016 | Wang et al. | |
| 2016/0205380 A1 | 7/2016 | Inoue et al. | |
| 2016/0255330 A1* | 9/2016 | Wippermann | H04N 13/218 348/49 |
| 2016/0360111 A1 | 12/2016 | Thivent et al. | |
| 2017/0118388 A1* | 4/2017 | Wippermann | G03B 17/17 |
| 2017/0264825 A1 | 9/2017 | Wippermann et al. | |
| 2017/0374253 A1* | 12/2017 | Cahall | H04N 5/247 |
| 2018/0024329 A1* | 1/2018 | Goldenberg | G02B 7/08 359/557 |
| 2018/0152624 A1* | 5/2018 | Li | H04N 5/2628 |
| 2018/0172945 A1 | 6/2018 | Wippermann et al. | |
| 2018/0176437 A1 | 6/2018 | Wippermann et al. | |
| 2018/0176471 A1 | 6/2018 | Wippermann et al. | |
| 2018/0176472 A1 | 6/2018 | Wippermann et al. | |
| 2018/0176473 A1 | 6/2018 | Wippermann et al. | |
| 2018/0184068 A1 | 6/2018 | Wippermann et al. | |
| 2018/0198963 A1 | 7/2018 | Wippermann et al. | |
| 2018/0241920 A1 | 8/2018 | Wippermann et al. | |
| 2018/0324334 A1 | 11/2018 | Wippermann et al. | |
| 2019/0011809 A1 | 1/2019 | Wippermann et al. | |
| 2019/0068950 A1 | 2/2019 | Wippermann et al. | |
| 2019/0104242 A1 | 4/2019 | Wippermann et al. | |
| 2019/0155002 A1* | 5/2019 | Shabtay | G02B 13/009 |
| 2019/0394396 A1* | 12/2019 | Fridman | G02B 27/642 |

FOREIGN PATENT DOCUMENTS

| | | | |
|---|---|---|---|
| DE | 102014213371 B3 * | 8/2015 | ............. G03B 17/17 |
| DE | 10 2015 215 836 A1 | 2/2017 | |
| DE | 10 2015 215 837 A1 | 2/2017 | |
| DE | 10 2015 215 840 A1 | 2/2017 | |
| DE | 10 2015 215 841 A1 | 2/2017 | |
| DE | 10 2015 215 844 A1 | 2/2017 | |
| DE | 10 2015 215 845 A1 | 2/2017 | |
| DE | 10 2015 216 140 A1 | 3/2017 | |
| EP | 1 931 135 A1 | 6/2008 | |
| EP | 2059046 A1 | 5/2009 | |
| EP | 2 582 128 A2 | 4/2013 | |
| JP | 2009124685 A | 6/2009 | |
| JP | 2011139167 A | 7/2011 | |
| JP | 2011-212206 A | 10/2011 | |
| JP | 201237749 A | 7/2012 | |
| JP | 201345032 A | 9/2014 | |
| JP | 2015060048 A | 3/2015 | |
| KR | 10-2015-0084939 A | 7/2015 | |
| KR | 10-2017-0026458 A | 3/2017 | |
| TW | 201711443 A | 3/2017 | |
| TW | 201711457 A | 3/2017 | |
| TW | 201713991 A | 4/2017 | |
| WO | 2008020899 A3 | 2/2008 | |
| WO | 2014075022 A1 | 5/2014 | |
| WO | 2016005345 A1 | 1/2016 | |
| WO | 2014091985 A1 | 1/2017 | |
| WO | 2017029329 A1 | 2/2017 | |
| WO | 2017029375 A1 | 2/2017 | |
| WO | 2017/056035 A1 | 4/2017 | |

OTHER PUBLICATIONS

English translation of Korean Office Action of patent application No. 10-2019-7033500, dated Aug. 5, 2020.
Korean Office Action dated Aug. 24, 2020, in application No. 10-2019-7033460.
English Translation of Korean Office Action dated Aug. 24, 2020, in application No. 10-2019-7033460.
Japanese Office Action, dated Nov. 30, 2020, in application No. 2019-548902.
English Translation of Japanese Office Action, dated Nov. 30, 2020, in application No. 2019-548902.
Japanese Office Action, dated Nov. 10, 2020, from patent application No. 2019-555889.
English Translation of Japanese Office Action, dated Nov. 10, 2020, from patent application No. 2019-555889.
European Office Action, dated Sep. 28, 2020, in patent application No. 18724780.4.
Office Action, dated Nov. 24, 2020, in the parallel Chinese patent application No. 201880039912.6.
Japanese Office Action, dated Mar. 2, 2021, in the parallel patent application No. 2019-555943 with English Translation.
Indian Office Action, dated Mar. 9, 2021, in the parallel patent application No. 201937035160 with English Translation.

\* cited by examiner

MULTI-APERTURE IMAGING DEVICE, IMAGING SYSTEM AND METHOD OF PROVIDING A MULTI-APERTURE IMAGING DEVICE

CROSS-REFERENCE TO RELATED APPLICATIONS

This application is a continuation of copending International Application No. PCT/EP2018/059443, filed Apr. 12, 2018, which is incorporated herein by reference in its entirety, and additionally claims priority from German Application No. 10 2017 206 429.3, filed Apr. 13, 2017, which is also incorporated herein by reference in its entirety.

BACKGROUND OF THE INVENTION

The present invention relates to a multi-aperture imaging device, an imaging system and a method of providing a multi-aperture imaging device. The present invention further relates to multi-aperture imaging systems having a linear channel arrangement and a small or very small installation size.

Conventional cameras have an imaging channel that images the entire object field. The cameras have adaptive components that enable a relative lateral, two-dimensional displacement between objective and image sensor for realizing an optical image-stabilization function. Multi-aperture imaging systems having a linear channel arrangement consist of several imaging channels that each only capture a part of the object and that contain a deflecting mirror.

It would be desirable to have concepts for multi-channel capturing of object areas or fields of view that enable a compact realization.

Thus, it is the object of the present invention to provide a multi-aperture imaging device and a method of providing a multi-aperture imaging device that enables a compact realization, i.e., having a small installation space, with a high image quality.

SUMMARY

According to an embodiment, a multi-aperture imaging device may have: an image sensor; an array of optical channels, wherein each optical channel includes optics for projecting at least one partial field of view of a total field of view on an image sensor area of the image sensor; and beam-deflecting means for deflecting an optical path of the optical channels; wherein a first optical channel of the array is configured to image a first partial field of view of a first total field of view, wherein a second optical channel of the array is configured to image a second partial field of view of the first total field of view, and wherein a third optical channel is configured to completely image a second total field of view; and wherein the second total field of view is an incomplete section of the first total field of view; wherein the multi-aperture imaging device further has: image-evaluation means reading out the image sensor areas that is configured to combine and provide an image of the first partial field of view and an image of the second partial field of view to a first total image of the first total field of view, and to provide a second total image of the second total field of view; an optical image stabilizer for image stabilization along a first image axis by generating a first relative movement between the image sensor, the array and the beam-deflecting means, and for image stabilization along a second image axis by generating a second relative movement between the image sensor, the array and the beam-deflecting means; and an electronic image stabilizer for image stabilization of the first optical channel of the array along the first and the second image axis.

According to another embodiment, a multi-aperture imaging device may have: an image sensor; an array of optical channels, wherein each optical channel includes optics for projecting at least one partial field of view of a total field of view on an image sensor area of the image sensor; and beam-deflecting means for deflecting an optical path of the optical channels; wherein a first optical channel of the array is configured to image a first partial field of view of a first total field of view, wherein a second optical channel of the array is configured to image a second partial field of view of the first total field of view, and wherein a third optical channel is configured to completely image a second total field of view; and wherein the second total field of view is an incomplete section of the first total field of view; wherein the multi-aperture imaging device further has: an optical image stabilizer for image stabilization along a first image axis by generating a first relative movement between the image sensor, the array and the beam-deflecting means, and for image stabilization along a second image axis by generating a second relative movement between the image sensor, the array and the beam-deflecting means; and an electronic image stabilizer for image stabilization of the first optical channel of the array along the first and the second image axis; wherein the optical image stabilizer is configured to stabilize an image of the imaged partial field of view of a reference channel of a group including the first optical channel and the second optical channel, and wherein the electronic image stabilizer is configured to perform image stabilization in a channel-individual manner for optical channels that differ from the reference channel, wherein the multi-aperture imaging device is configured to stabilize the reference channel exclusively in an optical manner.

According to still another embodiment, a multi-aperture imaging device may have: an image sensor; an array of optical channels, wherein each optical channel includes optics for projecting a partial field of view of a total field of view on an image sensor area of the image sensor; and beam-deflecting means for deflecting an optical path of the optical channels; wherein a first group of optical channels is configured with at least two optical channels of the array to image one partial field of view each of a first total field of view, wherein a second group of optical channels is configured with at least two optical channels of the array to image one partial field of view each of a second total field of view; and wherein the second total field of view is an incomplete section of the first total field of view; wherein the multi-aperture imaging device further has: image-evaluation means reading out the image sensor areas that is configured to combine and provide images of the first group of optical channels to a first total image of the first total field of view, and to provide a second total image of the second total field of view; an optical image stabilizer for image stabilization along a first image axis by generating a first relative movement between the image sensor, the array and the beam-deflecting means, and for image stabilization along a second image axis by generating a second relative movement between the image sensor, the array and the beam-deflecting means; and an electronic image stabilizer for image stabilization of the first optical channel of the array along the first and the second image axis.

According to another embodiment, a multi-aperture imaging device may have: an image sensor; an array including at least a first and a second optical channel, wherein each optical channel includes optics for projecting a total field of view on an image sensor area of the image sensor; and beam-deflecting means for commonly deflecting an optical path of the optical channels; wherein the optics of the first optical channel has a focal length that differs by at least 10% from a focal length of the optics of the second optical channel; wherein the multi-aperture imaging device further has: an optical image stabilizer for image stabilization along a first image axis by generating a first relative movement between the image sensor, the array and the beam-deflecting means and for image stabilization along a second image axis by generating a second relative movement between the image sensor, the array and the beam-deflecting means; and an electronic image stabilizer for image stabilization of the first optical channel of the array along the first and the second image axis; wherein the optical image stabilizer is configured to perform optical image stabilization such that the optical image stabilization is related to a reference image of one of the first and second total fields of view, wherein the electronic image stabilizer is configured to stabilize an image of another total field of view related to the reference image.

Another embodiment may have an imaging system having a first and a second inventive multi-aperture imaging device as mentioned above that is configured to capture a total field of view at least partly in a stereoscopic manner.

According to another embodiment, a method of providing a multi-aperture imaging device may have the steps of: providing an image sensor; providing an array of optical channels, such that each optical channel includes optics for projecting at least one partial field of view of a total field of view on an image sensor area of the image sensor; and arranging beam-deflecting means for deflecting an optical path of the optical channels; such that a first optical channel of the array is configured to image a first partial field of view of a first total field of view, such that a second optical channel of the array is configured to image a second partial field of view of the first total field of view, and such that a third optical channel is configured to completely image a second total field of view; and such that the second total field of view is an incomplete section of the first total field of view; wherein the method further has: providing an image-evaluation means reading out the image sensor areas such that the image-evaluation means is configured to combine and provide an image of the first partial field of view and an image of the second partial field of view to a first total image of the first total field of view, and to provide a second total image of the second total field of view; arranging an optical image stabilizer for image stabilization along a first image axis by generating a first relative movement between the image sensor, the array and the beam-deflecting means, and for image stabilization along a second image axis by generating a second relative movement between the image sensor, the array and the beam-deflecting means; and providing an electronic image stabilizer for image stabilization of the first optical channel of the array along the first and the second image axis.

According to still another embodiment, a method of providing a multi-aperture imaging device may have the steps of: providing an image sensor; providing an array of optical channels, such that each optical channel includes optics for projecting a partial field of view of a total field of view on an image sensor area of the image sensor; and arranging beam-deflecting means for deflecting an optical path of the optical channels; such that a first group of optical channels is configured with at least two optical channels of the array to image one partial field of view each of a first total field of view, wherein a second group of optical channels is configured with at least two optical channels of the array to image one partial field of view each of a second total field of view; and such that the second total field of view is an incomplete section of the first total field of view, wherein the method further has: arranging an optical image stabilizer for image stabilization along a first image axis by generating a first relative movement between the image sensor, the array and the beam-deflecting means, and for image stabilization along a second image axis by generating a second relative movement between the image sensor, the array and the beam-deflecting means; and arranging an electronic image stabilizer for image stabilization of the first optical channel of the array along the first and the second image axis; such that the optical image stabilizer is configured to stabilize an image of the imaged partial field of view of a reference channel of a group including the first optical channel and the second optical channel, and such that the electronic image stabilizer is configured to perform image stabilization in a channel-individual manner for optical channels that differ from the reference channel, such that the multi-aperture imaging device is configured to stabilize the reference channel exclusively in an optical manner.

According to another embodiment, a method of providing a multi-aperture imaging device may have the steps of: providing an image sensor; providing an array of optical channels, such that each optical channel includes optics for projecting a partial field of view of a total field of view on an image sensor area of the image sensor; and arranging beam-deflecting means for deflecting an optical path of the optical channels; such that a first group of optical channels is configured with at least two optical channels of the array to image one partial field of view each of a first total field of view, wherein a second group of optical channels is configured with at least two optical channels of the array to image one partial field of view each of a second total field of view; and such that the second total field of view is an incomplete section of the first total field of view, wherein the method further has: providing an image-evaluation means reading out the image sensor areas such that the image-evaluation means is configured to combine and provide images of the first group of optical channels to a first total image of the first total field of view, and to provide a second total image of the second total field of view; arranging an optical image stabilizer for image stabilization along a first image axis by generating a first relative movement between the image sensor, the array and the beam-deflecting means, and for image stabilization along a second image axis by generating a second relative movement between the image sensor, the array and the beam-deflecting means; and providing an electronic image stabilizer for image stabilization of the first optical channel of the array along the first and the second image axis.

According to another embodiment, a method of providing a multi-aperture imaging device may have the steps of: providing an image sensor; providing an array including at least a first and a second optical channel, wherein each optical channel includes optics for projecting a total field of view on an image sensor area of the image sensor; and arranging beam-deflecting means for commonly deflecting an optical path of the optical channels; such that the optics of the first optical channel has a focal length that differs by at least 10% from a focal length of the optics of the second optical channel, wherein the method further has: arranging an optical image stabilizer for image stabilization along a first image axis by generating a first relative movement between the image sensor, the array and the beam-deflecting means, and for image stabilization along a second image axis by generating a second relative movement between the image sensor, the array and the beam-deflecting means; and providing an electronic image stabilizer for image stabilization of the first optical channel of the array along the first and the second image axis; such that the optical image stabilizer is configured to perform optical image stabilization such that the optical image stabilization is related to a reference image of one of the first and second total fields of view, so that the electronic image stabilizer is configured to stabilize an image of another total field of view related to the reference image.

One finding of the present invention is the realization that the above object can be solved in that optics with different optics are arranged in an array, such that different partial fields of view are captured by the optics. This is obtained both for the combination of single-channel capturing of a total field of view as well as for a combination of single-channel capturing of a total field of view with multi-channel capturing of a total field of view by capturing several partial fields of view.

According to an embodiment, a multi-aperture imaging device includes an image sensor and an array of optical channels, wherein each optical channel includes optics for projecting at least one partial field of view of a total field of view on an image sensor area of the image sensor. The multi-aperture imaging device includes beam-deflecting means for deflecting an optical path of the optical channels. A first optical channel of the array is configured to image a first partial field of view of a first total field of view, wherein a second optical channel of the array is configured to image a second partial field of view of the first total field of view. A third optical channel is configured to completely image a second total field of view.

According to a further embodiment, a multi-aperture imaging device includes an image sensor and an array including at least a first and a second optical channel. Each optical channel includes optics for projecting a total field of view on an image sensor area of the image sensor. Beam-deflecting means are configured for commonly deflecting an optical path of the optical channels. The optics of the first optical channel comprises a focal length that differs by at least 10% from a focal length of the optics of the second optical channel.

The multi-aperture imaging devices according to both embodiments are configured to completely capture a total field of view with an optical channel and to capture a further total field of view in a single-channel or multi-channel manner. The optical channels used for this are arranged in the same array and are deflected by the same beam-deflecting means. This allows usage of the multi-aperture imaging device for imaging different total fields of view in combination with a beam deflecting means acting commonly for all channels for switching the viewing direction, such that a multiple arrangement of components can be prevented and space-saving realization is possible. At the same time, the arrangement of the optical channels in one array allows precise adjustment of the channels and high-quality images.

Further embodiments relate to an imaging system and a method of providing a multi-aperture imaging device.

BRIEF DESCRIPTION OF THE DRAWINGS

Embodiments of the present invention are subsequently described with reference to the accompanying drawings. They show:

FIG. 1b a comparison of two total fields of view that can be captured by the multi-aperture imaging device according to FIG. 1a;

FIG. 3b a schematic side-sectional view of the multi-aperture imaging device of FIG. 2a;

DETAILED DESCRIPTION OF THE INVENTION

Figure 1A:
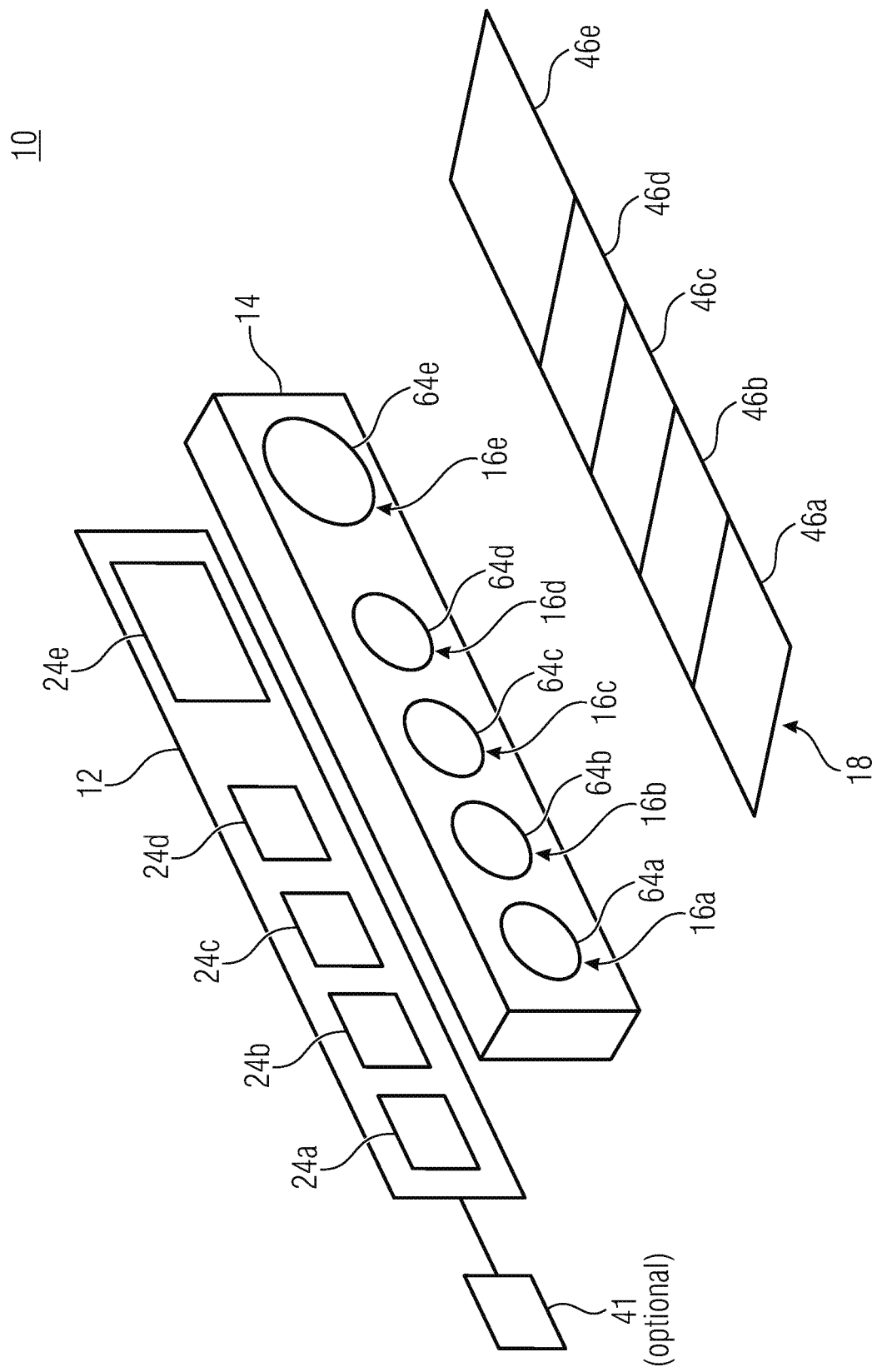
FIG. 1a a schematic perspective view of a multi-aperture imaging device according to an embodiment.

Before embodiments of the present invention will subsequently be explained in detail with reference to the drawings, it shall be pointed out that identical, functionally identical and equal elements, objects and/or structures are provided with identical reference numerals in the different figures so that the description of these elements in different embodiments is interchangeable and/or mutually applicable.

FIG. 1a shows a schematic perspective view of a multi-aperture imaging device 10 according to an embodiment. The multi-aperture imaging device includes an image sensor 12 and an array 14 of optical channels 16a-e. Each optical channel 16a-e includes optics 64a-e for projecting at least one partial field of view of a total field of view on an image sensor area 24a-e of the image sensor 12. At least one partial field of view means that also a total field of view can be imaged by means of optics, as described based on FIG. 1b. The optical channels 16a-d of the array 14 are configured, for example, to image one partial field of view of a first total field of view each, while a further optical channel 16e is configured to completely image a second total field of view differing from the first partial field of view. Although the total fields of view are different from one another, the same can overlap partly or completely. The total fields of view can, for example, overlap completely but differ in size. According to further embodiments, the total fields of view can also partly not overlap or can even be disjoint.

Optical channels may be understood as a course of optical paths. The optical paths may be influenced by the optics 64a-h arranged in the array 14, e.g., by scattering or collimation. The individual optical channels may each form a complete imaging optics and may each comprise at least one optical component or optics, such as a refractive, diffractive or hybrid lens, and may image a section of the total object entirely captured with the multi-aperture imaging device. This means that one, several or all of the optics 64a-h may also be combinations of optical elements. An aperture diaphragm may be arranged with respect to one, several or all of the optical channels.

The multi-aperture imaging device 10 includes beam-deflecting means 18 for deflecting an optical path of the optical channel 16a-e. The multi-aperture imaging device 10 is configured to capture the two total fields of view in one position of the beam-deflecting means 18. In one embodiment, it is provided that the beam-deflecting means 18 is translationally or rotationally moved for deflecting the optical paths in the amended position in a different direction such that different total fields of view are captured in the amended position. Although four optical channels 16a-d are used to image a total field of view together, also another number can be used, for example two, at least three, at least four, at least ten, at least 20 or an even higher value. Although the array 14 is illustrated such that all optical channels are arranged in a single line, according to other embodiments, multi-line arrangement can also be implemented.

Figure 1B:
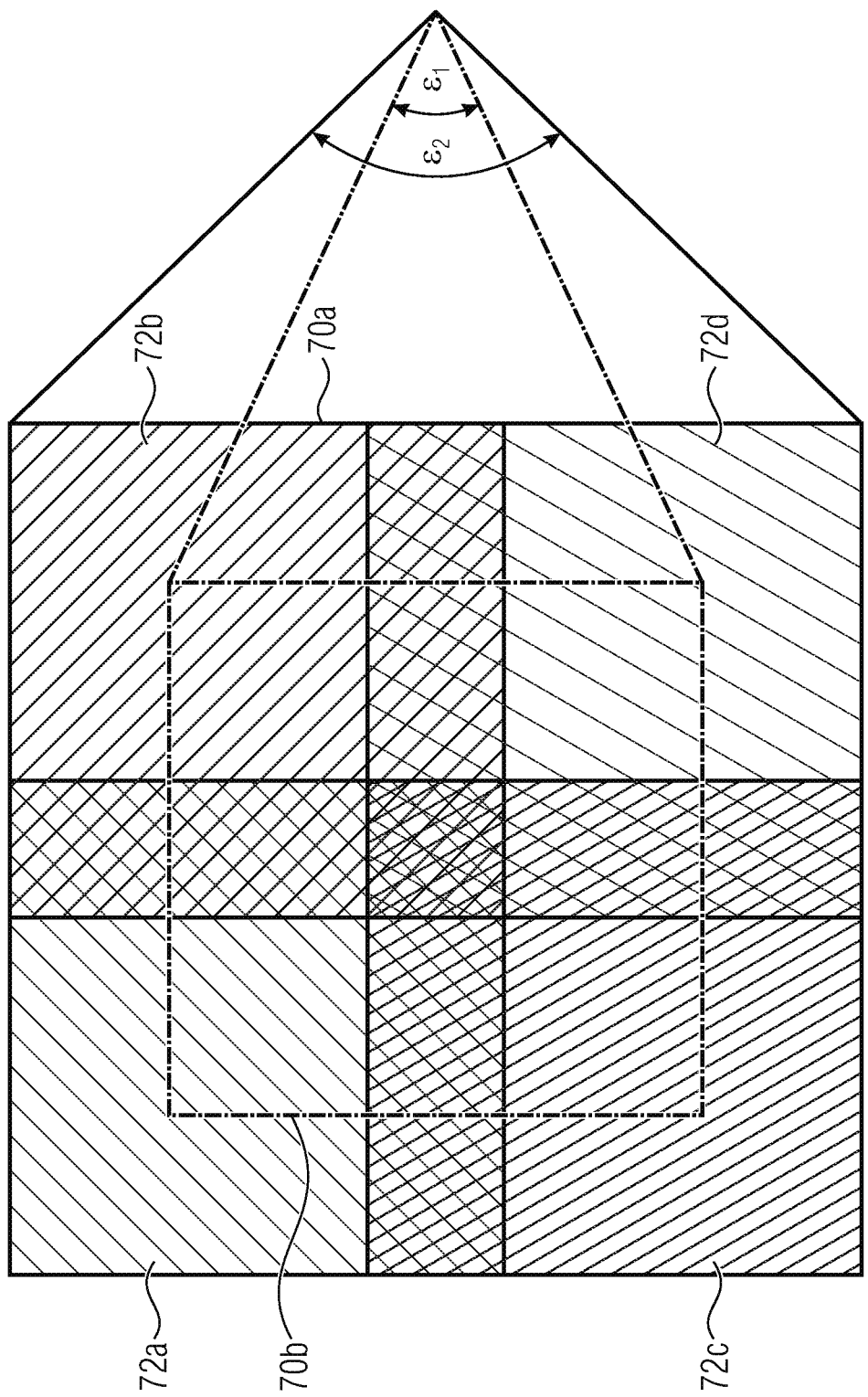

FIG. 1b shows a schematic illustration of two total fields of view 70a and 70b that can be captured by the multi-aperture imaging device 10. In the following, for example, the optics 64a-d of the optical channels 16a-d, according to FIG. 1a, are configured to image the partial fields of view 72a-d of a total field of view 70a, wherein also another allocation or another number of channels is possible. The optics 64e of the optical channel 16a arranged above that in the array 14 is configured to completely image the total field of view 70b illustrated in FIG. 1b. Compared to the total field of view 70a that is imaged in a multichannel manner, i.e., piece by piece by a multitude or plurality of partial fields of view, the total field of view 70b is imaged by a single optical channel. As illustrated in FIG. 1b, the total field of view 70b can at least partly or completely overlap the total field of view 70a. Alternatively, it is also possible that the total fields of view 70a and 70b differ at least partly. The total field of view 70b can be part of the total field of view 70a, this means the second total field of view can be an incomplete section of the first total field of view or vice versa. Compared to the total field of view 70a, the total field of view preferably comprises a smaller aperture angle which can have the effect that the imaged section of the object area in the total field of view 70b is smaller compared to the total field of view 70a. This means an aperture angle $\varepsilon_1$ of the field of view 70a is greater than an aperture angle $\varepsilon_2$ of the total field of view 70b, wherein the angles can be directly related to an optical characteristic, such as the focal lengths of the optics. The aperture angle $\varepsilon_1$ of the field of view 70a can be greater than the aperture angle $\varepsilon_2$ of the field of view 70b by at least 10%, at least 20% or at least 50%. A greater aperture angle results in a shorter focal length and allows a thinner configuration of the optics and/or a smaller diameter of the optics. Compared to the combination of optics 16a-d for capturing the total field of view 70a and in combination with the fact that the second total field of view 70b can be an incomplete section of the first total field of view 70a, the optics 16e for capturing the total field of view 70b can represent a telephoto lens or zoom lens or can at least provide a respective function, while vice versa the combination of optics 16a-d compared to the optics 16e can represent a wide-angle lens or can at least provide a respective function.

An individual beam-deflecting area 46e of the beam-deflecting means 18 can be allocated to the optical channel 16e, which differs from the beam-deflecting areas 46a-d that are allocated to the optical channels 16a to 16d. This allows, for example, simultaneous capturing of the total fields of view 70a and 70b and hence obtaining two images. Further, for an overlap area of the total fields of view 70a and 70b, stereo or 3D information can be obtained. Beam-deflecting areas can be areas of a large-area element, such as a mirror, and may not be delimited from other beam-deflecting areas. Alternatively, beam-deflecting areas can also be visibly or mechanically delimited from one another, for example in that the beam-deflecting areas are formed as facets.

The array 14 comprises optics 64a-d and 64e with intentionally different optical characteristics. The optics 46a-d are, for example, formed in the same manner within production tolerances, while optics 64e comprises deviations with respect to optics 64a-d exceeding a measure caused by production tolerances. The optics 64e comprises, for example, an intentionally different focal length and/or an intentionally different aperture angle with respect to optics

64*a-d*, this means the same differs in the optical characteristic with respect to the optics 64*a-d* by at least 10%, at least 20% or at least 30% but also higher, for example, such as at least 50% or even 100% or more.

The multi-aperture imaging device 10 can include an optional electronic image stabilizer 41 to at least partly compensate differing changes obtained by possible optical image stabilization or in the images by relative movement between components 12, 14 and 18.

An image-evaluation means providing total images and reading out the image sensor areas 24*a-e* of the multi-aperture imaging device 10, which can be part of the multi-aperture imaging device 10 is, for example, configured to combine the images of the partial fields of view 72*a-d* to a first total image of the total field of view 70*a*, for example by means of stitching and/or to provide a second total image of the total field of view 70*b* based on reading out the image sensor area 24*e*.

Figure 1C:
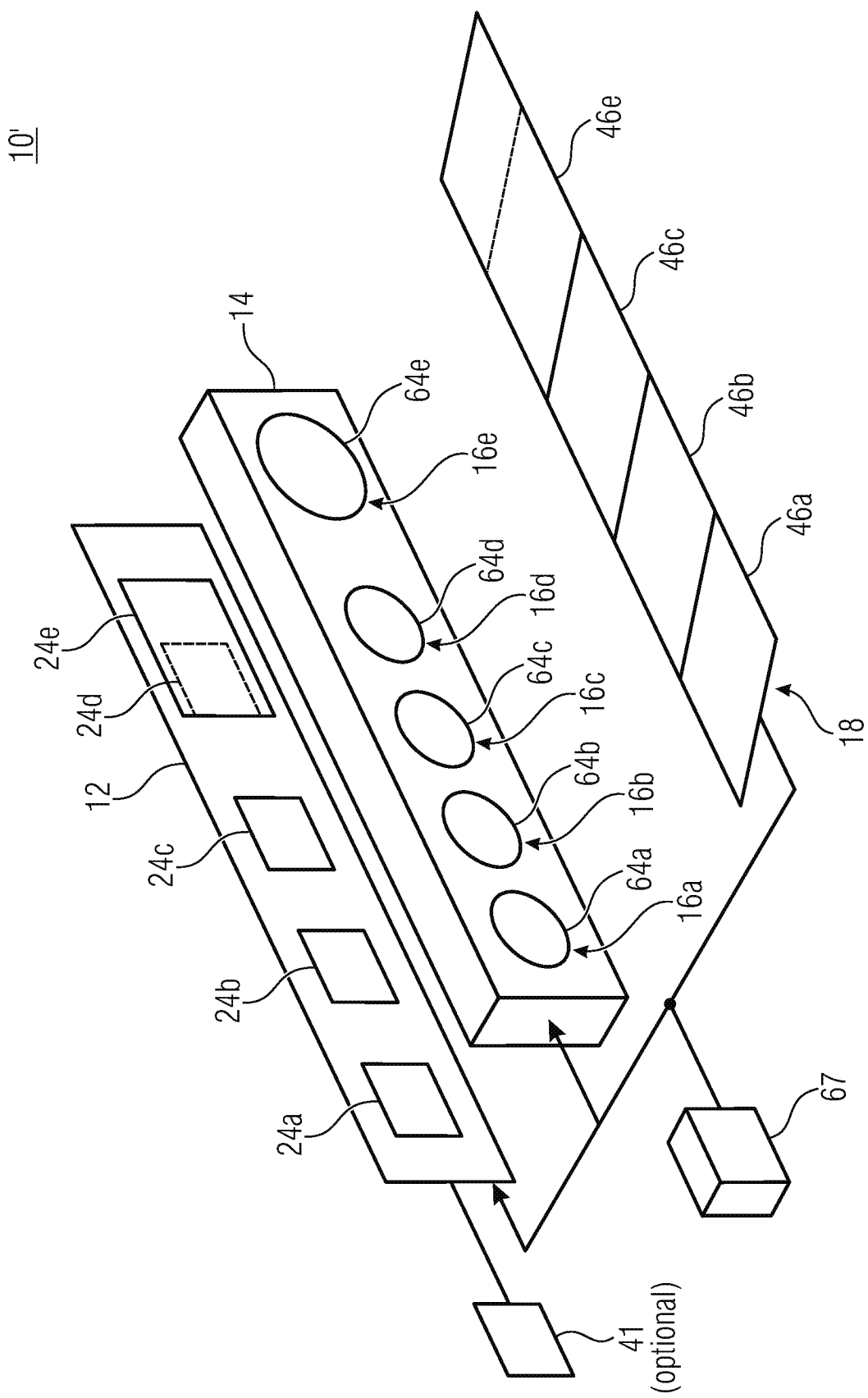
FIG. 1c a schematic perspective view of a multi-aperture imaging device according to an embodiment that is, compared to the multi-aperture imaging device of FIG. 1a, configured to capture the total fields of view according to FIG. 1b alternating in time.

FIG. 1*c* shows a schematic perspective view of a multi-aperture imaging device 10', which is configured, compared to the multi-aperture imaging device 10, to capture the total fields of view 70*a* and 70*b* alternately, this means alternating in time. This enables synergetic usage of components, such that a further reduced installation space is necessitated and/or a lower extent of individual elements can be provided. In that way, the beam-deflecting means 46*e* can be used to alternately deflect the optical path of the optical channels 16*d* and 16*e*, such that an arrangement of the beam-deflecting area 16*d* of FIG. 1*a* can be omitted. For this, the beam-deflecting area 46*e* can have, for example, a size that is sufficient for deflecting the optical channel 16*e* imaging the total field of view 70*b*, such that also deflection of the optical channel 16*d* used for imaging the comparatively small partial field of view 72*d* is possible without any problems, as it is illustrated by the dotted line in the beam-deflecting area 46*e*. Alternatively or additionally, the image sensor area 24*e* can be used to alternately capture the total field of view 70*b* and the partial field of view 72*d*. The image sensor area 24*e* can at least partly overlap with the image sensor area 24*d* or can even include the image sensor area 24*d*, such that the image sensor area 24*d* does not have to be separately arranged in the overlap area and can possibly be omitted.

For alternate switching, the multi-aperture imaging device 10' can comprise a switching unit 67 that is configured to provide a relative movement between the image sensor 12, the array 14 and the beam-deflecting means 18, such that, for capturing the total field of view 70*b*, the optical channel 16*e* projects the total field of view 70*b* on the image sensor area 24*e* by the optics 64*e*, such that, for capturing the partial field of view 72*d*, the optical channel 16*d* projects the partial field of view 72*d* on the image sensor, i.e., the image sensor area 24*d* or 24*e* by the optics 64*d*. For this, the switching unit can include one or several actuators. The multi-aperture imaging device 10' can include an optical image stabilizer. This allows synergetic usage of the actuator system of the optical image stabilizer also as switching unit 67 or vice versa.

The above statements illustrate that the beam-deflecting area 46*e* can also be used for deflecting the optical channel 64*d*, such that the beams deflection area 46*d* can be omitted and/or that the image sensor area 24*e* can also be used for imaging the partial field of view 72*b*, such that the image sensor area 24*d* can be omitted. Both omissions can be implemented together but also individually independent of one another.

As an alternative to the above statements, another one of the other beam-deflecting areas 46*a-c* illustrated in FIG. 1*a* can be used to alternately deflect the optical path of two optical channels. Although the optics 64*e* is illustrated such that the same is at the edge of a line of the array 14, the same can be arranged at any position along the line or within a separate line. As an alternative to the above statements, one of the other image sensor areas 24*a-c* illustrated in FIG. 1*a* can be used to alternately image the total field of view 70*b* and a partial field of view 72*a-d*.

An aspect described herein according to which an electronic image stabilizer is used to compensate differently varying imaging changes between optical channels, and a further aspect according to which two total fields of view 70*a* and 70*b* having different sizes are captured by a multi-aperture imaging device, i.e., by using at least one of a common image sensor 12, a common array 14 and a common deflection means 18, can be implemented independent of one another but also in combination, such that the aspect of electronic image stabilization represents an advantageous further development of the aspect of the total fields of view having different sizes.

Figure 1D:
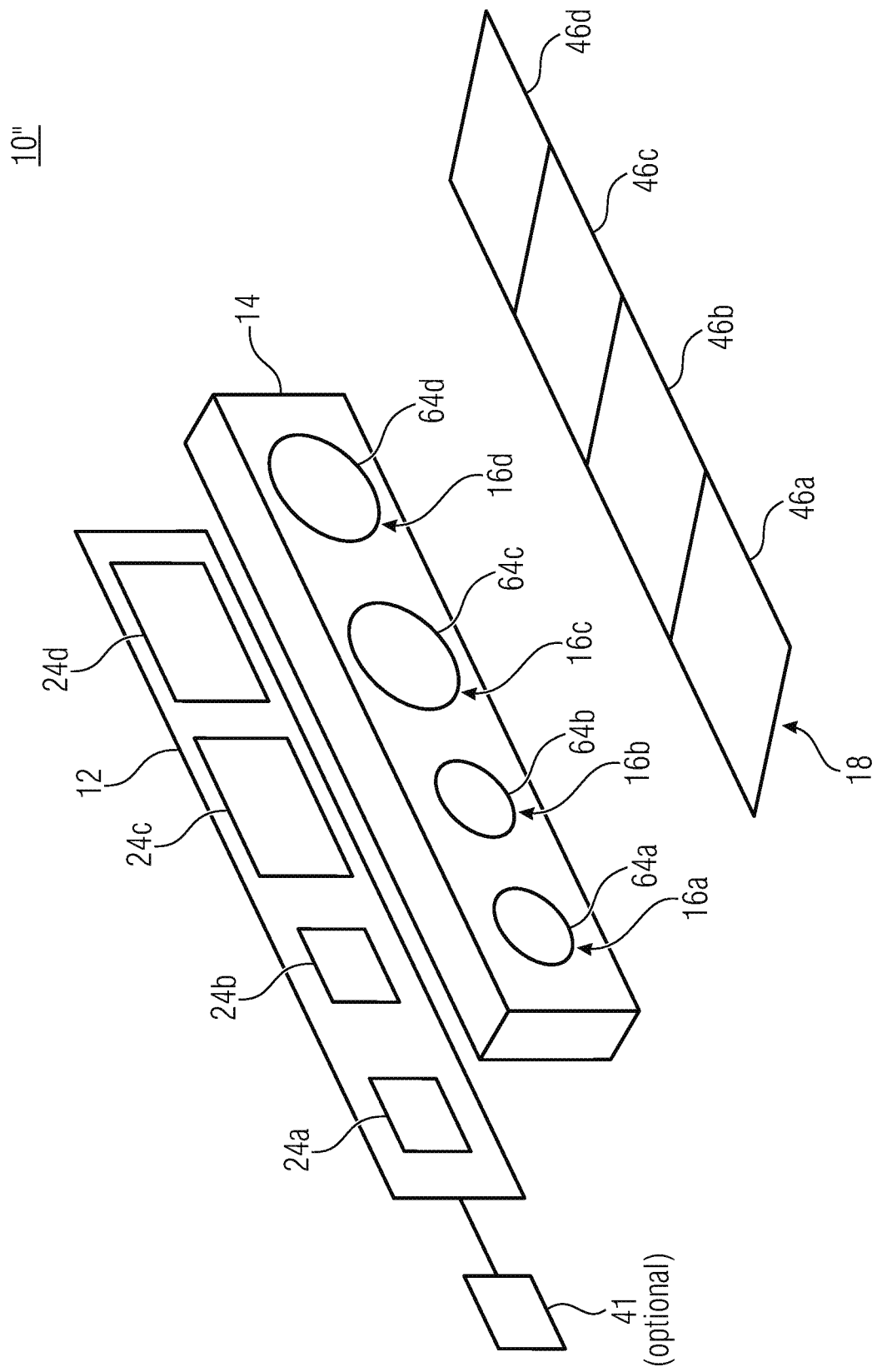
FIG. 1d a schematic perspective view of a multi-aperture imaging device according to an embodiment comprising two groups of optical channels for respective complete imaging of a total field of view in groups.

FIG. 1*d* shows a schematic perspective view of a multi-aperture imaging device 10" according to an embodiment. Compared to the multi-aperture imaging device 10, the multi-aperture imaging device 10" comprises two optical channels 16*c* and 16*d* having different optical characteristics compared to the optical channels 16*a* and 16*b*. This can be understood such that in addition to the optical channel 16*e* of the multi-aperture imaging device 10, which can be compared, for example, to the optical channel 64*c* of the multi-aperture imaging device 10", a further optical channel 64*d* is arranged in the multi-aperture imaging device 10", which has a comparable optical characteristic, such that the optical channels 64*c* and 64*d* form a group of optical channels. The optical characteristic of the optical channels 16*c* and 16*d* can be the same within a tolerance range of at most 10%. Also, the optical characteristic of the optical channels 16*a* and 16*b* can be the same within such a tolerance range. Between the optical channels of different groups, the optical characteristic of the optics can deviate by at least ±10% (or 1/1.1), at least ±20% (or 1/1.2) or at least ±30% (or 1/1.3) but also more, such as at least ±50% (or 1/1.5) or even ±100% (or ½) or more from the first value of the optical characteristic of the other group. The optical characteristic of the channels can in particular be the resulting focal length of the optics existing in the respective channel. The above-described allocation of telephoto lens and wide-angle lens can also be applied to the described groups of optical channels, such that a group of optical channels, e.g. including the channels 16*c* and 16*d*, is the zoom lens with respect to the group 16*a* and 16*b*, and vice versa the optical channels 16*a* and 16*b* are a wide-angle lens for the optical channels 16*c* and 16*d*.

Figure 1E:
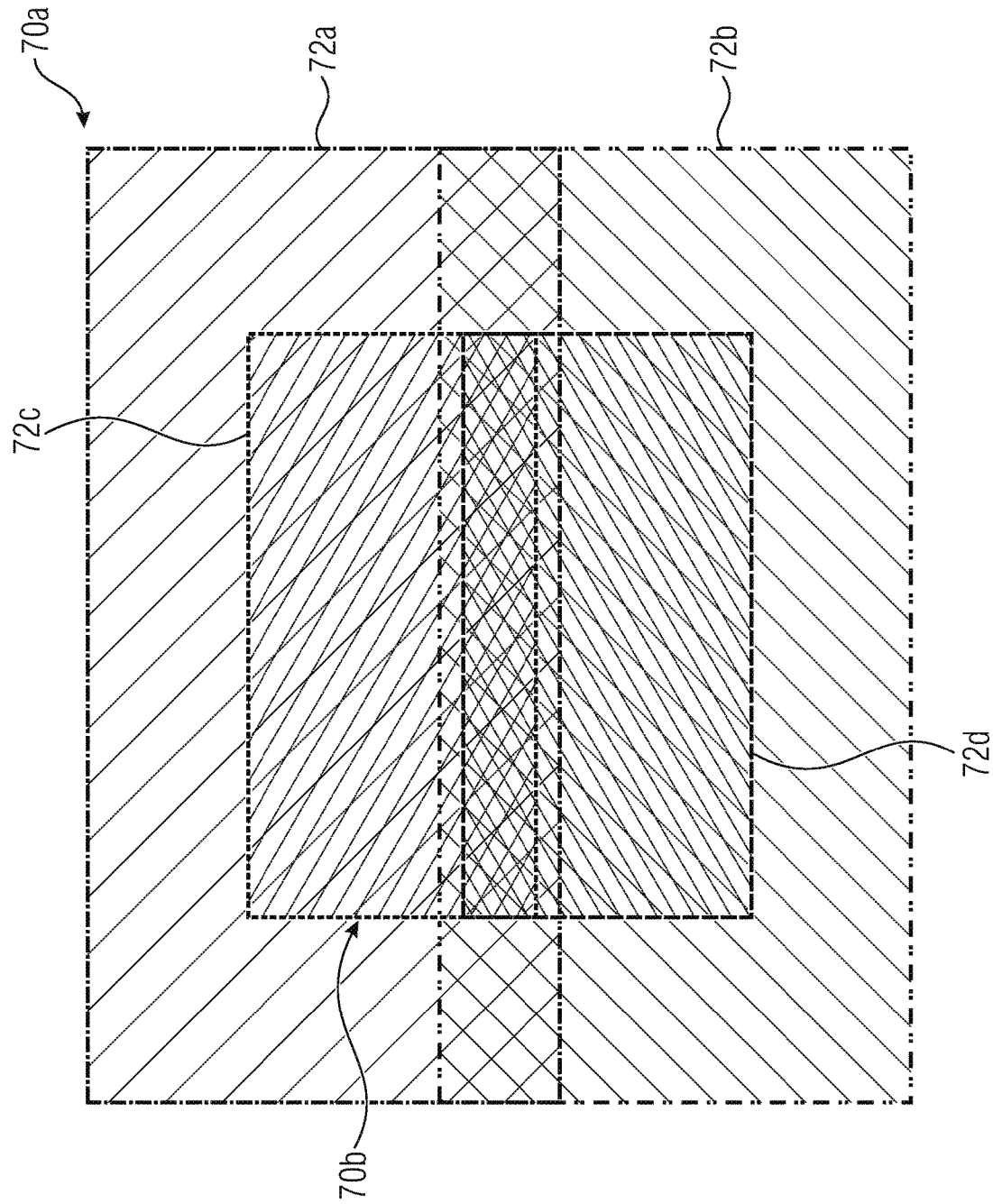
FIG. 1e a schematic view of total fields of view captured by the multi-aperture imaging device according to FIG. 1d.

The optical channels 16*a* and 16*b* can form a first group of optical channels. The optical channels 16*c* and 16*d* can form a second group of optical channels. Each of the groups can be configured to capture one of the total fields of view 70*a* or 70*b*. Simply put, with respect to the multi-aperture imaging device 10, the total field of view 70*b* can also be divided, as illustrated based on FIG. 1*e*. For example, the optical channel 16*a* can be configured to capture the partial field of view 72*a* of the total field of view 70*a*. The optical channel 16*b* can be configured to capture the partial field of view 72*b* of the total field of view 70*a*. The optical channel 16*c* can be configured to capture the partial field of view 72*c* of the total field of view 70*b*. The optical channel 16*d* can be configured to capture the partial field of view 72d of the total field of view 70b. Each of the groups of optical channels 16a/16b and 16c/16d can be configured to completely capture the allocated total field of view 70a and 70b, respectively. The total field of view 70b can be an incomplete section of the total field of view 70a. In other words, the total field of view 70a can include the total field of view 70b. In other words again, the total field of view 70b can completely overlap the total field of view 70a, but the total field of view 70a can, for example, only incompletely overlap the total field of view 70b.

Although each of the groups merely includes two optical channels 16a and 16b and 16c and 16d, respectively, one of the two groups or both groups can also include another higher number of optical channels, such as 3, 4, 5 or more. The groups can also comprise different numbers of optical channels which is in correspondence with the multi-aperture imaging devices 10 and 10' which describe capturing of different total fields of view by a different number of optical channels.

Although merely two groups of optical channels are described, according to embodiments, also another higher number of groups with optical channels can be arranged in order to capture a higher number of total fields of view, such as 3, 4, 5 or more.

Thus, according to the embodiment of the multi-aperture imaging device 10", the image sensor 12 and the array 14 can be arranged. Each optical channel 16a-d can include optics 64a-d for projecting a partial field of view 72a-d of a total field of view 70a or 70b on an image sensor area 24d of the image sensor 12. Each optical channel of the array 14 can be configured to project the partial field of view on an image sensor area 24a-d of the image sensor allocated to the optical channel 16a-d, wherein the multi-aperture imaging device 10" can be configured such that at least one image sensor area allocated to an optical channel 16c or 16d of the second group of optical channels overlaps with an image sensor area 24a or 24b allocated to an optical channel 16a or 16b of the first group of optical channels, as described in the context of FIG. 1c.

The beam-deflecting means 18 can be arranged for deflecting an optical path 26a-d of the optical channels 16a-d. The first group of optical channels having at least two optical channels 16a and 16b of the array 14 is configured to image one partial field of view 72a and 72b of the total field of view 70a each. The second group of optical channels having at least two optical channels 16c and 16d of the array 14 is configured to image one partial field of view 72c and 72d of the total field of view 70b each.

Other details of the multi-aperture imaging devices 10 and 10" can be applied to the multi-aperture imaging device 10''' without limitations, in particular the configuration of the beam-deflecting means 18 or parts thereof, which will be described below. Alternatively or additionally, an optical and/or electronic image stabilizer described herein can also be arranged.

Figure 1F:
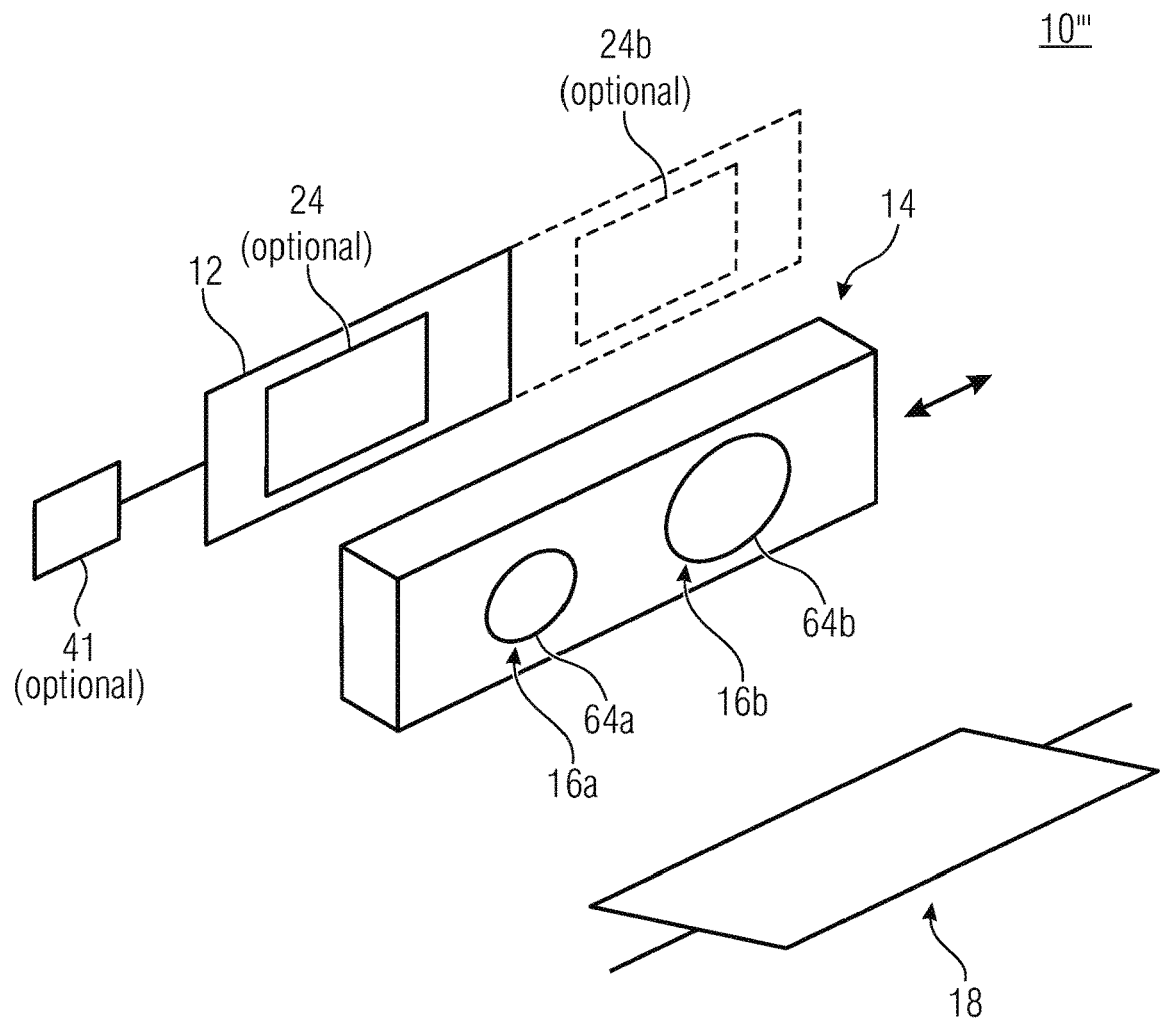
FIG. 1f a schematic perspective view of a multi-aperture imaging device according to an embodiment that is configured to capture two total fields of view by means of common beam-deflecting means.

FIG. 1f shows a schematic perspective view of a multi-aperture imaging device 10''' according to an embodiment, where the array 14 comprises first optics 64a and second optics 64b that are mutually introduced between the beam-deflecting means 18 and the image sensor 12 in order to alternately capture the total field of view 70a or 70b completely with one optical channel. The optics 64a and 64b comprise, for example, the above-stated different focal lengths exceeding production tolerances. For this, the image sensor 12 can comprise a separate image sensor area 24a. Alternatively, also at least one further optional image sensor area 24b can be provided, for example, to capture the total fields of view 70a and 70b simultaneously. In other words, according to a further embodiment, the multi-aperture imaging device 10" includes the image sensor 12 and the array 14 including at least a first and a second optical channel 16a and 16b. Each optical channel 16a and 16b includes optics 64a and 64b, respectively, for projecting a total field of view 70a and 70b, respectively, on the image sensor area 24 of the image sensor 12. The beam-deflecting means 18 is configured for commonly deflecting the optical paths of the optical channel 16a and 16b. The optics 64a of the first optical channel 16a comprises a focal length differing by at least 10% from a focal length of the optics 64b of the second optical channel 16b. Alternatively, also further optics for projecting further total fields of view on individually allocated image sensor areas or on the image sensor area 24 can also be arranged. At least one total field of view 70a, 70b or a further total field of view can be partly captured by several optical channels each, as described in the context of FIGS. 1a-e. The multi-aperture imaging device 10" can include an optical image stabilizer as described above and/or can optionally include the electronic image stabilizer 41.

Figure 1G:
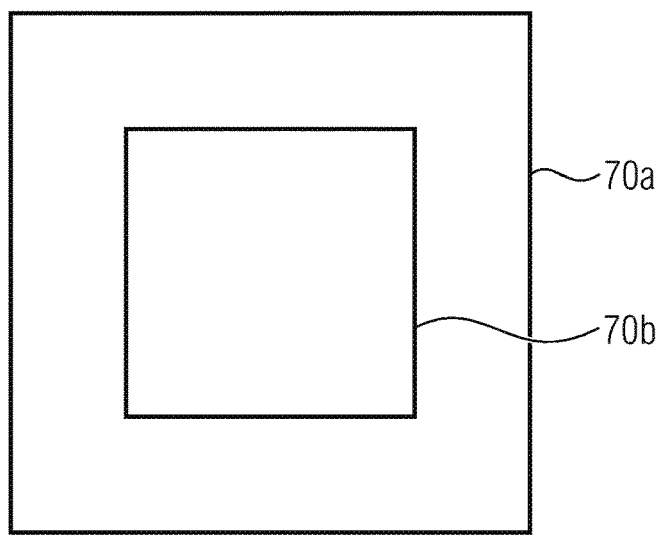
FIG. 1g a schematic view of total fields of view captured by the multi-aperture imaging device according to FIG. 1f.

FIG. 1g shows a schematic view of the total fields of view 70a and 70b that can be captured by the multi-aperture imaging device 10". The total field of view 70a can also be captured by means of a subdivision into partial fields of view for obtaining a configuration according to the multi-aperture imaging device 10. Additionally, the total field of view 70b can also be captured by means of a subdivision into partial fields of view.

Figure 2A:
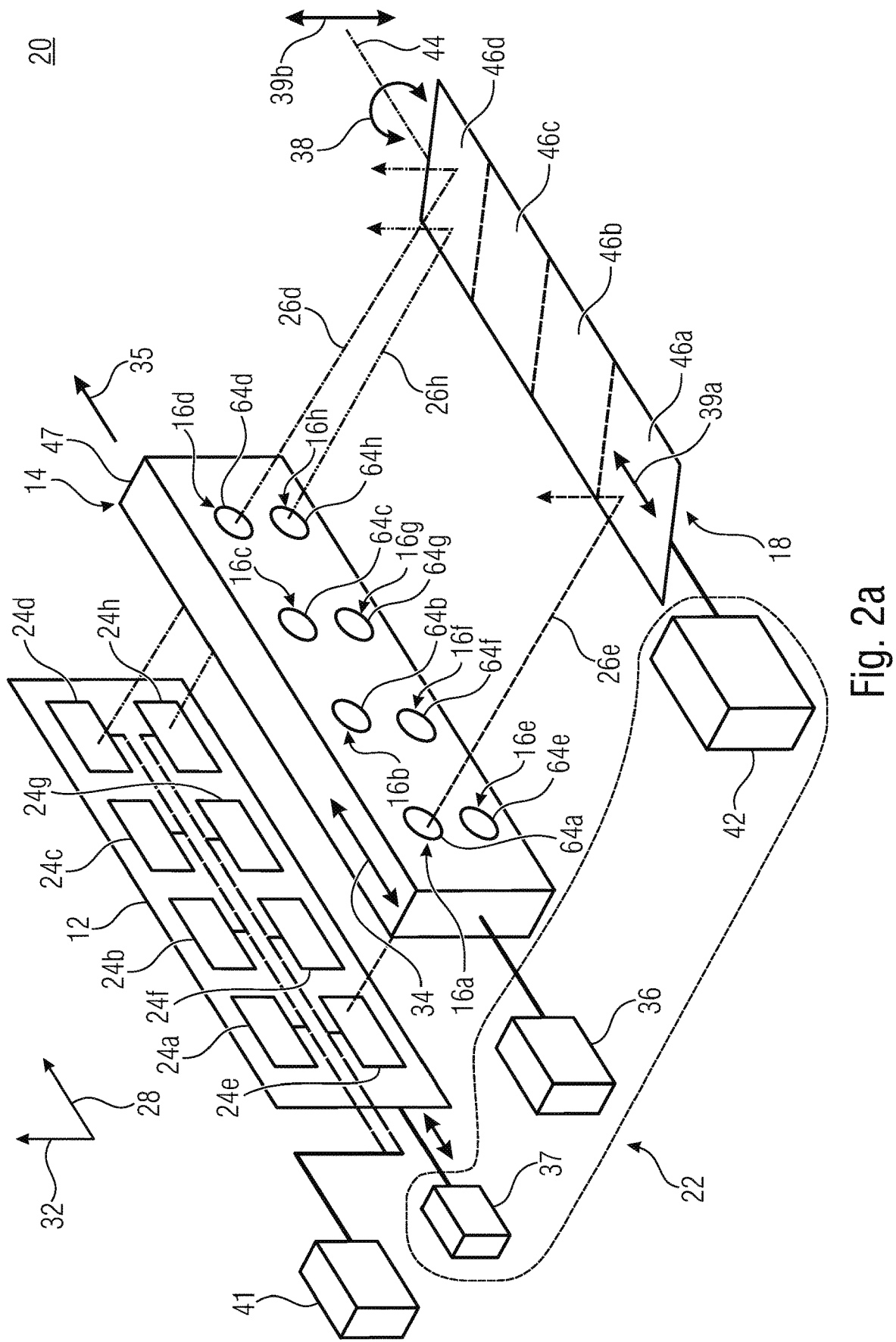
FIG. 2a a schematic view of a multi-aperture imaging device according to an embodiment.

FIG. 2a shows a schematic view of a multi-aperture imaging device 20 according to an embodiment. The multi-aperture imaging device 20 includes the image sensor 12, the array 14 of optical channels 16a-h, the beam-deflecting means 18 and an optical image stabilizer 22, as it can be used, for example, in the multi-aperture imaging device 10, 10', 10" and/or 10'''. Each optical channel 16a-h includes optics 64a-h for projecting a partial field of view of a total field of view on an image sensor area 24a-h of the image sensor 12. Compared to the multi-aperture imaging device 10, more than four optical channels can be used to capture a total field of view with several partial fields of view, such as the optical channels 16a-e, 16g and 16h or any other, while the optical channel 16f is configured, for example, to capture the total field of view 70b. Alternatively, also at least one of the optical channels 16a-e, 16d or 16h can be configured to capture a further, i.e., third or higher-numbered total field of view.

For example, the image sensor areas 24a-h may each be formed of a chip that includes a corresponding pixel array, wherein the image sensor areas may be mounted on a mutual substrate, or a mutual circuit carrier, such as a mutual circuit board or a mutual flex board. Alternatively, it would obviously also be possible that the image sensor areas 24a-h may each be formed of a part of a mutual pixel array that continuously extends across the image sensor areas 24a-h, wherein the mutual pixel array is formed, e.g., on a single chip. For example, only the pixel values of the mutual pixel array are read out in the image sensor areas 24a-h. Various combinations of these alternatives are obviously also possible, e.g., the presence of a chip for two or more channels and a further chip for other channels or the like. In the case of several chips of the image sensor 12, e.g., these may be mounted on one or several circuit boards or circuit carriers, e.g., all together or in groups or the like. Furthermore, possible is also a solution that uses a single chip that comprises several individual pixel fields. Alternative embodiments comprise several chips that, in turn, comprise individual pixel fields.

The beam-deflecting means 18 is configured to deflect an optical path 26 of the optical channels 16a-h. The optical image stabilizer 22 is configured to enable an optical image stabilization along a first image axis 28 and along a second image axis 32 based on a relative movement between the image sensor 12, the array 14 and the deflecting means 18. The first image axis 28 and the second image axis 32 may be affected by an arrangement or orientation of the image sensor areas 24a-h and/or the image sensor 12. According to an embodiment, the image axes 28 and 32 are arranged perpendicular to each other and/or coincide with extension directions of pixels of the image sensor areas 24a-d. Alternatively or additionally, the image axes 28 and 32 may indicate an orientation along which a partial field of view or the total field of view is sampled or captured. Simply put, the image axes 28 and 32 may be a first and a second direction, respectively, in an image captured by the multi-aperture imaging device 20. For example, the image axes 28 and 32 comprise an angle of #0° with respect to each other, e.g., the same are arranged perpendicular to each other in the space.

Optical image stabilization may be advantageous when, during a capturing process during which partial fields of view or the total field of view are captured, the multi-aperture imaging device 20 is moved with respect to the object area whose field of view is captured. The optical image stabilizer 22 may be configured to at least partially counteract this movement in order to reduce or to prevent shaking of the image. For the optical image stabilization along the image axis 28, the optical image stabilizer 22 may be configured to generate a first relative movement 34 between the image sensor 12, the array 14 and the beam-deflecting means 18. For the optical image stabilization along the image axis 32, the optical image stabilizer 22 is configured to generate a second relative movement between the image sensor 12, the array 14 and the beam-deflecting means 18. For the first relative movement 34, the optical image stabilizer 22 may include an actuator 36 and/or an actuator 37 for generating the relative movement 34 by displacing the array 14 and/or the image sensor 12 along the image axis 28. In other words, although the actuator 36 is illustrated such that the same displaces or moves the array 14 in a translational manner, the actuator 36, according to further embodiments, may alternatively or additionally be connected to the image sensor 12 and may be configured to move the image sensor 12 relative to the array 14. Alternatively or additionally, the optical image stabilizer may include an actuator 42 that is configured to generate a translational movement 39a of the beam-deflecting means 18 along the image axis 28. In this case, the optical image stabilizer 22 is configured such that the same executes the movements of the actuators 36, 37 and/or 42 so that the relative movement 34 is created between the image sensor 12, the array 14 and the beam-deflecting means 18. This means that, although in FIG. 2a the relative movement 34 is illustrated at the array 14, alternatively or additionally, other components may be moved. The relative movement 34 may be executed in parallel to a line extension direction 35 and perpendicularly to the optical paths 26. However, it may be advantageous to set the array 14 in motion with respect to the image sensor 12 in a translational manner in order to, e.g., mechanically stress an electric interconnection of the image sensor 12 with respect to further components as little as possible or not at all.

For generating the second relative movement, the optical image stabilizer 22 may be configured to generate or enable a rotational movement 38 of the beam-deflecting means 18 and/or to provide a translational relative movement between the image sensor 12 and the array 14 along the image axis 32 and/or a translational relative movement between the array 14 and the beam-deflecting means 18, wherein the actuators 36, 37 and/or 42 may be arranged for this purpose. For generating the rotational movement 38, the optical image stabilizer 22 may, e.g., include the actuator 42 that is configured to generate the rotational movement 38. Alternatively, the optical image stabilizer 22 may be configured to generate a translational movement 39b along the image axis 32 using the actuator 42. Based on the first relative movement 34 and/or 39a, an optical image stabilization may be obtained along an image direction parallel thereto, e.g., along or opposite to the image axis 28. Based on the second relative movement 38 and/or 39b, an optical image stabilization may be obtained along an image direction that is arranged perpendicular to an axis of rotation 44 of the rotational movement 38 in a main side plane of the image sensor 12, e.g., along the image axis 32. A main side may be understood to be a side that comprises a large or the largest dimension compared to other sides. Alternatively or additionally, a focusing means such as described in connection with FIG. 4 may be arranged, which is configured to change a focus of the multi-aperture imaging device. Although implementing the optical stabilizer 22 such that the same controls the first and the second relative movement as translational relative movements is possible for obtaining the optical image stabilization, implementing the second relative movement as a rotational movement 38 may be advantageous since, in this case, a translational movement of components along the second image axis 32 may be avoided. This direction may be parallel to a thickness direction of the multi-aperture imaging device 20, which, according to several embodiments, is to be kept as small as possible. Such an object may be achieved by the rotational movement.

Simply put, instead of a translational movement perpendicular to the relative movement 34, the rotational movement 38 may be used in order to obtain the optical image stabilization along the second image axis 32. This makes it possible to save installation space for enabling the translational relative movement perpendicular to the relative movement 34. For example, the translational relative movement may be arranged perpendicular to a thickness direction of the device so that the device may be implemented with a small thickness, i.e., in a thin manner. This offers particular advantages in the field of mobile devices, as these may be implemented with a flat housing.

The multi-aperture imaging device 20 comprises the electronic image stabilizer 41 that is configured to electronically stabilize the partial images that are projected on the image sensor areas 24a-h, that is, by manipulating the image data. For this purpose, different methods may be used individually or in combination, e.g., electronic vibration reducing (e-VR), Coolpix S4, Anti-Shake-DSP and/or Advanced Shake Reduction (ASR). The electronic image stabilizer 41 is configured to stabilize a first partial image of the image sensor areas 24a-h of a first optical channel 16a-h of the array 14 to a first extent. Furthermore, the electronic image stabilizer 41 may be configured to additionally stabilize a second partial image of the image sensor areas 24a-h of a different optical channel 16a-h of the array 14 to a second extent that differs from the first extent, i.e., in a channel-individual manner. The different optical channel can be an optical channel having the same or comparable optical characteristics or also an optical channel having optical characteristics, in particular the focal length, differing therefrom. In this case, the extent relates to an image correction that is executed along the first and the second image axis 28 and 32, wherein rotations around image axes and the like are also included in this case.

In implementations, the electronic image stabilizer 41 is configured to execute the electronic image stabilization in a channel-individual manner for each optical channel, i.e., for each of the partial images of the image sensor areas 24a-h. With this, different aberrations or even channel-individual aberrations may be corrected for the first and the second optical channel 16a-h.

The optics 64a-h of the optical channels may each comprise different optical characteristics. For example, a different optical characteristic is obtained by manufacturing tolerances so that the optics 64a-h differ from each other in a tolerance range of at most ±10%, at most ±5% or at most ±3% with respect to one or several optical characteristics such as focal length, field of view angle, optical diameter or the like.

It was recognized that, in the context of optical characteristics of the optics 64a-h that differ in a manufacturing-related manner, an optical image stabilization by a relative movement between the image sensor 12, the optics 64a-h of the respective optical channel and the beam-deflecting means 18 lead to the fact that the images in the image sensor areas 24a-d change in a different manner. This is at least partly due to the fact that the mechanical movement for achieving an optical image stabilization that is executed in the same manner for all optical channels, i.e., in a channel-global manner, leads to a different change of the optical path through the optics 64a-h. Now, the different optical characteristics affect the images of the image sensor areas 24a-h differently or even channel-individually. In other words, different image displacements per channel at relative movements between the beam-deflecting unit and/or the array and/or the image sensor affecting all channels in the same manner result in particular from the different focal lengths of the channels. This may be reduced, i.e., at least partially balanced out or compensated, by the electronic image stabilization that is combined with the optical image stabilization. This is to be highlighted based on the optical characteristic of focal length. With two different values of the optical focal length in optics that are directed to the same total field of view, the relative movement in the context of the optical image stabilization leads to the fact that the view axis and/or view direction of the optical channels are equally changed. Due to the different focal lengths in the optics 64a-h, however, the partial images in the image sensor areas 24a-h move differently, which may lead to a high computational effort or even to aberrations when joining the partial images, i.e. when performing the stitching.

For example, the array 14 may comprise a carrier 47 through which the optical channels 16a-h extend. For this, for example, the carrier 47 may be configured to be opaque and may comprise transparent areas for the optical channels 16a-h. Inside of or adjacent to the transparent areas and/or at end areas of the same, the optics 64a-h of the optical channels 16a-h may be arranged. Alternatively or additionally, the carrier 47 may be formed to be a transparent, and may, e.g., comprise a polymer material and/or a glass material. The optics (lenses) 64a-h that influence the projection of the respective partial field of view of the total field of view on the respective image sensor area 24a-h of the image sensor may be arranged at a surface of the carrier 47.

For example, the actuators 36 and/or 42 may be formed as a pneumatic actuator, a hydraulic actuator, a piezoelectric actuator, a direct-current motor, a stepper motor, a thermally-actuated actuator, an electrostatic actuator, an electrostrictive actuator, a magnetostrictive actuator or a moving coil drive.

For example, the beam-deflecting means 18 may be formed to be reflecting at least in areas. For example, the beam-deflecting means 18 may include areas or beam-deflecting elements 46a-d that are configured to deflect the optical paths 26 such that the deflected optical paths comprise different angles and capture different partial fields of view of a total field of view. The different angles may be created by the beam-deflecting means 18 and/or the optics 64a-h of the optical channels 16a-h. For example, the areas 46a-d may be formed as facets of a facet mirror. The facets may comprise different inclinations with respect to the array 14. This may enable a deflection, influence, drive and/or scattering of the optical paths 26 towards differently arranged partial fields of view. Alternatively, the beam-deflecting means 18 may be configured as a surface that is configured to be reflecting on one side or on two sides, e.g., as a mirror. This surface may be formed to be plane, or continuously curved in portions or plane, and/or discontinuously curved in portions or plane. A deflection of the optical paths 26 may alternatively or additionally be obtained by means of the optics 64a-h of the optical channels 16a-h.

In other words, a relative movement for the optical image stabilization causes the same mechanical deflection in all channels of the multi-aperture camera. However, the obtained image displacement that defines the actual mechanism of action of the optical image stabilization additionally depends on the focal length of the imaging optics of each channel. Thus, it is one recognition that, additionally to the optical image stabilization that is globally executed for all channels in the same manner, channel-individual electronic image stabilization is introduced. The beam-deflecting means may be used both for deflecting the view direction and also for the optical image stabilization.

The beam-deflecting means may be plane across the area of all channels, may comprise a continuous or discontinuous profile and/or may partially be plane, i.e., facetted, wherein the transitions between individual continuous or discontinuous profiles may additionally comprise local maskings for reducing the reflectivity or may comprise mechanical structures in order to reduce aberrations and/or to enable a stiffening of the structure so that aberrations that are induced by movement and/or that are thermally induced may be at a minimum.

Switching between the first position and the second position of the beam-deflecting means may occur in a rotational manner around the axis of rotation and/or along the axis of rotation 44 in a translational manner. A translational movement along the axis of rotation 44 may be executed in a continuous or discontinuous manner, e.g., in a bi-stable or multi-stable manner. For example, this may be understood as position-discrete positions between which the beam-deflecting means 18 is moved. For example, single-stable, bi-stable or multi-stable positions may be obtained by implementing the actuator 42 or another actuator as a stepper motor. For example, if the beam-deflecting means 18 is configured to be moved back and forth between two positions, e.g., one of the positions may be an idle position of the actuator or may be based thereon. For example, the actuator may be configured to execute the translational movement with respect to a spring force that applies a counterforce when reaching the respective other position, which moves the beam-deflecting means back to its starting position upon removing the force of the actuator. This means that a stable position may also be obtained in areas of a force diagram which do not comprise a local force minimum. For example, this may be a force maximum. Alternatively or additionally, a stable position may be obtained based on magnetic or mechanical forces between the beam-deflecting means 18 and a neighboring housing or substrate. This means that the actuator 42 or the other actuator may be configured for moving the beam-deflecting means in a translational manner in order to move the beam-deflecting means into a bi-stable or multi-stable position. Alternatively, simple mechanical stops may be provided for bi-stable arrangements of the positions, which define two end positions between which a position switch takes place in the defined end positions.

The electronic image stabilizer 41 can be used in the multi-aperture imaging device 10, such as in combination with the optical image stabilizer 22 but also independent thereof. A combination with the optical image stabilizer 22 offers advantages in particular for compensating differences of optical characteristics in the optics allocated to a common total field of view and/or that are configured in the same way but in fact have slight differences. Alternatively, the electronic image stabilizer 41 can also be used in the multi-aperture imaging device 10 without the optical image stabilizer, such as to correct the optical channel 16e with respect to the optical channels 16a-d or vice versa. The differences between the optics can be stored in the electronic image stabilizer 41 as functional contexts.

Figure 2B:
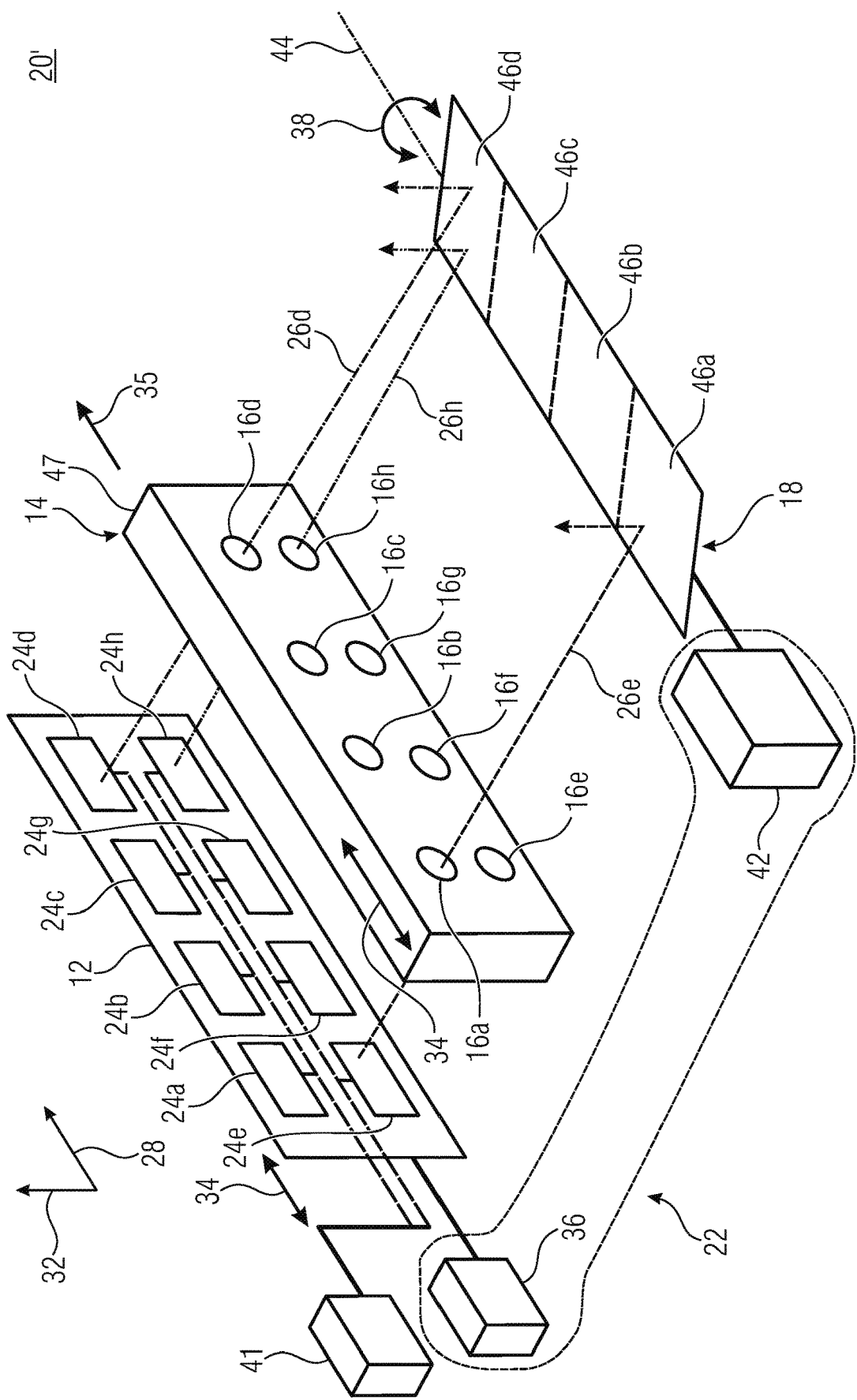
FIG. 2b a schematic view of a multi-aperture imaging device according to an embodiment, wherein an actuator is connected to an image sensor.

FIG. 2b shows a schematic view of a multi-aperture imaging device 20' according to an embodiment. With respect to the multi-aperture imaging device 20, the multi-aperture imaging device 20' is modified in that the actuator 36 is mechanically connected to the image sensor 12 and configured to move the image sensor 12 relative to the array 14. The relative movement 34 may be executed in parallel to the line extension direction 35 and perpendicularly to the optical paths 26.

Figure 3A:
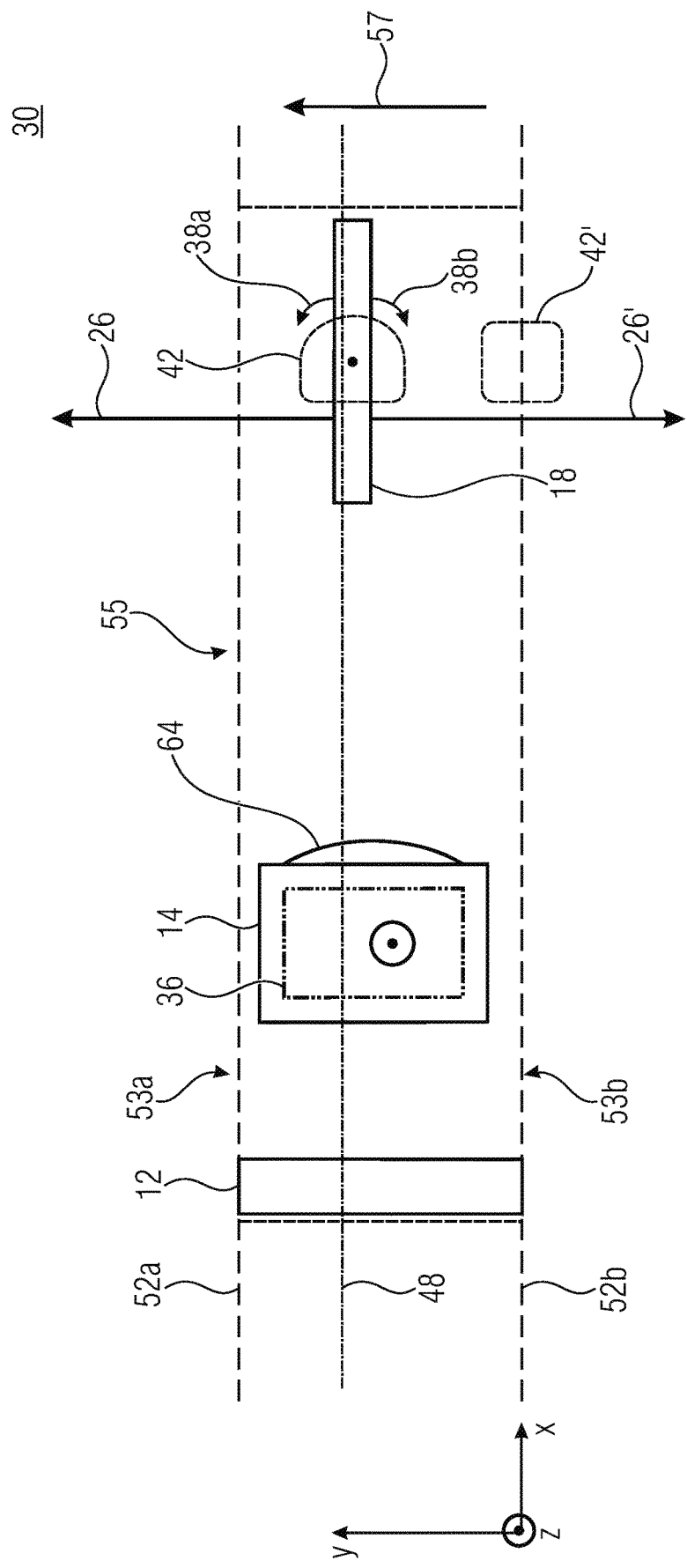
FIG. 3a a schematic side-sectional view of a further multi-aperture imaging device according to an embodiment.

FIG. 3a shows a schematic side-sectional view of a multi-aperture imaging device 30 according to an embodiment. For example, the multi-aperture imaging device 30 may modify the multi-aperture imaging device 20 in that the actuators 36 and/or 42 are arranged such that the same are arranged at least partially between two planes 52a and 52b that are spanned by sides 53a and 53b of a cuboid 55. The sides 53a and 53b of the cuboid 55 may be oriented in parallel to each other and in parallel to the line extension direction of the array and of a part of the optical path of the optical channels between the image sensor and the beam-deflecting means. The volume of the cuboid 55 is at a minimum and still includes the image sensor 12, the array 14 and the beam-deflecting means 18 as well as their operational movements. Optical channels of the array 14 comprise optics 64 that may be formed to be the same for each optical channel or that may be different.

A volume of the multi-aperture imaging device may comprise a low or minimal installation space between the planes 52a and 52b. An installation space of the multi-aperture imaging device may be large or arbitrarily large along the lateral sides or the extension directions of the planes 52a and/or 52b. For example, the volume of the virtual cuboid is affected by an arrangement of the image sensor 12, the single-line array 14 and the beam-deflecting means, wherein the arrangement of these components according to the embodiments described herein may be carried out such that the installation space of these components along the direction perpendicular to the planes and therefore also the distance between the planes 52a and 52b with respect to each other become low or a minimum. Implementing the multi-aperture imaging device as thinly as possible is desired particularly in the area of mobile applications, e.g., for mobile telephones or tablets. With respect to other arrangements of the components, the volume and/or the distance of other sides of the virtual cuboid may be increased.

The virtual cuboid 55 is illustrated by dotted lines. The planes 52a and 52b may include two sides of the virtual cuboid 55 or may be spanned thereby. A thickness direction 57 of the multi-aperture imaging device 30 may be arranged to be normal to the planes 52a and/or 52b and/or parallel to the y direction.

The image sensor 12, the array 14 and the beam-deflecting means 18 may be arranged such that a perpendicular distance between the planes 52a and 52b along the thickness direction 57 is at a minimum, which may be referred to as a height of the cuboid for reasons of simplification but without having a limiting effect, wherein a miniaturization of the volume, i.e., the other dimensions of the cuboid, may be omitted. An expansion of the cuboid 55 along the direction 57 may be a minimum and may essentially be predefined by the expansion of the optical components of the imaging channels, i.e., the array 14, the image sensor 12 and the beam-deflecting means 18, along the direction 57.

A volume of the multi-aperture imaging device may comprise a low or minimal installation space between the planes 52a and 52b. An installation space of the multi-aperture imaging device may be large or arbitrarily large along the lateral sides or the extension directions of the planes 52a and/or 52b. For example, the volume of the virtual cuboid is affected by an arrangement of the image sensor 12, the single-line array 14 and the beam-deflecting means, wherein the arrangement of these components according to the embodiments described herein may be carried out such that the installation space of these components along the direction perpendicular to the planes and therefore also the distance between the planes 52a and 52b with respect to each other become low or a minimum. With respect to other arrangements of the components, the volume and/or the distance of other sides of the virtual cuboid may be increased.

The actuators, e.g., the actuator 36 and/or 42, of the multi-aperture imaging device may comprise a dimension or expansion in parallel to the direction 57. A percentage of not more than 50%, not more than 30% or not more than 10% of the dimension of the actuator or the actuators may, starting from an area between the planes 52a and 52b, extend beyond the plane 52a and/or 52b or extend out of the area. This means, that the actuators extend beyond the plane 52a and/or 52b not more than in an insignificant manner. According to embodiments, the actuators do not extend beyond the planes 52a and 52b. In this case, it is advantageous that an expansion of the multi-aperture imaging device 10 along the thickness direction, or direction 57, is not increased by the actuators.

The image stabilizer 22 and/or the actuators 36 and/or 42 may comprise a dimension or expansion in parallel to the thickness direction 57. A percentage of not more than 50%, not more than 30% or not more than 10% of the dimension may, starting from an area between the planes 52a and 52b, extend beyond the plane 52a and/or 52b or extend out of the area, e.g., as is illustrated for the actuator 42', which indicates an offset arrangement of the actuator 42. This means that the actuators 36 and/or 42 extend beyond the plane 52a and/or 52b not more than in an insignificant manner. According to embodiments, the actuators 36 and/or 42 do not extend beyond the planes 52a and 52b. In this case, it is advantageous that an expansion of the multi-aperture imaging device 30 along the thickness direction 57 is not increased by the actuators 36 and/or 42.

Although terms such as up, down, left, right, front or back are used herein for reasons of a better clarity, these are not intended to have any limiting effect. It is understood that these terms are mutually exchangeable based on a rotation or tilt in the space. For example, starting from the image sensor 12 towards the beam-deflecting means 18, the x direction may be understood to be the front or to be forward. For example, a positive y direction may be understood to be up. An area along the positive or negative z direction away from or spaced apart from the image sensor 12, the array 14 and/or the beam-deflecting means 18 may be understood to be next to the respective component. Simply put, the image stabilizer may at least include one actuator 36 and/or 42. The at least one actuator 36 and/or 42 may be arranged in the plane 48 or between the planes 52a and 52b, respectively.

In other words, the actuators 36 and/or 42 may be arranged in front of, behind or next to the image sensor 12, the array 14 and/or the beam-deflecting means 18. According to embodiments, the actuators 36 and 42 are arranged outside of the area between the planes 52a and 52b with a maximum extent of 50%, 30% or 10%. This means that the at least one actuator 36 and/or the image stabilizer 22 along the thickness direction 57 perpendicular to the plane 48 extends out of the plane, or the area between the maximum dimensions 52a-52b, by not more than 50% of the dimension of the actuator 36 and/or 42 of the image stabilizer along the thickness direction 57. This enables a small dimension of the multi-aperture imaging device 30 along the thickness direction 57.

Figure 3B:
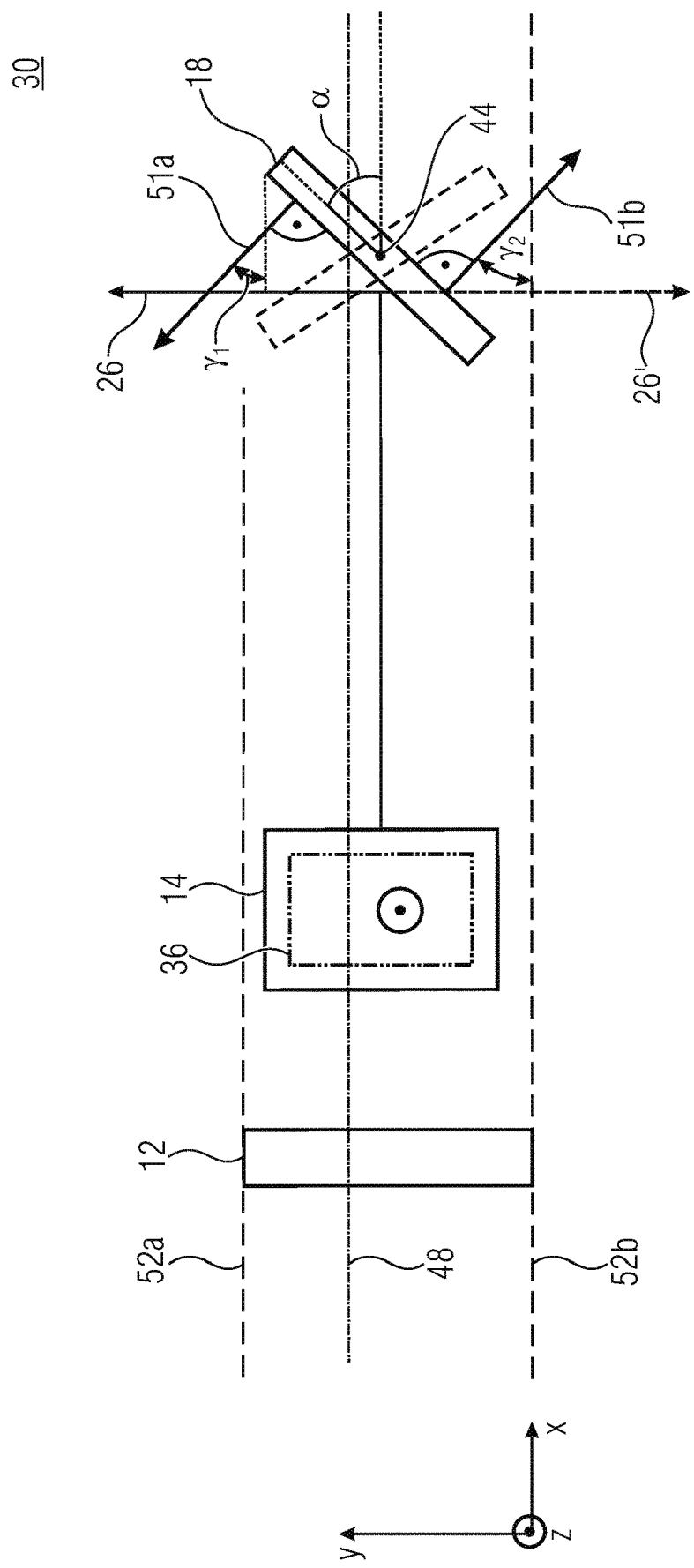

FIG. 3b shows a schematic side-sectional view of the multi-aperture imaging device 30, wherein the optical paths 26 and 26' indicate different view directions of the multi-aperture imaging device 30. The multi-aperture imaging device may be configured to change a tilt of the beam-deflecting means by an angle α so that different main sides of the beam-deflecting means 18 are arranged facing the array 14 in an alternating manner. This means that the different viewing directions can be obtained based on a rotational movement of the beam-deflecting means 18 as already mentioned above. The multi-aperture imaging device 30 may include an actuator that is configured to tilt the beam-deflecting means 18 around the axis of rotation 44. For example, the actuator may be configured to move the beam-deflecting means 18 into a first position in which the beam-deflecting means 18 deflects the optical path 26 of the optical channels of the array 14 into the positive y direction. For this, in the first position, the beam-deflecting means 18 may, e.g., comprise an angle α of >0° and <90°, of at least 10° and not more than 80° or of at least 30° and not more than 50°, e.g., 45°. The actuator may be configured to deflect the beam-deflecting means in a second position in such a way around the axis of rotation 44 that the beam-deflecting means 18 deflects the optical path of the optical channels of the array 14 towards the negative y direction, as is illustrated by the optical path 26' and the dotted illustration of the beam-deflecting means 18. For example, the beam-deflecting means 18 may be configured to be reflecting on both sides so that, in the first position, a first optical path 26 or 26', respectively, is deflected or reflected. According to an advantageous implementation, the multi-aperture imaging device 30 is configured to execute a switch between the first position and the second position such that, between the two positions, an auxiliary side is associated to the array 14 but such than an orientation according to which a main side entirely faces the array 14 is avoided. This may also be understood such that, during a switch between the first and the second operation states or positions by the rotational movement, a surface normal 51a of the first main side and a second surface normal 51b of the second main side comprise at each point in time an angle $\gamma_1$ and $\gamma_2$ of at least 10° with respect to a direction towards the image sensor and, if applicable, parallel to a surface normal of the image sensor 12. In this way, it may be avoided that one of the angles $\gamma_1$ and $\gamma_2$ is 0° or 180°, which could indicate a large or approximately maximum expansion of the beam-deflecting means 18 along the thickness direction.

Figure 4:
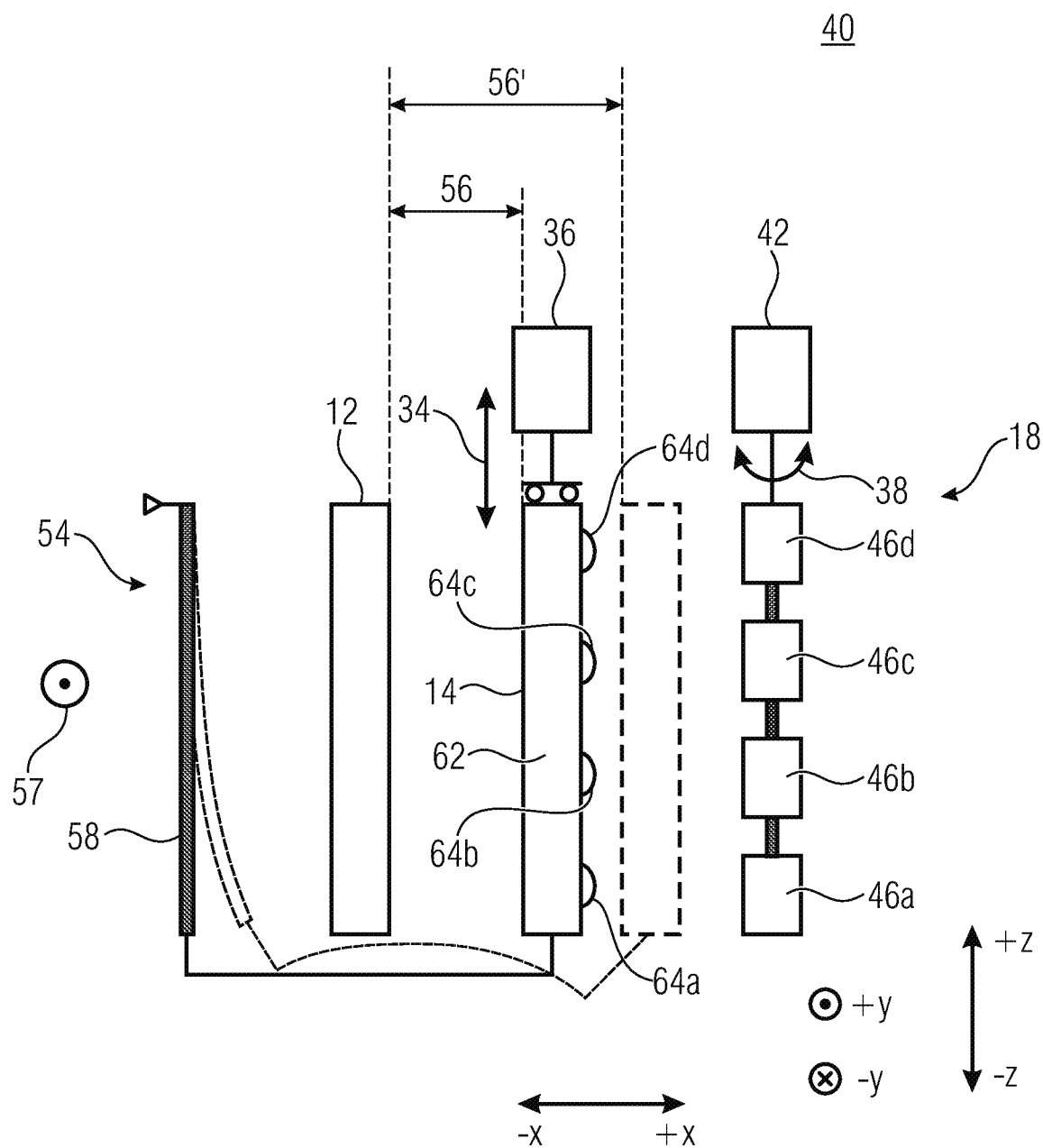
FIG. 4 a schematic top view of a multi-aperture imaging device, wherein a beam-deflecting means includes various beam-deflecting elements, according to an embodiment.

FIG. 4 shows a schematic top view of a multi-aperture imaging device 40 according to an embodiment. Compared to the above multi-aperture imaging devices, the multi-aperture imaging device 40 may be modified such that the multi-aperture imaging device 40 includes a focusing means 54 that is configured to change a focus of the multi-aperture imaging device 40. This may be carried out based on a variable distance 56 between the image sensor 12 and the array 14, as is illustrated by the distance 56'.

The focusing means 54 may include an actuator 58 that is configured, upon an actuation, to be deformed and/or to provide a relative movement between the image sensor 12 and the array 14. This is exemplarily illustrated for the multi-aperture imaging device 40 such that the actuator 58 is configured to displace the array 14 along the positive and/or the negative x direction with respect to the image sensor 12. For example, the array 14 may be supported at one side such that, based upon an actuation of the actuator 58, it is moved along a positive or negative x direction and essentially remains unmoved along a positive and/or negative z direction. An additional movement along the positive and/or negative z direction for an optical image stabilization may be obtained, e.g., based on an actuation of the actuator 36. According to further embodiments, the actuator 58 and/or the focusing means 54 is configured to obtain the relative movement between the image sensor 12 and the array 14 along the x axis based on a translational displacement of the image sensor 12 with respect to the array 14. According to further embodiments, the image sensor 12 and the array 14 may be moved. According to further embodiments, the focusing means 54 may comprise at least one further actuator. For example, a first actuator and a second actuator may be arranged at two opposing areas of the array 14 so that, upon an actuation of the actuators, a requirement for a support of the moveable array 14 (alternatively or additionally to the image sensor 12) is reduced. Additionally, the actuator 58 or a further actuator may be configured to keep a distance between the single-line array 14 and the beam-deflecting means 18 essentially or, even when not using an additional actuator, exactly constant, i.e., to move the beam-deflecting means 18 to such an extent as the signal-line array 14. The focusing means 54 may be configured to enable an autofocus function by a relative translational movement (focusing movement) between the image sensor 12 and the array 14 along a surface normal of the image sensor 12. In this case, the beam-deflecting means 18 may be moved simultaneously to the focusing movement by a corresponding constructive implementation or a usage of the actuator 42 or of a further actuator. This means that a distance between the array 14 and the beam-deflecting means remains unchanged and/or that the beam-deflecting means 18 is moved in a simultaneous or time-offset manner to a same or comparable extent as the focusing movement so that, at least at a point in time of capturing the field of view by the multi-aperture imaging device, the distance is unchanged compared to a distance before changing the focus. This may be carried out such that the beam-deflecting means 18 is moved together with the actuator 42, i.e., simultaneously, so that a distance between the array 14 and the beam-deflecting means remains constant or is compensated. This means that a distance between the array 14 and the beam-deflecting means 18 may remain unchanged and/or that the beam-deflecting means 18 may be moved in a simultaneous or time-offset manner to a same or comparable extent as the focusing movement so that, at least at a point in time of capturing the field of view by the multi-aperture imaging device, the distance between the array 14 and the beam-deflecting means 18 is unchanged compared to a distance before changing the focus. Alternatively, the beam-deflecting means 18 may be idle or may be excluded from the autofocus movement.

For example, the actuator 58 may be implemented as a piezoelectric actuator such as a bending bar (e.g., a bimorph, a trimorph or the like). Alternatively or additionally, the focusing means 54 may include a moving coil drive, a pneumatic actuator, a hydraulic actuator, a direct current motor, a stepper motor, an actuator or a bending bar that may be thermally actuated, an electrostatic actuator, an actuator with shape-memory alloys, an electrostrictive and/or an magnetostrictive drive.

As described in connection with the image stabilizer and an arrangement of the same in the plane 48 and/or in an area between the plane 52a and 52b, the at least one actuator 58 of the focusing means 54 may at least partially be arranged between the planes 52a and 52b. Alternatively or additionally, the at least one actuator 58 may be arranged in a plane in which the image sensor 12, the array 14 and the beam-deflecting means 18 are arranged. For example, the actuator 58 of the focusing means 54 along the thickness direction 57 perpendicular to the plane 48, in which the image sensor 12, the array 14 and the beam-deflecting means 18 are arranged, may extend out of the area between the planes 52a and 52b by not more than 50% of the dimension of the actuator 58 of the focusing means 54 along the thickness direction 57. According to embodiments, the actuator extends out of the area between the planes 52a and 52b by not more than 30%. According to another embodiment, the actuator 54 extends out of the area by not more than 10% or is located entirely inside of the area. This means that, along the thickness direction 57, no additional installation space needs are used for the focusing means 54, which is advantageous. For example, if the array 14 comprises a transparent substrate (carrier) 62 having lenses 64a-d arranged thereat, a dimension of the array 14 and, if applicable, of the multi-aperture imaging device 40 along the thickness direction 57 may be small or a minimum. With reference to FIG. 3a, this may indicate that the cuboid 55 comprises a small thickness along the direction 57 or that the thickness is unaffected by the substrate 62. The substrate 62 may be passed by the optical paths that are used for imaging in the individual optical channels. The optical channels of the multi-aperture imaging device may traverse the substrate 62 between the beam-deflecting means 18 and an image sensor 12.

For example, the lenses 64a-d may be liquid lenses, i.e., an actuator may be configured to drive the lenses 64a-d. Liquid lenses may be configured to adjust and to vary individually per channel the refractive power and, therefore, the local length and the image position.

Figure 5A:
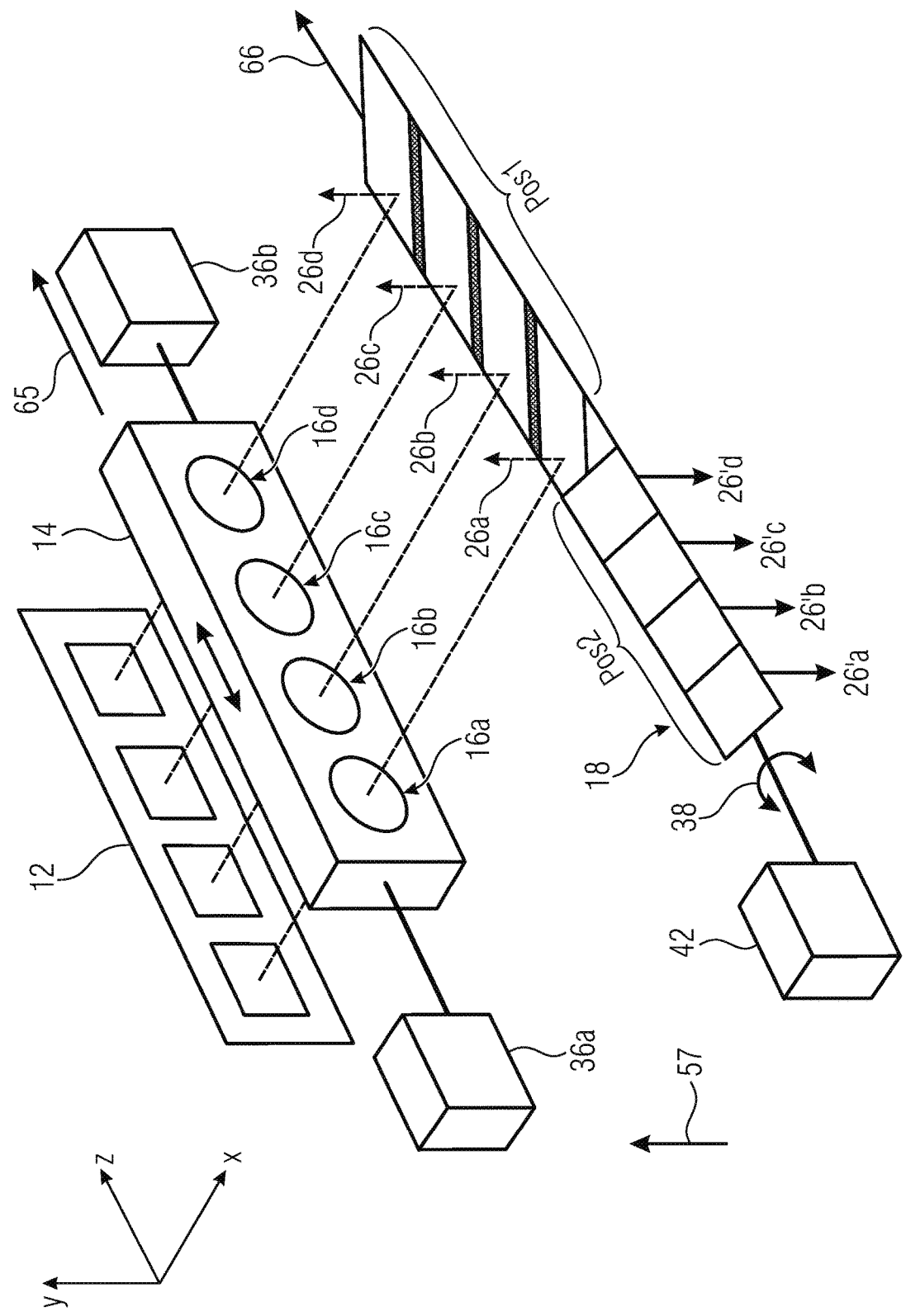
FIG. 5a a schematic perspective view of a multi-aperture imaging device having optical channels that are arranged in a single-line manner, according to an embodiment.

FIG. 5a shows a schematic perspective view of a multi-aperture imaging device 50 according to an embodiment. For example, compared to the multi-aperture imaging device 20, the array 14 is configured in a single-line manner like in the multi-aperture imaging device 10, which means that all optical channels 16a-d may be arranged along a line extension direction of the array 14 in a single line. The term single-line may also indicate an absence of further lines. A single-line implementation of the array 14 enables a small dimension of the array and, possibly, of the multi-aperture imaging device 50 along the thickness direction 57. The optical image stabilizer includes actuators 36a and 36b that together form the actuator 36, which means that an actuator described herein may also be implemented by several actuators or control elements, and/or several actuators may be combined to a mutual actuator.

The multi-aperture imaging device 50 may be configured to, based on the beam-deflecting means 18, capture fields of view in different directions. For example, the beam-deflecting means may comprise a first position Pos1 and a second position Pos2. Based on a translational or rotational movement, the beam-deflecting means may be switchable between the first position Pos1 and the second position Pos2. For example, the beam-deflecting means 18 may be moved along the line extension direction z of the single-line array 14 in a translational manner, e.g., as is indicated by a translational movement 66. For example, the translational movement 66 may essentially be arranged in parallel to a line extension direction 65 along which the at least one line of the array 14 is arranged. For example, the translational movement may be used in order to place different facets in front of the optics of the optical channels 16a-d in order to obtain different view directions of the multi-aperture imaging device 50. The beam-deflecting means 18 may be configured to deflect, in the first position Pos1, the optical paths 26a-d in a first direction, e.g., at least partially in a positive y direction. The beam-deflecting means 18 may be configured to direct, in the second position Pos2, the optical paths 26a-d, i.e., of each optical channel 16a-d, in a different direction, e.g., at least partially along the negative y direction. For example, the actuator 42 may be configured to move, based on a movement of the beam-deflecting means 18 along the movement direction 66, the beam-deflecting means 18 from the first position Pos1 to the second position Pos2. The actuator 42 may be configured to overlap the translational movement along the movement direction 66 with the rotational movement 38. Alternatively, the multi-aperture imaging device 50 may also include a further actuator that is configured to move the beam-deflecting means along the movement direction 66 or opposite thereto.

As is described in connection with FIG. 3b, the actuator 42 may be configured to obtain the first and/or the second position of the beam-deflecting means 18 based on a rotation of the same. The movement between the first position Pos1 and the second position Pos2 may be overlapped with the rotational movement 38 both for a rotational movement for switching between the positions and also for the translational movement along the direction 66.

With reference to FIG. 1b that shows a schematic illustration of two total fields of view 70a and 70b, e.g., as they may be captured with a multi-aperture imaging device as previously described, e.g., the multi-aperture imaging device 10, 10", 10''', 20, 20', 30, 40 and/or 50, wherein, e.g., the multi-aperture imaging device 20 may subdivide the total field of view 70a into a larger or smaller number of partial fields of view 72a-d. The optical paths of the optical channels of the multi-aperture imaging devices may be directed to different partial fields of view 72a-d, wherein a partial field of view 72a-d may be associated to each optical channel. For example, the partial fields of view 72a-d overlap with each other in order to enable joining individual partial images into a total image. If the multi-aperture imaging device comprises a number of optical channels that is different from four, the total field of view 70 may comprise a number of partial fields of view that is different from four. Alternatively or additionally, at least one partial field of view 72a-d may be captured by a second or a larger number of optical channels of a larger number of modules (multi-aperture imaging devices) in order to implement stereo cameras, trio cameras, quartet cameras in order to be able to capture three-dimensional object data therewith. The modules may be implemented individually or as a linked system and may be arranged at any location in a housing of the multi-aperture imaging device. The images of the different modules that together form the stereo cameras, trio cameras, quartet cameras may be displaced by fractions of a pixel and may be configured to implement methods of the super resolution. A number of optical channels and/or a number of multi-aperture imaging devices and/or a number of partial fields of view is, e.g., arbitrary and may comprise a number of at least two, at least three, at least four, at least ten, at least 20 or any higher value. The optical channels of the further line may also capture respective overlapping partial areas and may together cover the total field of view. This enables obtaining a stereo structure, trio structure, quartet structure, etc. of array cameras that consist of channels that partially overlap and that cover the total field of view in their partial grouping.

Figure 5B:
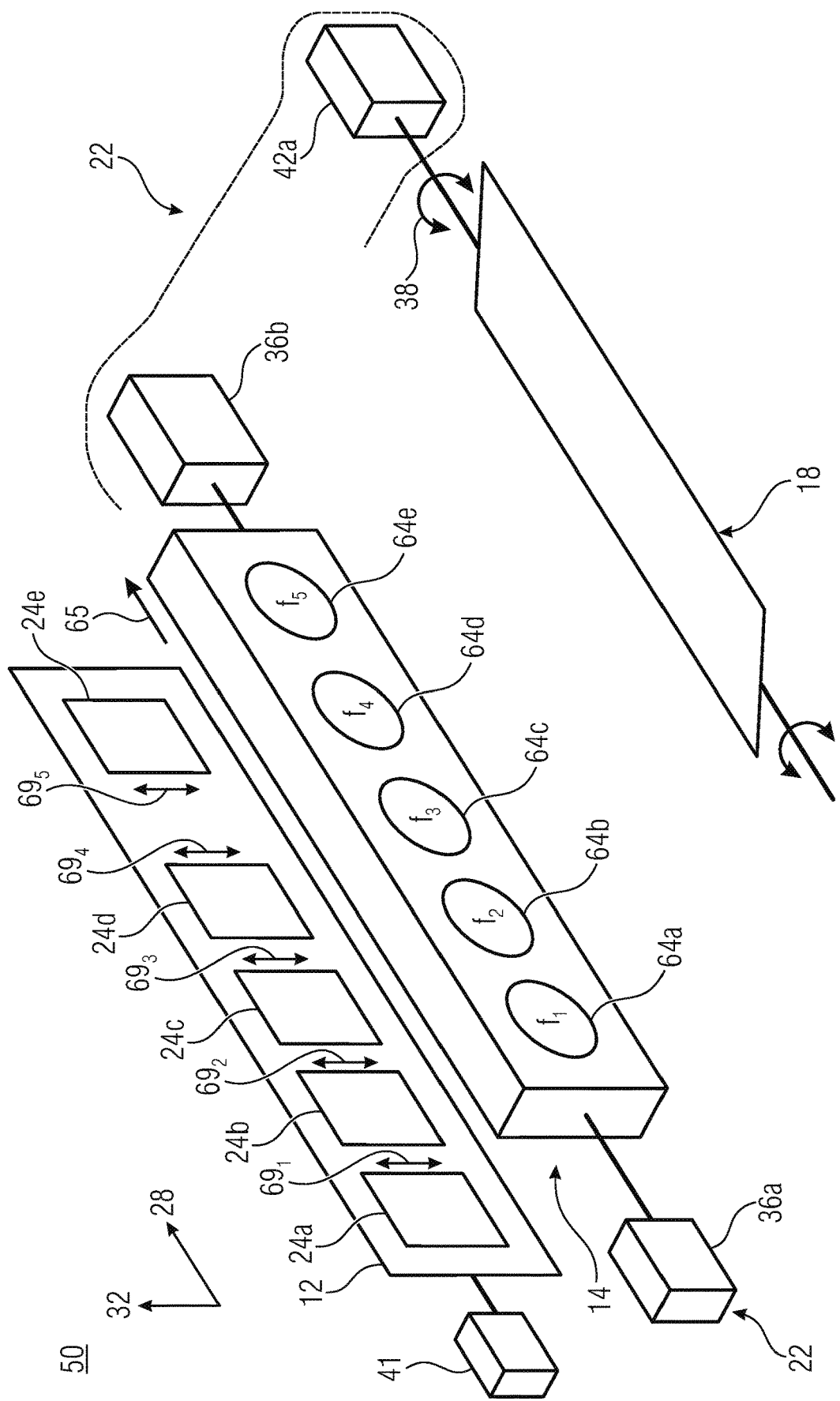
FIG. 5b a schematic perspective illustration of the multi-aperture imaging device of FIG. 5a, which is used as a basis for describing an advantageous implementation of a combination of the optical image stabilization and the electronic image stabilization.

FIG. 5b is a schematic perspective illustration of the multi-aperture imaging device 50, based on which an advantageous implementation of a combination of the optical image stabilization and the electronic image stabilization is explained. The optical image stabilizer 22 includes actuators 36a, 36b and 42, wherein the actuators 36a and 36b are configured to obtain the optical image stabilization of the images of the partial fields of view in the image sensor areas 24a to 24d by displacing the array 14 along the line extension direction 65. Furthermore, e.g., the optical image stabilizer is configured to obtain an optical image stabilization along the image axis 32 by the rotational movement 38. For example, the optics 64a-d of the array 14 comprise a focal length $f_1$ to $f_4$ that are different from each other in a tolerance range of not more than 10%, not more than 5% or not more than 3%, wherein the optics 64e comprises a focal length $f_5$ that differs by at least 10% as described for the optics 64e of the multi-aperture imaging device 10. The channel-global rotational movement 38 together with the different focal lengths $f_5$ and $f_1$ to $f_4$ as well as possibly together with different focal lengths $f_1$ to $f_4$ leads to a different displacement $69_1$ to $69_5$ of the images in the image sensor areas 24a-e. This means that the optical image stabilizer 22 achieves different effects in the images due to the channel-global rotational movement 38 so that at least one, several or all images deviate from a theoretical aberration-free state. The optical image stabilizer 22 may be configured to globally minimize the deviations of all images, however, which may lead to the fact that aberrations are created in each of the images. Alternatively, the optical image stabilizer 22 may be configured to select a reference image in one of the image sensor areas 22 and to execute the control of the actuator 42 such that the image in the reference image or in the reference channel is as accurate as possible, which may also be referred to as aberration-free. This means that, due to the channel-global optical image stabilization, a channel may be kept aberration-free with respect to the affected image direction, while the other channels deviate from this reference image due to the different focal lengths $f_1$ to $f_5$. The different optical channels can be at least one optical channel having the same or comparable optical characteristic and/or at least one optical channel having a different optical characteristic, wherein the optical characteristic can in particular be the focal length. In other words, a channel is corrected with the mechanically realized optical image stabilizer which has the same effect for all channels, however, which does not keep all channels stable. These further channels are additionally corrected with the electronic image stabilizer.

The electronic image stabilizer 41 may be configured to execute channel-individual electronic image stabilization in each channel according to a determined functional connection that depends on the relative movements between the image sensor 12, the array 14 and the beam-deflecting means 18. The electronic image stabilizer 41 may be configured to stabilize each image individually. For this, the electronic image stabilizer 41 may use global values, e.g., the camera movement or the like, in order to increase the optical quality of the images. It is particularly advantageous if the electronic image stabilizer 41 is configured to execute an electronic image correction starting from a reference image of the optical image stabilizer 22. The different focal lengths may provide the functional connection between the different changes in the images by the optical image stabilization preferably in a linear form, e.g., in the form of:

$$\text{aberration}=f(f_i,\text{relative movement}),$$

which means that the aberration may be illustrated globally or with respect to the reference channel as a function of the focal length or of focal length differences and the executed relative movement for changing the view direction or for the optical image stabilization. The electronic image stabilizer 41 may link an extent or a relative movement between the image sensor 12, the array 14 and the beam-deflecting means 18 with the focal lengths $f_1$ to $f_4$ and $f_5$ or focal length differences with respect to the reference channel in order to obtain reliable information about the electronic image stabilization to be executed, and in order to create the functional connection and/or to use the same. The used data of the optical characteristics and/or of the functional connection may be obtained during a calibration. The alignment of images with respect to each other for determining a displacement of one image with respect to another image may also be carried by determining a matching feature in the images of the partial fields of view, e.g., edge progressions, objects sizes or the like. For example, this may be identified by the electronic image sensor 41 that may further be configured to provide the electronic image stabilization based on a comparison of movements of the features in the first and the second image. Thus, the channel-individual electronic image stabilization may be carried out by a channel-individual image evaluation of the movement of image details.

Alternatively or additionally to a comparison in different images, a comparison of the feature may also be carried out in the same image, in particular with respect to two captured images or frames that are temporally spaced apart. The optical image stabilizer 41 may be configured to identify a matching feature in the corresponding partial image at a first point in time and at a point in time, and to provide the electronic image stabilization based on a comparison of movements of the feature in the first image. For example, the comparison may indicate a displacement by which the feature has been displaced by the relative movement and by which the image is to be displaced back in order to at least partially correct the aberration.

The optical image stabilizer may be used in order to stabilize an image of the imaged partial field of view of a reference channel such as the image in the image sensor area 24*a*. For example, the electronic image stabilizer 41 is configured to execute an image stabilization for optical channels different from the reference channel, which project on the image sensor areas 24*b*, 24*c*, 24*d* and 24*e* in a channel-individual manner. The multi-aperture imaging device may be configured to stabilize the reference channel exclusively in an optical manner. This means that in an implementation, a sufficiently good image stabilization may be achieved in a reference channel by solely using the mechanically achieved optical image stabilization. For the other channels, an electronic image stabilization is additionally carried out in order to partially or entirely compensate the above-described effect of an insufficient optical image stabilization due to focal length differences, wherein the electronic stabilization is carried out individually in each channel.

According to a further embodiment, it is further possible that each channel of the multi-aperture imaging device comprises individual electronic image stabilization. The electronic image stabilization individually carried out for each channel of the multi-aperture imaging device may be carried out such that a determined functional connection between the image displacements to be realized in the individual channels is used. For example, the displacement along the direction 32 in a channel is 1.1 times, 1.007 times, 1.3 times or 2 times or 5 times the displacement along the direction 32 in another image. Furthermore, this channel-individual functional connection may depend on the relative movements between the beam-deflecting unit and/or the array and/or the image sensor, wherein the same may be linear or may correspond to an angular function that projects a rotation angle of the beam-deflecting means on an extent of the electronic image stabilization along the image direction. An identical connection may be achieved for the direction 28 with the same or with different values.

For all embodiments, it is true that the realized relative movements may be captured by corresponding additional sensors such as gyroscopes and the like, or may be derived from the captured image data of one, several or all channels. This data or information may be used for the optical and/or electronic image stabilization, which means that, e.g., the multi-aperture imaging device is configured to receive a sensor signal from a sensor, and to evaluate the sensor signal with respect to an information that is correlated with a relative movement between the multi-aperture imaging device and the object, and to execute a control of the optical and/or electronic image stabilizer using this information.

The optical image stabilizer may be configured to obtain the optical image stabilization along the image axes 28 and 32 by moving various components, e.g., the array 14, for the stabilization along the direction 28 and the rotation 38 of the beam-deflecting means for the stabilization along the direction 32. In both cases, differences in the optics 64*a-d* and 64*e* and possibly within optics 64*a-d* have an effect. The previous discussions with respect to the electronic image stabilization may be implemented for both relative movements. In particular, viewing the directions 28 and 32 separately enables a consideration of various deviations between the optics 64*a-e* along the directions 28 and 32.

Embodiments described herein may use a mutual image axis 28 and/or 32 for the partial images in the image sensor areas 24*a-e*. Alternatively, the directions may differ and may be converted into each other.

Figure 6A:
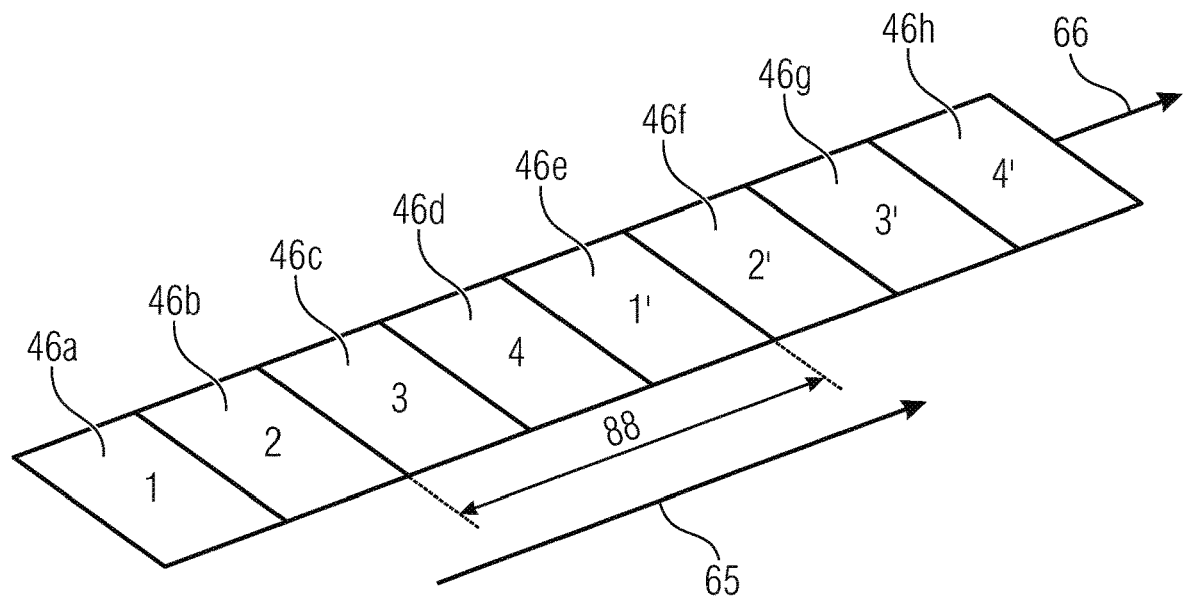
FIG. 6a a schematic illustration of a beam-deflecting means that is formed as an array of facets according to an embodiment.

FIG. 6*a* shows a schematic illustration of a beam-deflecting means 18 that is formed as an array of facets 46*a-h*. For example, if the beam-deflecting means 18 is positioned in the first position, the facets 46*a-d* indicated with numbers 1, 2, 3 and 4, respectively, may deflect optical paths of four optical channels in a first direction. If the beam-deflecting means 18 comprises the second position, the optical path of each optical channel may be deflected in the second direction based on the facets 46*e-h*, as is indicated by numbers 1', 2', 3' and 4', respectively. For example, the facets 46*a-d* and 46*e-h* may be referred to as being arranged in blocks. A distance 88 that essentially corresponds to an extension length of the number of the optical channels along the line extension direction 65 may be covered for the translational movement of the beam-deflecting means 18 along the translational direction 66. According to the embodiment of FIG. 5*a*, e.g., this is an expansion of four optical channels along the line extension direction 65. According to a further embodiment, the number of beam-deflecting elements may differ from a multiple of the optical channels. At least one beam-deflecting element may be configured or arranged in a position of the beam-deflecting means in order to deflect optical paths of at least two optical channels.

Figure 6B:
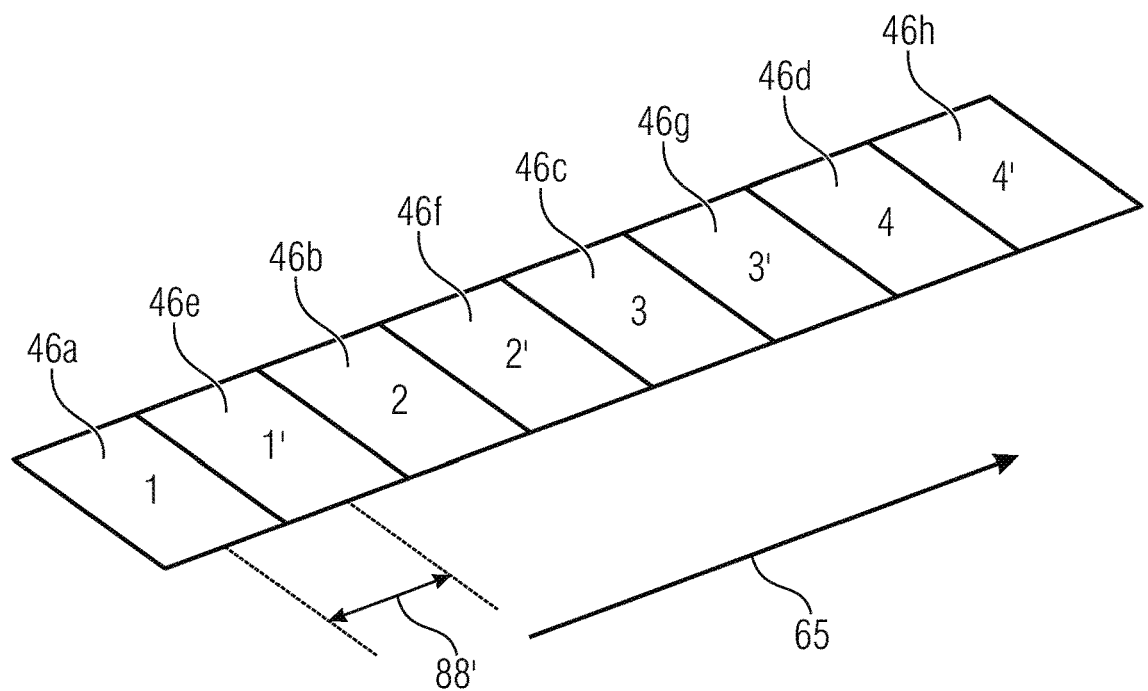
FIG. 6b a schematic view of the beam-deflecting means according to an embodiment, wherein, as compared to the illustration in FIG. 6a, facets comprise a different sorting.

FIG. 6*b* shows a schematic view of the beam-deflecting means 18, wherein the facets 46*a-g* comprise a different order in comparison to the illustration in FIG. 6*a*. The beam-deflecting means illustrated in FIG. 6*b* comprises an alternating arrangement of the optical channels 46*a-g* for each optical channel, as is indicated by the order 1, 1', 2, 2', 3, 3', 4 and 4'. This enables a distance 88' along which the beam-deflecting means 18 is moved in order to be switched between the first position and the second position. Compared to the distance 88 of FIG. 6*a*, the distance 88' may be small. For example, the distance 88' may essentially correspond to the distance in between two neighboring optical channels of the array 14. For example, two optical channels may comprise a distance or a gap with respect to each other that essentially at least corresponds to a dimension of a facet along the movement direction 65. The distance 88' may also be different from this, e.g., if a beam-deflecting element is configured or arranged in a position of the beam-deflecting means in order to deflect optical paths of at least two optical channels.

Advantageous implementations of the beam-deflecting means 18 are described based on FIG. 7*a-h*. The implementations show a number of advantages that may be executed individually or in any combinations, however, these are not intended to have a limiting effect.

Figure 7A:
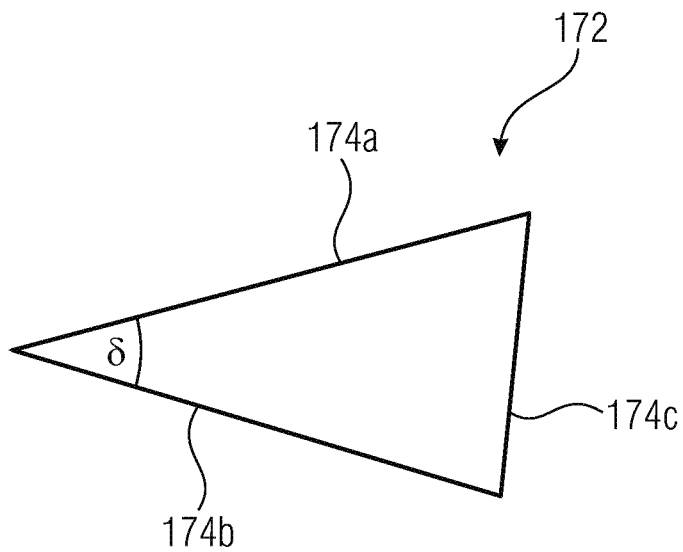
FIGS. 7a-h advantageous implementations of a beam-deflecting means according to embodiments.

FIG. 7*a* shows a schematic side-sectional view of a beam-deflecting element 172 that may be used as one of the beam-deflecting areas 46 in beam-deflecting means described herein. The beam-deflecting element 172 may be operable for one, a plurality or all of the optical channels 16*a-d* and may comprise a polygonal chain-like cross-section. Although a triangular cross-section is shown, it may be any other polygon.

Alternatively or additionally, the cross-section may also comprise at least one curved surface, wherein a plane configuration at least in portions may be advantageous, in particular in reflecting surfaces, in order to avoid aberrations. The two main sides 174*a* and 174*b* may be inclined towards each other by an angle δ. The angle δ may comprise a value between 1° and 89°, preferably comprises a value between 5° and 60°, and particularly preferably comprises a value between 10° and 30°. Thus, the main sides 174a and 174b are preferably arranged to be inclined with respect to each other at an angle of not more than 60°.

For example, the beam-deflecting element 172 comprises a first side 174a, a second side 174b and a third side 174c. At least two sides, such as the sides 174a and 174b, are configured to be reflective so that the beam-deflecting element 172 is configured to be reflective on two sides. The sides 174a and 174b may be main sides of the beam-deflecting element 172, i.e., sides with a surface that is larger than the side 174c.

In other words, the beam-deflecting element 172 may be formed to be wedge-shaped and to be reflective on two sides. A further surface that is, however, substantially smaller than the surface 174c may be arranged opposite to the surface 174c, i.e., between the surfaces 174a and 174b. In other words, the wedge that is formed by the surfaces 174a, 174b and 174c does not arbitrarily taper, but is provided with a surface at the pointed side and is therefore dull.

Figure 7B:
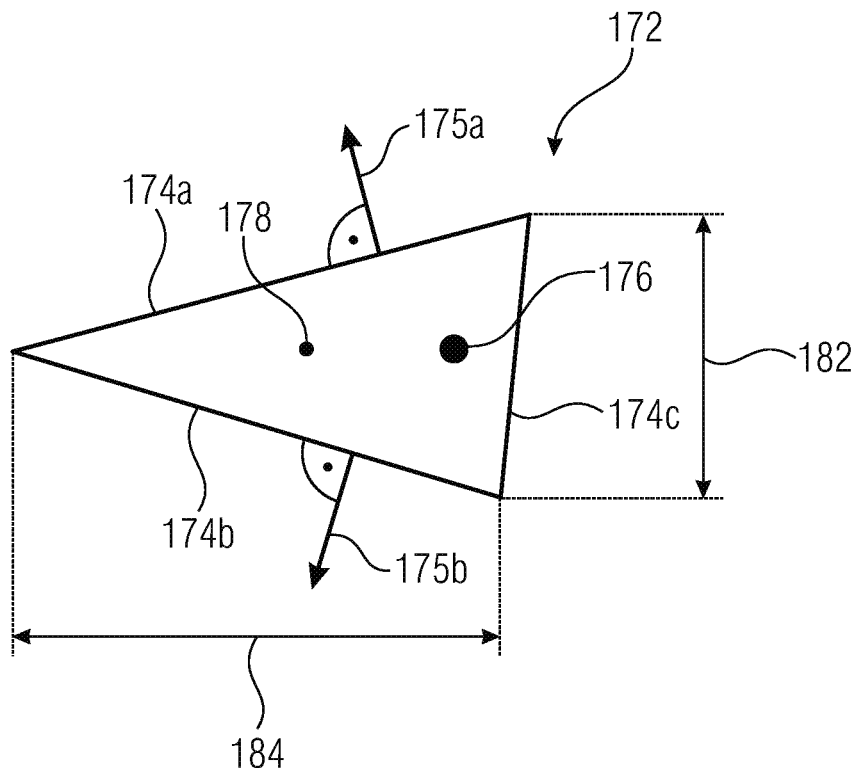

FIG. 7b shows a schematic side-sectional view of the beam-deflecting element 172, wherein a suspension or a displacement axis 176 of the beam-deflecting element 172 is described. The displacement axis 176 around which the beam-deflecting element 172 may be movable in the beam-deflecting means 18 in a rotational and/or translational manner may be displaced eccentrically with respect to a surface center of gravity 178 of the cross-section. Alternatively, the surface center of gravity may also be a point that describes half of the dimension of the beam-deflecting element 172 along a thickness direction 182 and along a direction 184 perpendicular thereto.

The main side 174a may comprise a surface normal 175a, while the main side 174b may comprise a surface normal 175b. If a rotational movement around the displacement axis 176 is used in order to switch between the first position and the second position of the beam-deflecting means, the rotational movement of the beam-deflecting means may be executed such that an orientation according to which one of the main sides 174a and 174b entirely faces the array 14 is avoided between the two positions, as is described in connection with FIG. 3b. This may also be understood such that, during a change between the first and the second operational state or position by the rotational movement, the surface normal 175a and the surface normal 175b of the second main side may comprise at each point in time an angle which is denoted in FIG. 3b as angle $\gamma_1$ and $\gamma_2$ of at least 10° with respect to a direction towards the image sensor and, if applicable, in parallel to a surface normal of the image sensor. With this, it may be avoided that one of the angles is 0° or 180°, which may represent a large or approximately maximum expansion of the beam-deflecting means along the thickness direction.

For example, the displacement axis 176 may be unchanged along a thickness direction 182 and may comprise any offset in a direction perpendicular thereto. Alternatively, an offset along the thickness direction 182 is also conceivable. For example, the displacement may be carried out such that, upon a rotation of the beam-deflecting element 172 around the displacement axis 176, a larger actuator travel is obtained than upon a rotation around the surface center of gravity 178. In this way, due to the displacement of the displacement axis 176, the distance around which the edge between the sides 174a and 174b is moved upon a rotation may increase at the same rotation angle compared with a rotation around the surface center of gravity 178. Preferably, the beam-deflecting element 172 is arranged such that the edge, i.e., the pointed side of the wedge-shaped cross-section, between the sides 174a and 174b faces the image sensor. Thus, due to small rotational movements, a different side 174a or 174b, respectively, may deflect the optical path of the optical channels. This makes it clear that the rotation may be executed such that a space requirement of the beam-deflecting means is small along the thickness direction 182 since a movement of the beam-deflecting element 172 in a way that a main side is perpendicular to the image sensor is not required.

The side 174c may also be referred to as secondary side or rear side. Several beam-deflecting elements may be connected to each other in such a way that a connecting element is arranged at the side 174c or extends through the cross-section of the beam-deflecting elements, i.e., is arranged in the interior of the beam-deflecting elements, e.g., in the area of the displacement axis 176. In particular, the holding element may be arranged such that the same does not extend beyond the beam-deflecting elements 172 along the direction 182 or solely to a small extent, i.e., not more than 50%, not more than 30% or not more than 10%, so that the holding element does not increase or determine the expansion of the total structure along the direction 182. Alternatively, the expansion in the thickness direction 182 may be determined by the lenses of the optical channels, i.e., the same comprise the dimension defining the minimum of the thickness.

The beam-deflecting element 172 may be formed of glass, ceramics, glass ceramics, plastics, metal or any combination of these materials and/or further materials.

In other words, the beam-deflecting element 172 may be arranged such that the tip, i.e., the edge between the main sides 174a and 174b points towards the image sensor. Holding the beam-deflecting elements may be carried out such that it is solely carried out at the rear side or in the interior of the beam-deflecting elements, i.e., the main sides are not covered. A mutual holding or connecting element may extend across the rear side 174c. The axis of rotation of the beam-deflecting element 172 may be arranged eccentrically.

Figure 7C:
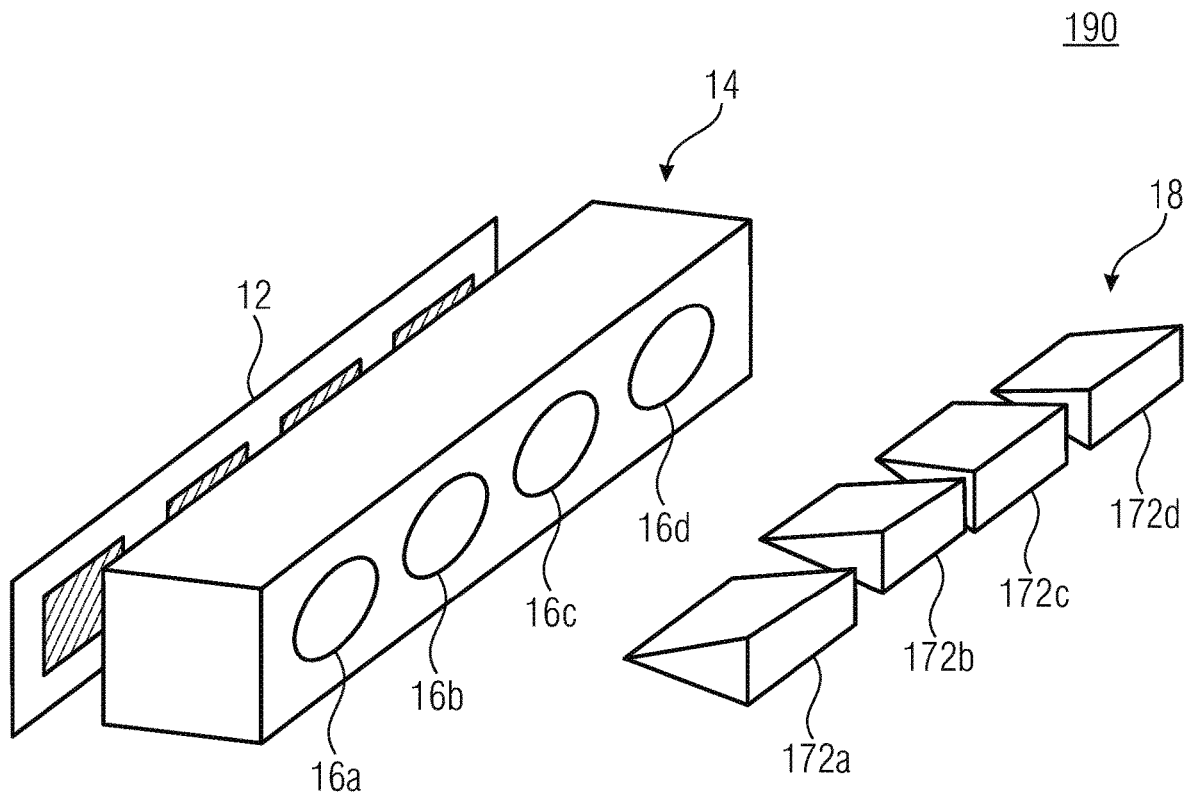

FIG. 7c shows a schematic perspective view of a multi-aperture imaging device 190 including an image sensor 12 and a single-line array 14 of optical channels 16a-d arranged next to each other, wherein, e.g., the optics of the optical channel 16d differs from the optics of the optical channels 16a-c in order to image a total field of view. The beam-deflecting means 18 includes a number of beam-deflecting elements 172a-d that may correspond to the number of optical channels. Alternatively, a smaller number of beam-deflecting elements may be arranged, e.g., if at least one beam-deflecting element is used by two optical channels. Alternatively, a larger number may also be arranged, e.g., if switching the deflecting direction of the beam-deflecting means 18 is carried out by a translational movement, as is described in connection with FIGS. 6a and 6b. Each beam-deflecting element 172a-d may be associated with an optical channel 16a-d. The beam-deflecting elements 172a-d may be formed as a multitude of elements 172. Alternatively, at least two, several or all beam-deflecting elements 172a-d may be formed integrally with each other.

Figure 7D:
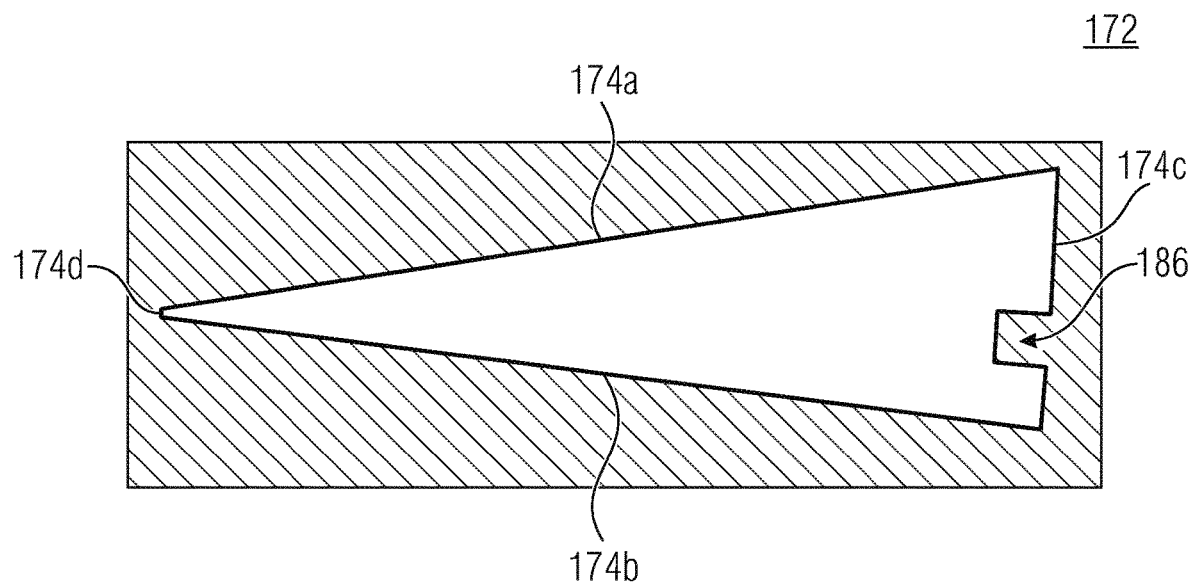

FIG. 7d shows a schematic side-sectional view of the beam-deflecting element 172 having a cross section formed as a free-form surface. In this way, the side 174c may comprise a recess 186 that enables fixing a holding element, wherein the recess 186 may also be formed as a projecting element, e.g., a spring of a tongue-spring system. The cross section further comprises a fourth side 174d comprising a smaller surface expansion than the main sides 174a and 174b and connecting the same with each other.

Figure 7E:
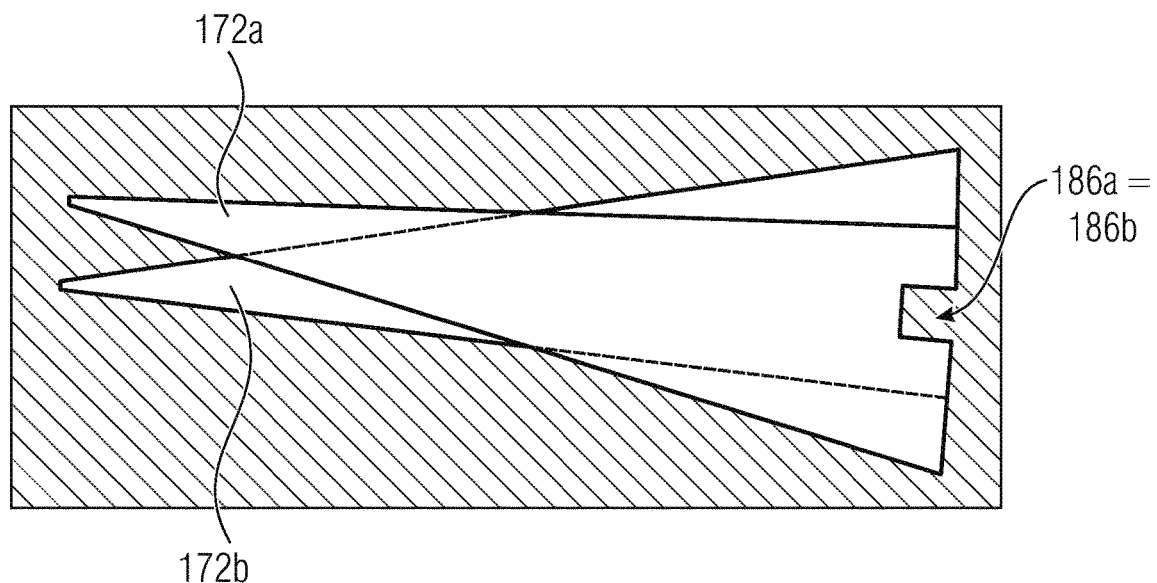

FIG. 7e shows a schematic side-sectional view of a first beam-deflecting element 172a and a second beam-deflecting element 172b that is located behind the former in the illustration direction. The recesses 186a and 186b may be arranged such that the same are essentially congruent so that an arrangement of a connecting element in the recesses is possible.

Figure 7F:
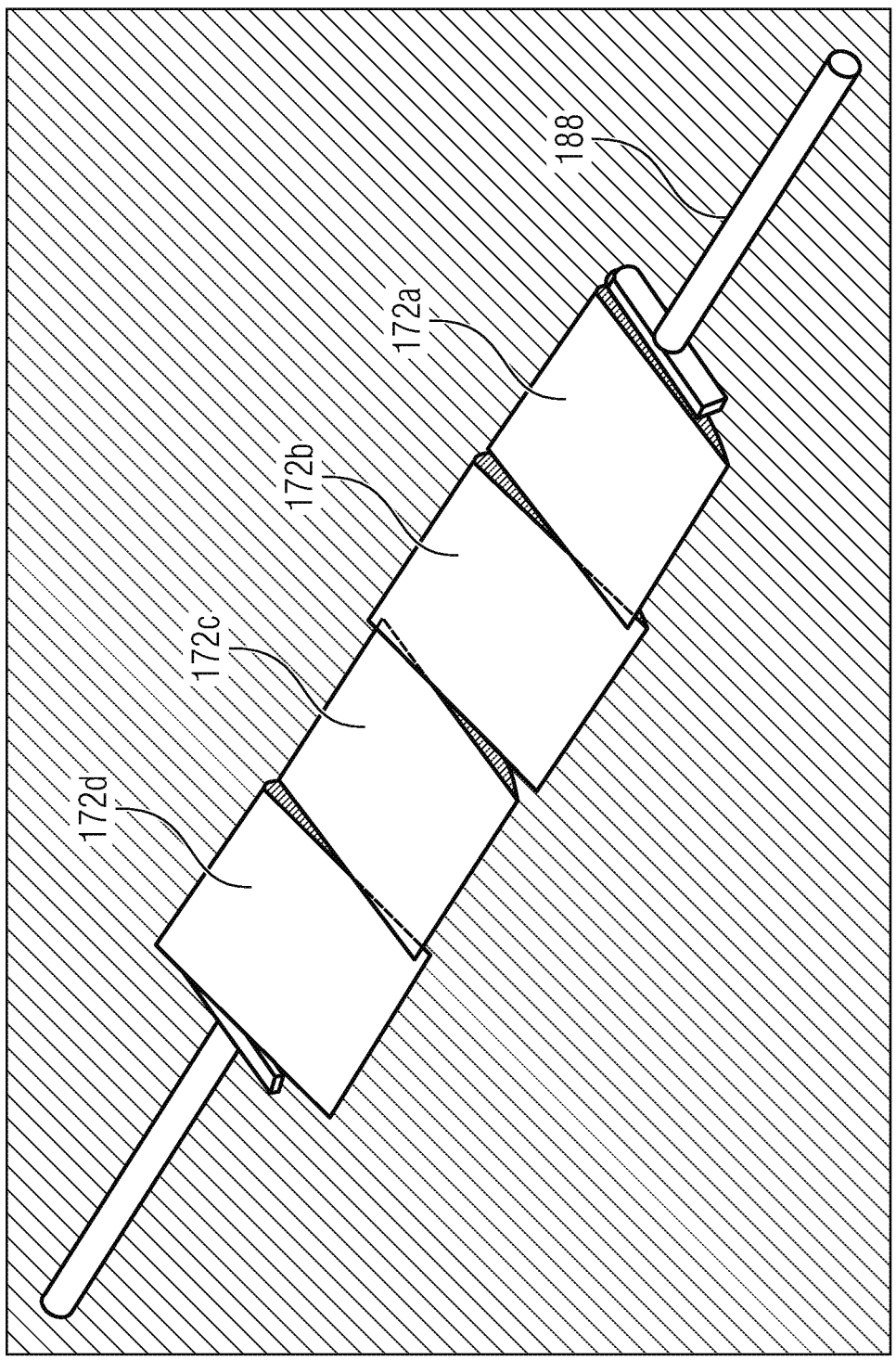

FIG. 7f shows a schematic perspective view of a beam-deflecting means 18, e.g., including four beam-deflecting elements 172a-d that are connected with a connecting element 188. The connecting element may be usable in order to be movable by an actuator in a translational and/or rotational manner. The connecting element 188 may be configured to be integral and may extend across an extension direction, e.g., the y direction, at or in the beam-deflecting elements 172a-d. Alternatively, the connecting element 188 may solely be connected with at least one side of the beam-deflecting means 18, e.g., if the beam-deflecting elements 172a-d are formed to be integral. Alternatively, a connection to an actuator and/or a connection of the beam-deflecting elements 172a-d may also be carried out in any other way, e.g., by means of adhesion, blasting or soldering.

Figure 7G:
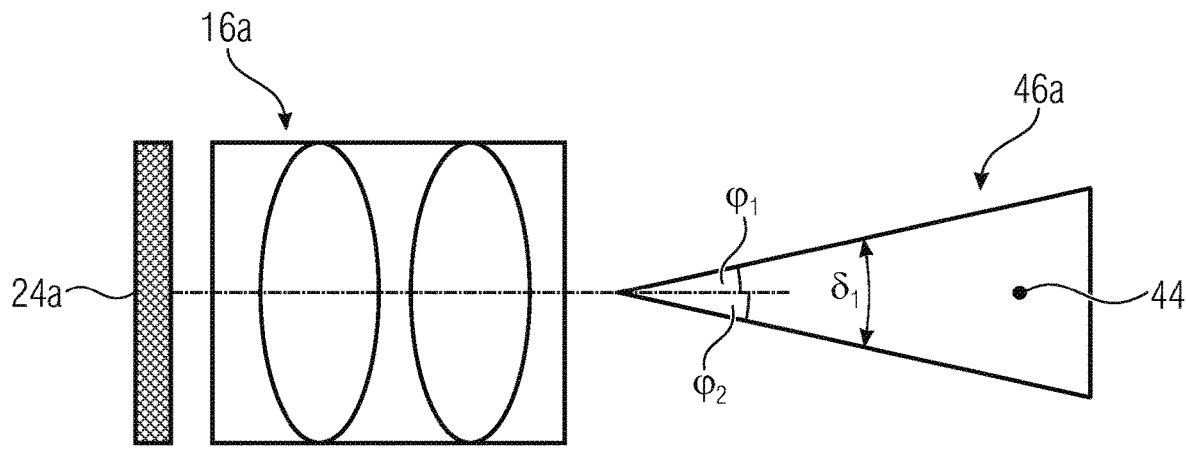
Figure 7G:
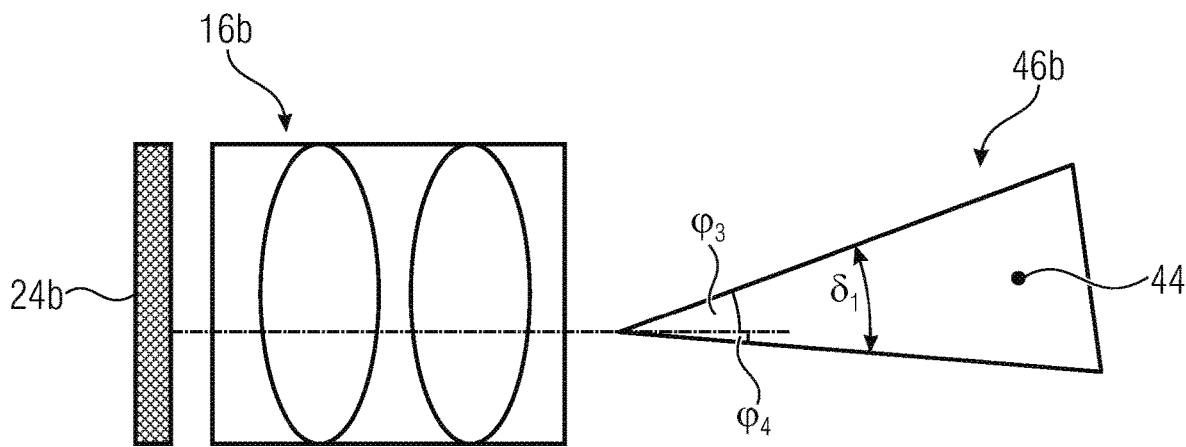
Figure 7G:
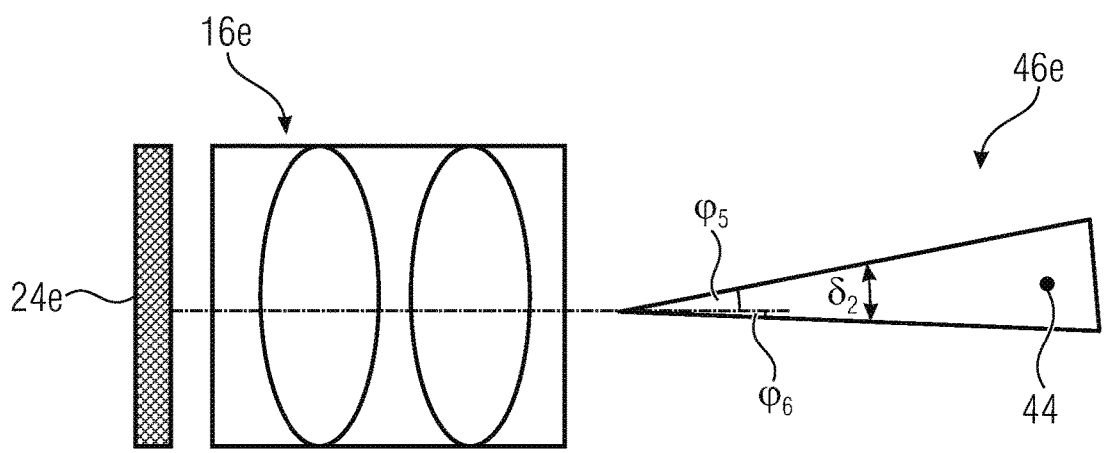

FIG. 7g shows schematic side sectional views of parts of a multi-aperture imaging device illustrated below one another for illustrating different facets of a beam-deflecting means described herein. The facets can be arranged in any multi-aperture imaging device described herein, which can, for example, be part of the multi-aperture imaging device 10 of FIG. 1a or another multi-aperture imaging device that is, for example, configured to completely image the total field of view 70a with two partial fields of view 72a and 72b. The main sides of the facets 46a and/or 46b can, for example, be arranged tilted with respect to another at an equal angle $\delta_1$, while the main sides of the facet 46e can be arranged tilted with respect to one another at an angle $\delta_2$ differing therefrom. The beam-deflecting means can also comprise further facets, such as a further facet which is formed similar to the facet 46a for allowing field of view capturing of the multi-aperture imaging device 10".

Rotation of the facets 46a, 46b and 46e around the common axis of rotation 44, such as by rotation of the connecting element 188 can allow, together with the different angles $\delta_1$ and $\delta_2$, a differing direction deflection by the rotation movement, such that by the rotation for changing between the first and second position an equal or comparable relative position of the partial fields of view and/or the total fields of view to one another is maintained. Differing positioning of the partial or total fields of view can be obtained by different angles $\varphi_1$ to $\varphi_6$, which the main sides of the facets 46a, 46b and 46e comprise in the respective position with respect to the allocated image sensor area 24a, 24b or 24e and the optics of the optical channels 16a, 16b and 16e, respectively. As illustrated, the angle $\delta_2$ can be smaller than the angle $\delta_1$.

Figure 7H:
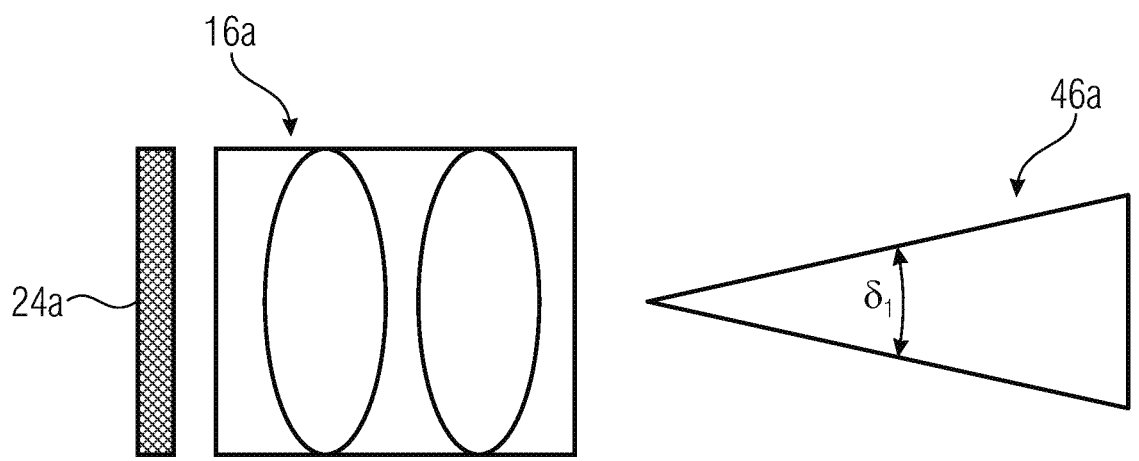
Figure 7H:
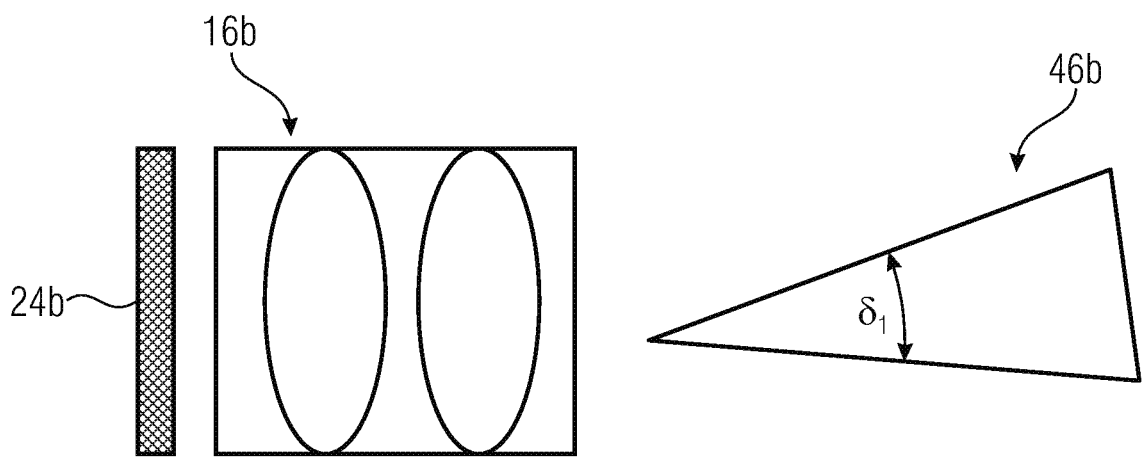
Figure 7H:
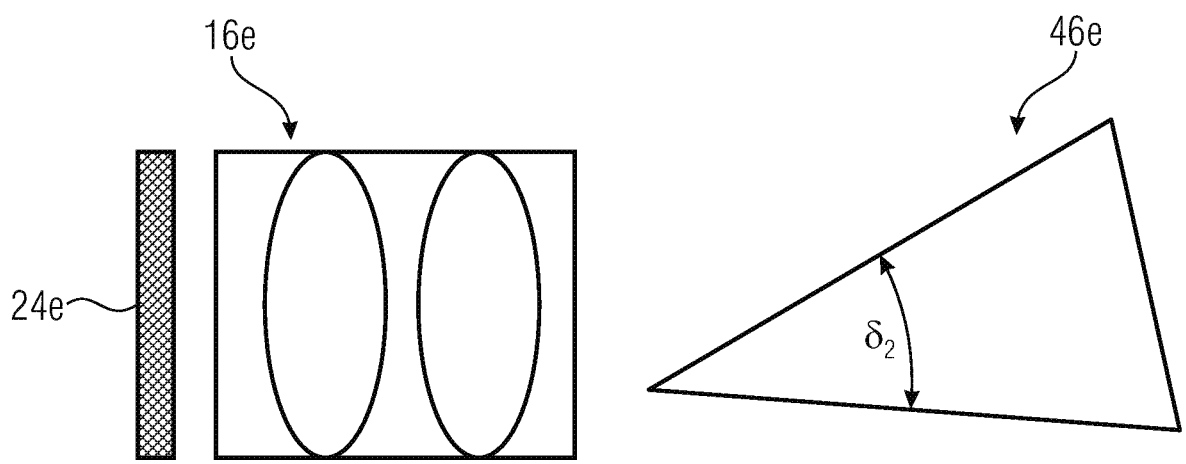

FIG. 7h shows schematic side sectional views of parts of a multi-aperture imaging device illustrated below one another, where the angle $\delta_2$ is greater than the angle $\delta_1$.

Although the main sides of facets of optical channels having different optical characteristics can be tilted with respect to one another at an equal angle $\delta$, for example when the total fields of view are captured alternately and hence common usage of a facet of different optical channels is possible, FIG. 7g and FIG. 7h illustrate that the facets allocated to optical channels having different optical characteristics can comprise, individually or in groups, main sides tilted at an angle $\delta_1$ or $\delta_2$ allocated to the optical characteristic. Further groups of optical channels or values of optical characteristics can be realized in the multi-aperture imaging device, such as a third focal length or a higher number, such that also a higher number of different angles $\delta$ is possible.

Figure 8:
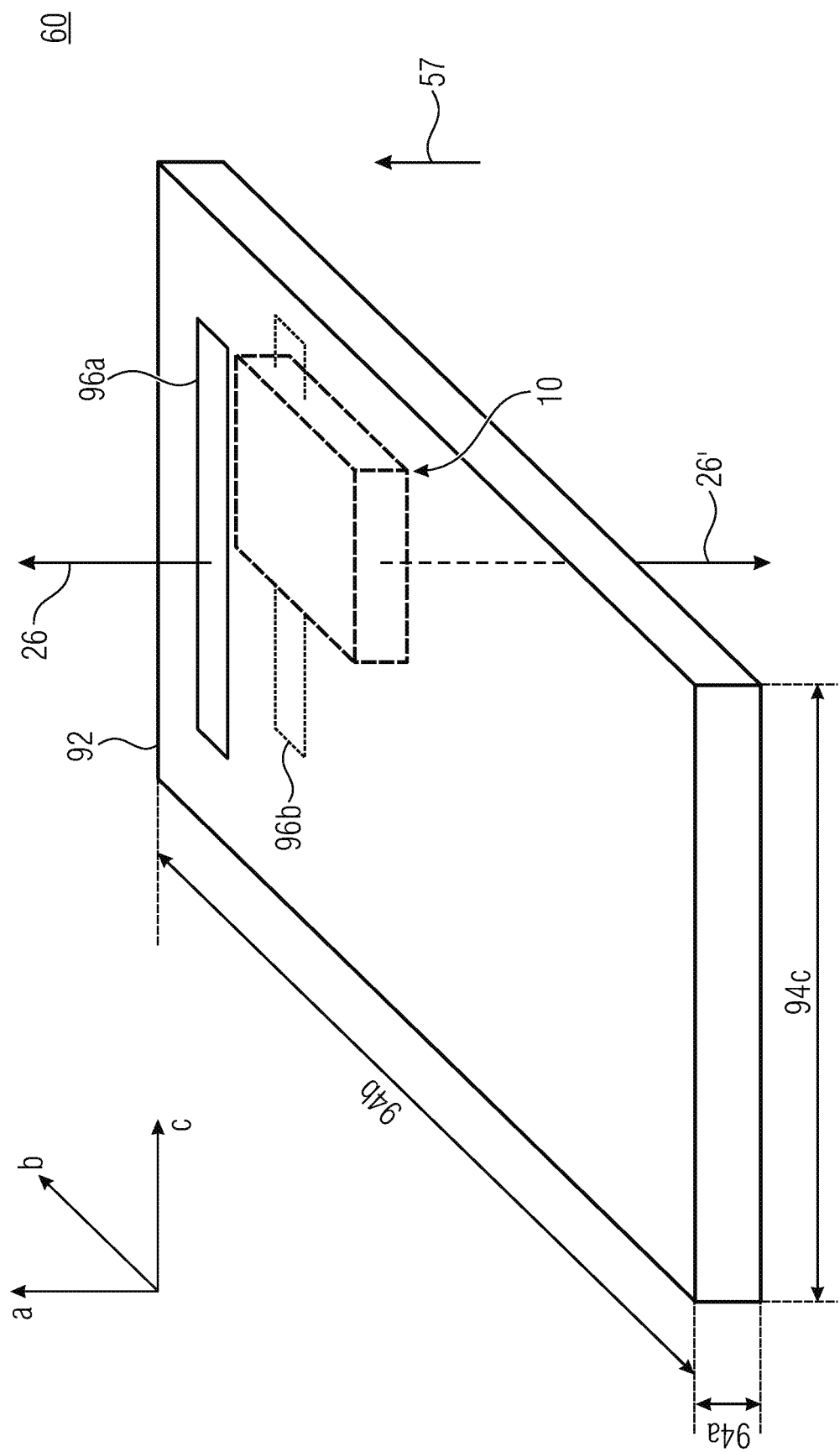
FIG. 8 a schematic perspective illustration of an imaging system according to an embodiment.

FIG. 8 shows a schematic perspective illustration of an imaging system 60 according to an embodiment. The imaging system 60 includes the multi-aperture imaging device 10. According to further embodiments, alternatively or additionally to the multi-aperture imaging device 10, the imaging system 60 includes at least one multi-aperture imaging device 10', 10'', 10''', 20, 20', 30, 40 and/or 50. The imaging system 60 includes a flat housing 92. The flat housing 92 includes a first expansion 94a along a first housing direction a. The flat housing 92 further includes a second expansion 94b along a second housing direction b and a third expansion 94c along a third housing direction c. For example, the housing direction a may be arranged in parallel to the thickness direction 57 in the space. The expansion 94a of the flat housing 92 along the housing direction a may be understood as the smallest dimension of the flat housing 92. Compared to the smallest expansion, the other expansions 94b and/or 94c along the other housing directions b and c, respectively, may comprise a size of at least three times, a size of at least five times or a size of at least seven times, in comparison to the expansion 94a along the housing direction a. Simply put, the expansion 94a may be smaller than, significantly smaller than or, if applicable, smaller by a magnitude than the other expansions 94b and 94c along the other housing directions b and c, respectively.

The flat housing 92 may include one or several diaphragms 96a-b through which the optical path 26 and/or 26' may be deflected, e.g., based on the beam-deflecting means of the multi-aperture imaging device 10. For example, the diaphragms may be electrochromic diaphragms and/or may be arranged in an area of the display.

The imaging system 60 may be configured as a portable device. For example, the imaging system 60 may be a portable communication means such as a mobile telephone or a so-called smartphone, a tablet computer or a portable music playing device. The imaging system 60 may be implemented as a screen, e.g., to be used in a navigation system, multimedia system or television system. Alternatively or additionally, the imaging system 60 may also be arranged behind reflecting surfaces such as a mirror.

In the field of mobile communication devices, an arrangement of a multi-aperture imaging device 10', 10'', 10''', 20, 20', 30, 40 and/or 50 may be advantageous since, based on the arrangement of the components along the long housing sides 94b and/or 94c, an expansion of the multi-aperture imaging device along the housing direction 94a may be small so that the imaging system 60 may comprise a small expansion 94a. In other words, a relative two-dimensional lateral movement of the image sensor and the objective that causes a two-dimensional angle change of the field of view in conventional systems (corresponds to scanning) may be replaced by a one-dimensional change of the view direction and a rotational movement. A one-dimensional change of the view direction may be carried out by changing the orientation of the mirror (beam-deflecting means) with respect to the optical axis (line extension direction) of the imaging channels by bringing the rotatably supported mirror into another orientation, wherein the axis of rotation of the mirror may extend perpendicularly and/or almost perpendicularly to the optical axes of the imaging channels. For adapting the view direction perpendicularly to the above-described direction, the image sensor and/or the array objective (array of the optical channels) may be laterally moved towards each other. Due to the interplay of both movements, two-dimensional optical image stabilization may be achieved.

In order to enable a small installation height, the components (e.g., actuators) and sub-systems such as an image processor that are arranged for realizing the movement, may be arranged, if applicable, exclusively next to, in front of and/or behind the installation space defined by the imaging optical path, i.e., arranged between the planes 52a and 52b, and according to embodiments, may not be arranged above or below the same. This enables a spatial separation of movement units (actuators) for the optical image stabilization. By this, a decrease of the number of used components may be obtained, and, thus, a manufacturing price of camera systems may be low, and a significant decrease of the installation height may be achieved in comparison to conventional structures. With reference to FIG. 3a, a difference to known systems may be the fact that the diameters of the lenses (optics) of the optical channels may essentially define the distance between the planes 52a and 52b. This enables a small installation height of the device, which is advantageous. In conventional systems, a main plane of the lenses is parallel to the planes 52a and 52b, whereas the main plane of the optics of the array is arranged orthogonally thereto.

Figure 9:
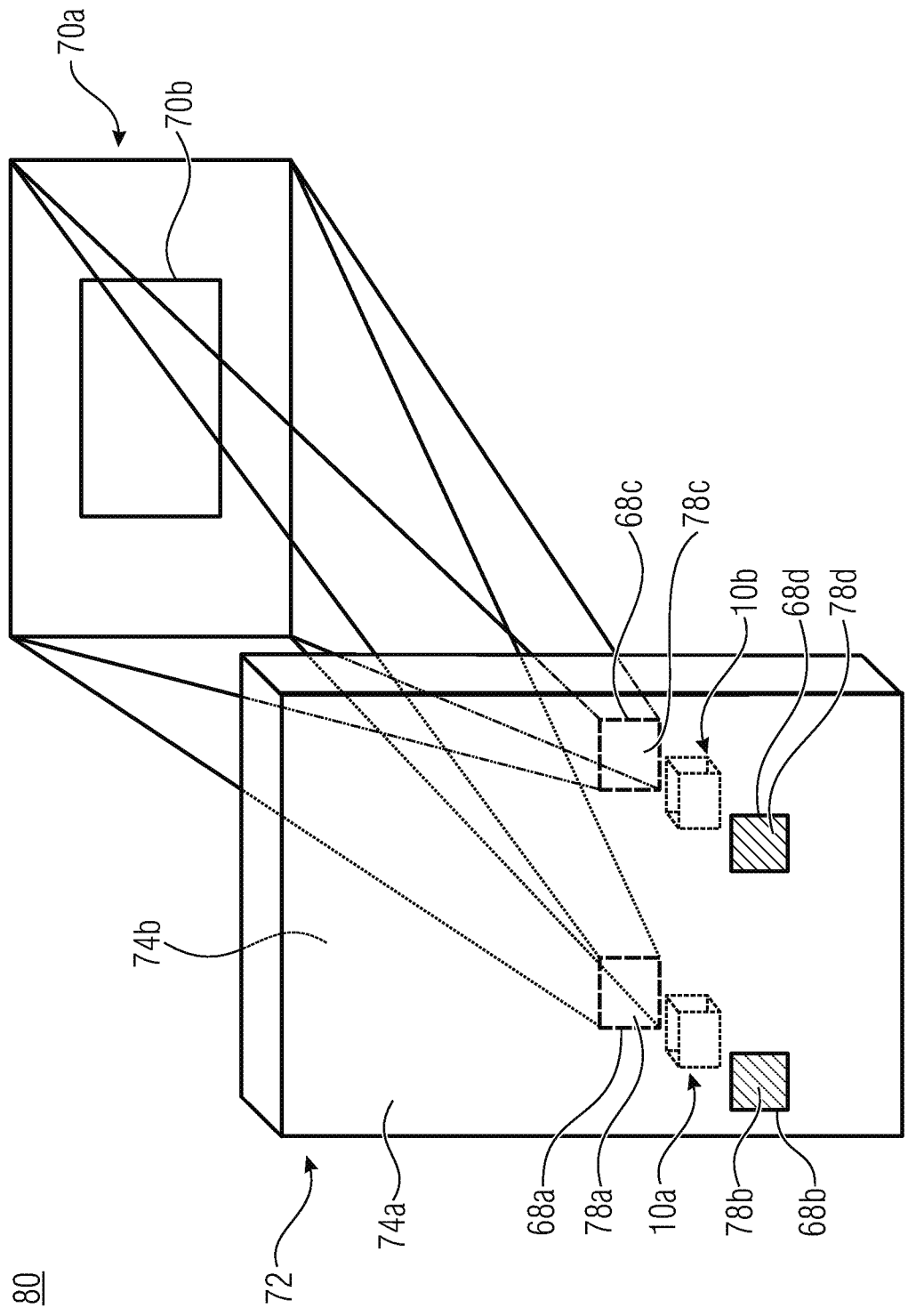
FIG. 9 a schematic perspective view of a portable device including two multi-aperture imaging devices, according to an embodiment.

FIG. 9 shows a schematic perspective view of a device 80 including a housing 72 and a first multi-aperture imaging device 10a and a second multi-aperture imaging device 10b arranged in the housing 72. The device 80 is configured to at least partially capture the total fields of view 70a and 70b, e.g., in the overlapping area of the capturing areas, in a stereoscopic manner with the multi-aperture imaging devices. For example, the total fields of view 70a and 70b are arranged at a main side 74b of the housing, which faces away from the main side 74a. For example, the multi-aperture imaging devices 10a and 10b may capture the total field of view 70 through transparent areas 68a and 68c, respectively, wherein diaphragms 78a and 78c arranged in the main side 74b are at least partially transparent. Diaphragms 78b and 78d arranged in the main side 74a may at least partially optically close the transparent areas 68b and 68d, respectively, so that an extent of stray light from a side facing the main side 74a, which may falsify the captured images of the multi-aperture imaging devices 10a and/or 10b, is at least reduced. Although the multi-aperture imaging devices 10a and 10b are illustrated to be arranged spatially spaced apart from each other, the multi-aperture imaging devices 10a and 10b may also be arranged to be spatially adjacent or to be combined. For example, the single-line arrays of the imaging devices 10a and 10b may be arranged next to each other or in parallel to each other. The single-line arrays may form lines with respect to each other, wherein each multi-aperture imaging device 10a and 10b comprises a single-line array. The imaging devices 10a and 10b may comprise a mutual beam-deflecting means and/or a mutual carrier 62 and/or a mutual image sensor 12.

Alternatively or additionally to the multi-aperture imaging device 10a and/or 10b, at least the multi-aperture imaging device 10', 10", 10''', 20, 20' 30, 40 and/or 50 may be arranged. Such mutual elements, e.g., the beam-deflecting means or the array, may be used by a mutual optical image stabilizer, e.g., since a movement of the beam-deflecting means may function as optical image stabilization for optical channels of several modules. Accordingly, the optical image stabilizer may also be mutually implemented for several modules and/or a mutual reference channel may be used for several modules.

The transparent areas 68a-d may additionally comprise a switchable diaphragm 78a-d that covers the optical structure in case the same is not used. The diaphragm 78a-d may include a mechanically moved part. The movement of the mechanically moved part may be carried out by using an actuator, e.g., as is described for the actuators 36 and 45. Alternatively or additionally, the diaphragm 78a-d may be electrically drivable and may include an electrochromic layer or an electrochromic layer series, i.e., may be formed as an electrochromic diaphragm.

Figure 10:
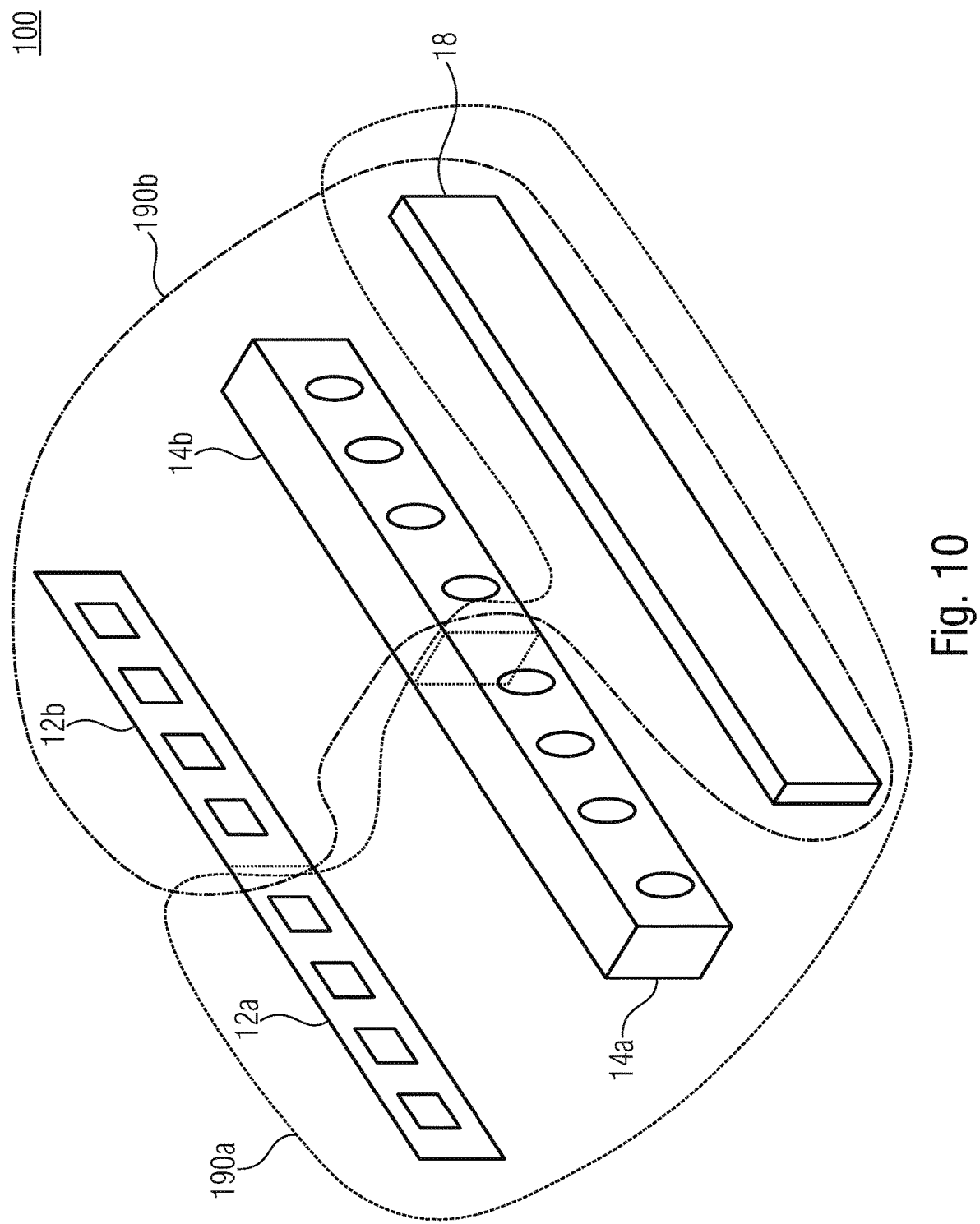
FIG. 10 a schematic structure including a first multi-aperture imaging device and a second multi-aperture imaging device having a common image sensor, a common array and a common beam-deflecting unit.

FIG. 10 shows a schematic structure including a first multi-aperture imaging device 190a and a second multi-aperture imaging device 190b, e.g., as may be arranged in the imaging system 80. The arrays 14a and 14b are formed in a single-line manner and form a mutual line. The image sensors 12a and 12b may be mounted on a mutual substrate and/or on a mutual circuit carrier such as a mutual circuit board or a mutual flex board. Alternatively, the image sensors 12a and 12b may also include substrates that are different from each other. Obviously, various combinations of these alternatives are also possible, e.g., multi-aperture imaging devices including a mutual image sensor, a mutual array and/or a mutual beam-deflecting means 18 as well as further multi-aperture imaging devices comprising separate components. A mutual image sensor, a mutual array and/or a mutual beam-deflecting means are advantageous in that a movement of a respective component may be obtained with a high precision by driving a lower number of actuators, and synchronization between actuators may be reduced or avoided. Furthermore, a high thermal stability may be obtained. Alternatively or additionally, other and/or different multi-aperture imaging devices 10', 10", 10''', 20, 20', 30, 40 and/or 50 may comprise a mutual array, a mutual image sensor and/or a mutual beam-deflecting means.

Based on FIG. 11a-e, a schematic flow of electronic image stabilization as it can be provided by the electronic image stabilizer 41 will be described. Due to slight differences in the optical characteristics of the optics of the optical channels, the image shifts also differ slightly compared to a difference of the optical characteristics between optics 64a-d and 64e. Although the change in the image caused by a movement of the common beam-deflecting means 18 in the optical channel 64e of the multi-aperture imaging device 10 can be greater, electronic image stabilization in this channel functions in a similar manner. It can be sufficient to perform electronic image stabilization in the channel 16a independent of the other images. Alternatively, a common reference channel of all optical channels can be used, since the functional contexts in the multi-aperture imaging device are known.

Figure 11A:
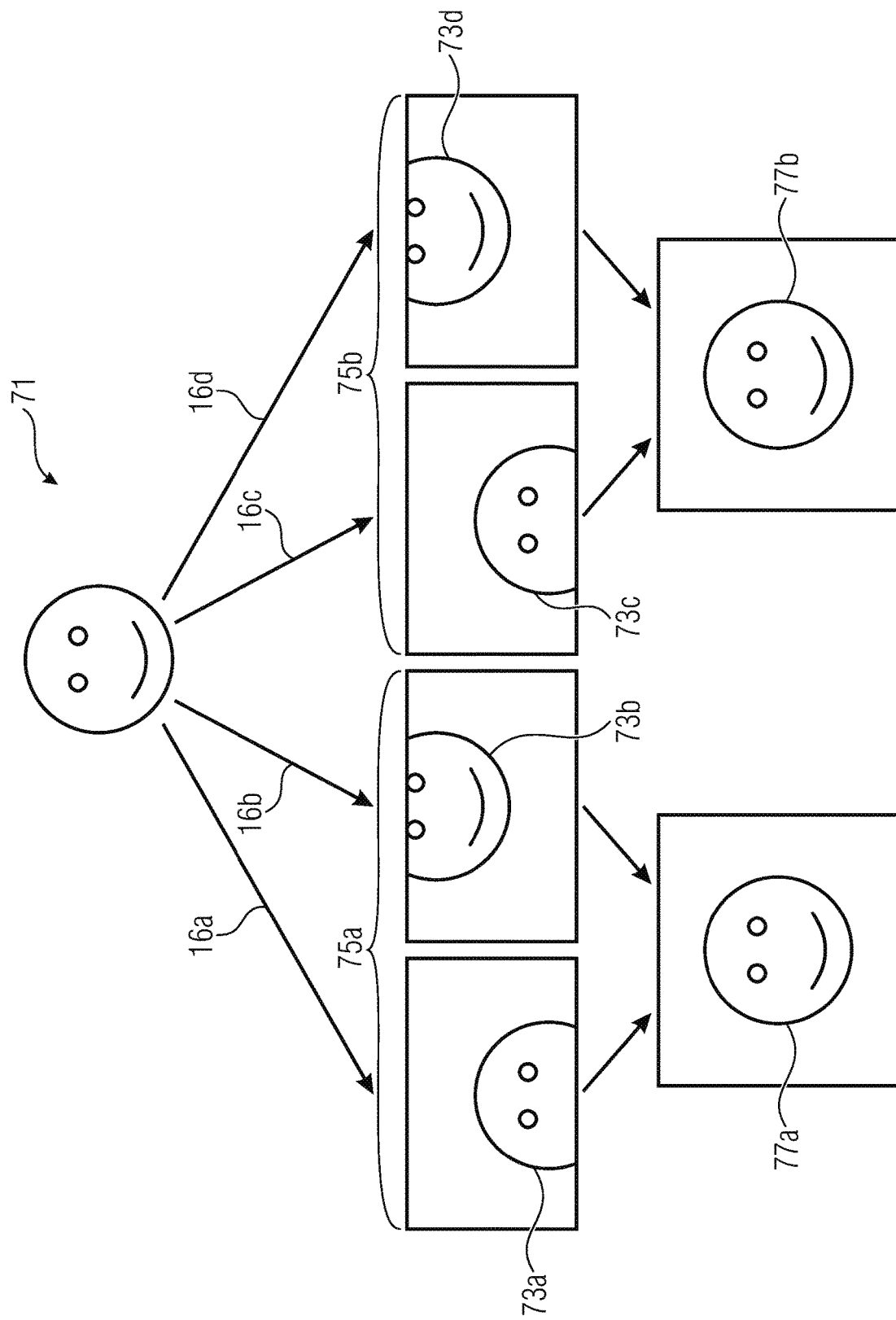
FIGS. 11a-e schematic illustrations of an implementation of the electronic image stabilizer according to an embodiment.

FIG. 11a is a schematic illustration of an initial situation of an implementation of the electronic image stabilization, e.g., as may be obtained by the imaging systems described herein, wherein the implementations with respect to the electronic image stabilization may also refer to individual multi-aperture imaging devices without having a limiting effect. In the embodiment described, the imaging system uses a mutual optical image stabilizer and a mutual electronic image stabilizer. Each module exemplarily comprises two optical channels 16a and 16b, and 16c and 16d, respectively, in order to image the total field of view with an object 71. Without having a limiting effect, the images 73a and 73b of the optical channels 16a and 16b in the associated image sensor areas are referred to as left image 75a and the images 73c and 73d of the optical channels 16c and 16d are referred to as right image of a stereoscopic capturing of the object 71.

FIG. 11a shows an aberration-free state in which the object 71 is projected on the image sensor areas in order to obtain the images 73a-d. The images 73a and 73b may be combined by the multi-aperture imaging device to a left total image 77a, e.g., by means of a stitching. The images 73c and 73d may be combined in a similar manner by the multi-aperture imaging device to a right total image 77b so that stereoscopic information with respect to the object 71 may be determined through the two total images 75a and 75b.

Figure 11B:
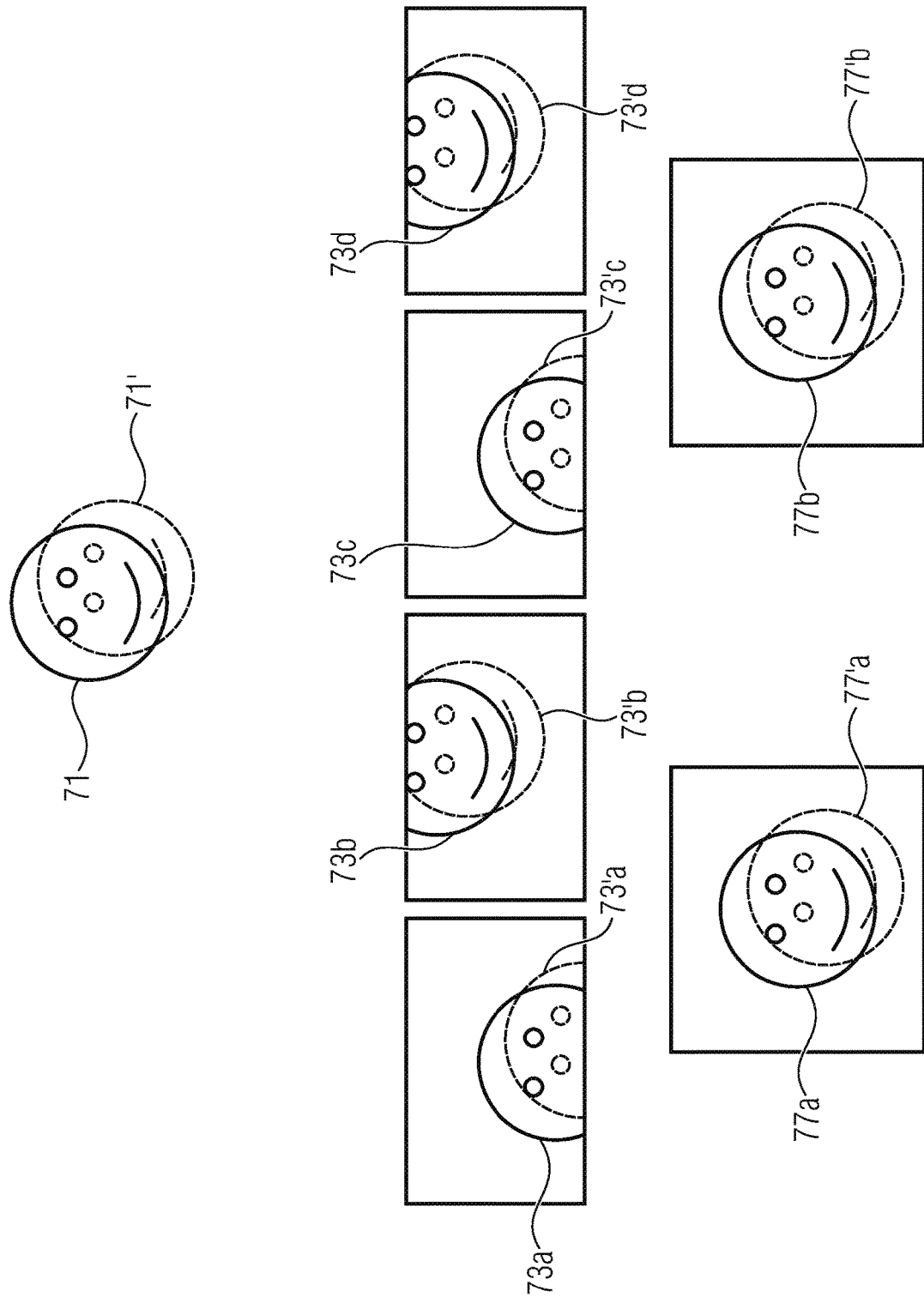

Now, FIG. 11b shows the case of FIG. 11a, in which a relative movement of the imaging system with respect to the object 71 leads to a changed relative position of the object 71, which is illustrated by the object 71'. For example, this may be a movement of the object 71 and/or shaking of the imaging system. When neglecting image corrections, the relative movement now leads to a changed image position of the image of the object 71 in the image sensor areas, which is illustrated by the dotted lines of the images 73'a-d.

Now, obtaining images 77a and 77b that are illustrated in FIG. 11a, i.e., aberration-compensated images, is what is strived for. A compensation of the shaking, i.e., a best possible image stabilization, is what is strived for. Deviations in the optics of the optical channels are not taken into account in this consideration.

Figure 11C:
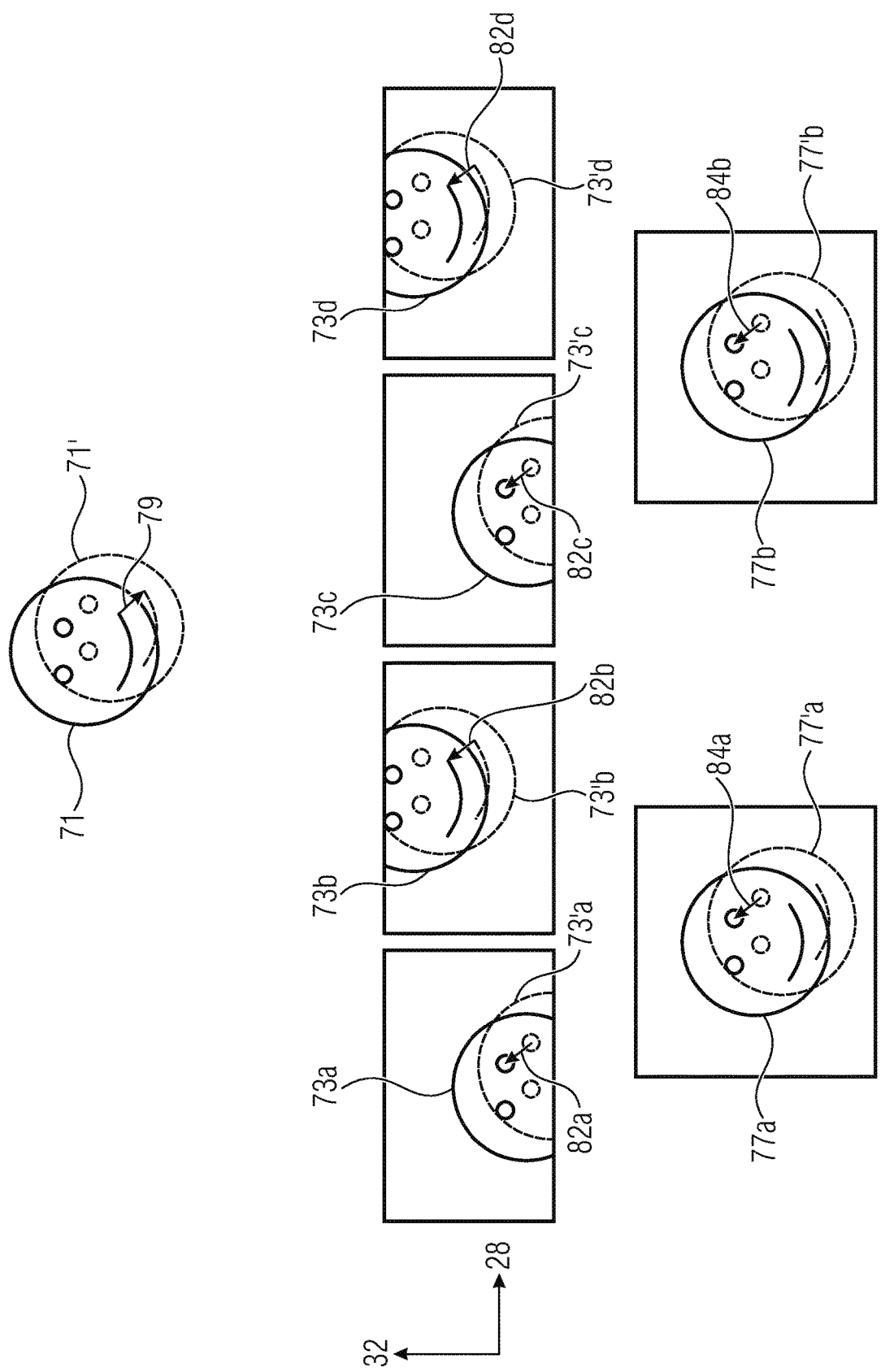

FIG. 11c shows the basis for the optical image stabilization in the images under the unchanged assumption that a purely optical image stabilization of all optical channels that comprise identical optical parameters, i.e., that comprise an identical focal length, leads to a best possible image stabilization. The displacement of the object 71 is illustrated by an arrow 79 that points in a positive direction 28 and in a negative direction 32. By generating the relative movement between the image sensor, the array and the beam-deflecting means by the optical image stabilizer, it is achieved that the images 73'a-d and, therefore, the total images 77a and 77b are displaced along opposing directions 82a-d and 84a-b, respectively, wherein, when operating, the displacement of the object according to FIG. 11b and also the compensation according to FIG. 11c are carried out in a timely manner in order to avoid the creation of the illustrated offset. The directions represented by the arrows 84a-d and 77a-b are arranged opposite to the arrow 79 in the space, e.g., at significant points in the respective partial image, e.g., an eye or corner of the mouth, e.g., which indicates edges in the image.

Figure 11D:
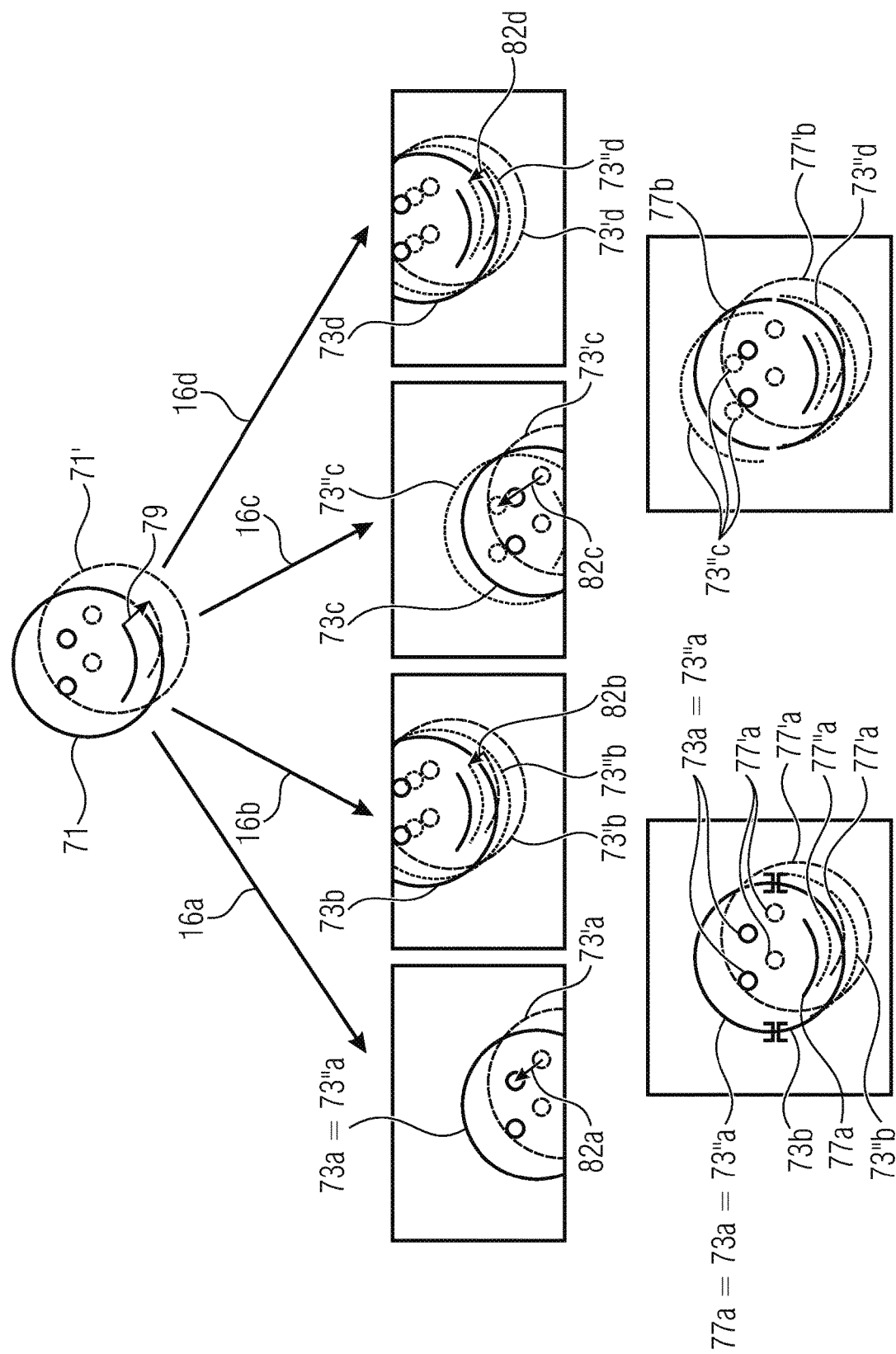

Now, FIG. 11d illustrates obtained partial images 73"a-d after the optical image stabilization and under consideration of the actual deviations in the optical characteristics. For example, the optical image stabilization is executed such that the image 73a is corrected in a best possible manner, which means that the optically-stabilized image 73"a corresponds to the aberration-free image 73a, at least in a tolerance range that indicates the possibilities of the optical image stabilizer.

Due to the deviations in the optical characteristics, the image stabilization in the optical channel 16a now has different effects in the channels 16b-d, which means that the deviations in the optical characteristics cause, e.g., that the arrows 82a-d indicating the displacement of the images based on the optical stabilization may be different with respect to the length and/or the direction.

This is notable in the joined images 77 that are formed from the corrected images 73"a and 73"b, and 73"c and 73"d, respectively. The divergence in the displacement back due to the optical image stabilization leads to the fact that the partial images fall apart, which may cause errors when stitching. For example, this is illustrated by the separated partial images 73"c and 73"d in connection with the total image 77b, or by the partial image 73"b in the total image 77a, which is spaced apart from the partial image 73"a that is correctly stabilized. In other words, aberrations occur when joining the image since there is an image position in all channels that is not entirely compensated.

Figure 11E:
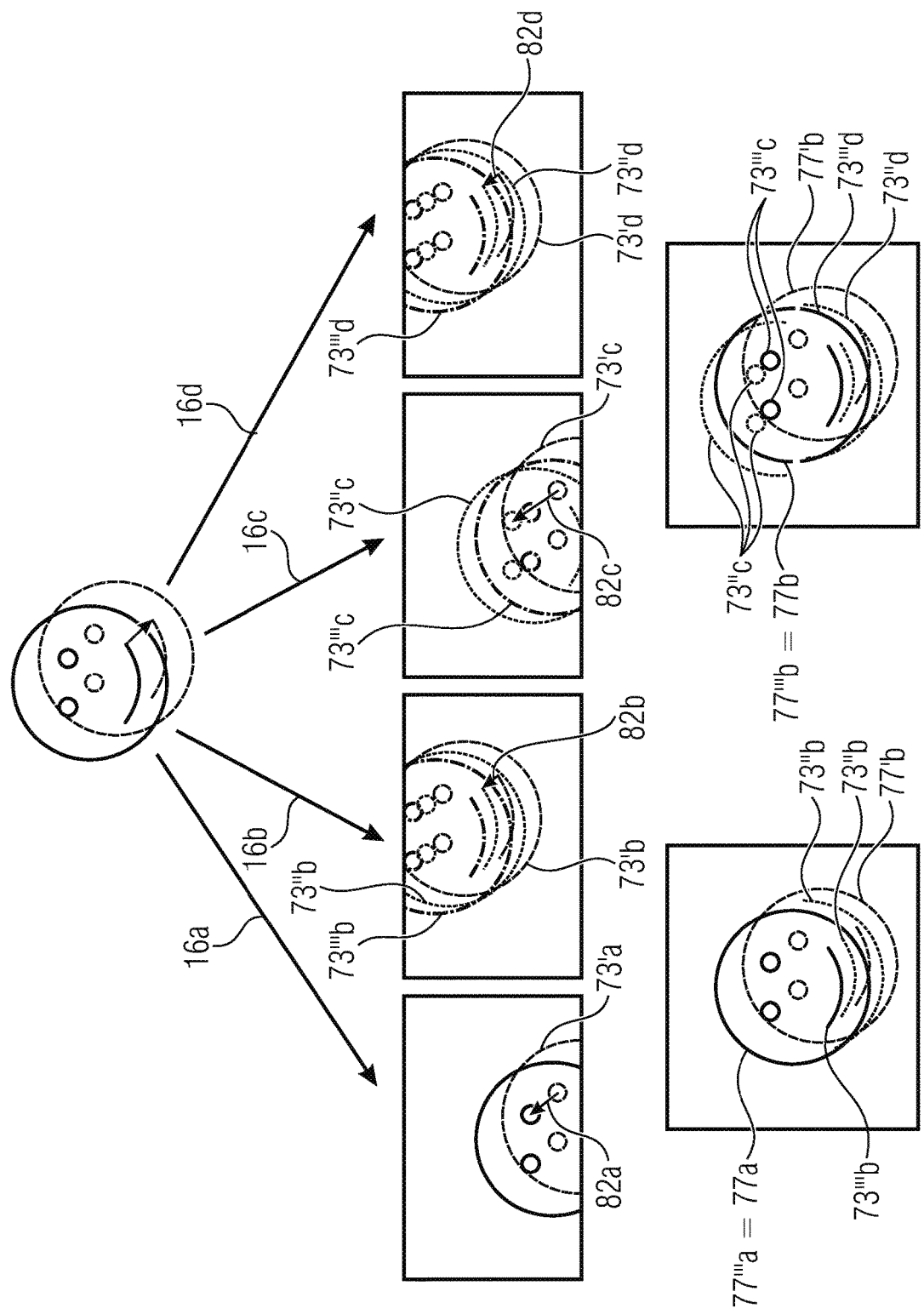
Figure 12:
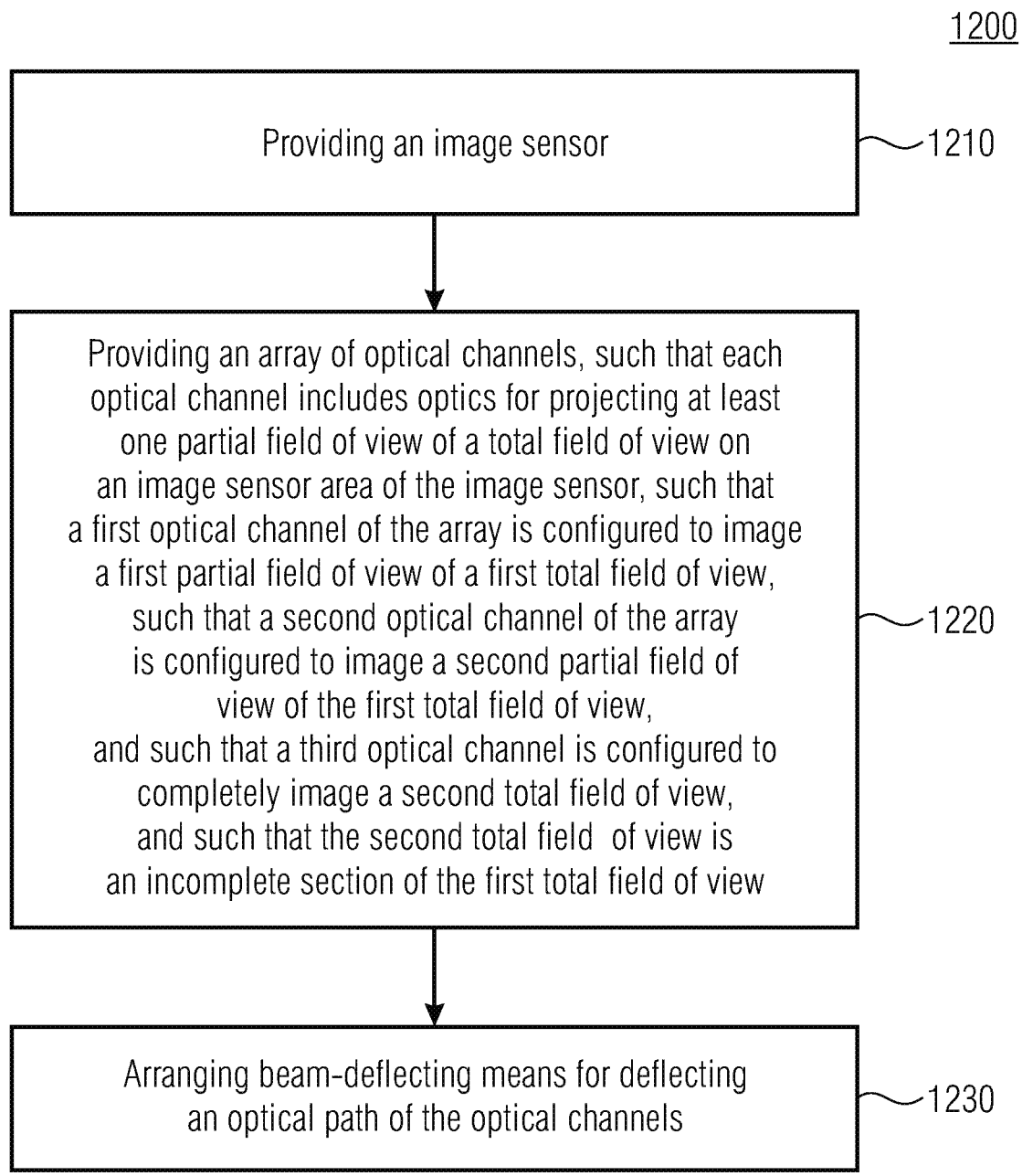
FIG. 12 a schematic illustration of a method of providing a multi-aperture imaging device according to an embodiment.

In the images of the channels 16b-c, FIG. 11e shows the optical image stabilization indicated by images 73'''b-d that is performed with respect to the reference channel 16a. By electronic image stabilization in the channels 16b-d away from the channel 16a, their deviations with respect to the optical image stabilization in the optical channel 16a are at least partially compensated so that aberration-reduced or even aberration-free images 77'''a and 77'''b may be obtained, which may correspond to the images 77a and 77b, respectively. This means that partially-compensated image locations are obtained through the optical image stabilization and compensated image positions are obtained through the additional electronic image stabilization. The extent of the electronic image stabilization may be carried out by the electronic image stabilizer using the functional connection between the optical channels 16a-d. Alternatively or additionally, the electronic image stabilizer, e.g., the image stabilizer 41, may be configured to determine the extent of the displacement in the images, e.g., when considering a matching feature in two frames that are temporally different from each other or that succeed each other. It should be noted that the reference channel may also be the optical channel 16e FIG. 12 shows a schematic flow diagram of a method 1200 for providing a multi-aperture imaging device according to an embodiment. In a step 1210, an image sensor is provided. In a step 1220, an array of optical channels is provided, such that each optical channel includes optics for projecting at least one partial field of view of a total field of view on an image sensor area of the image sensor, such that a first optical channel of the array is configured to image a first partial field of view of a first total field of view, such that a second optical channel of the array is configured to image a second partial field of view of the first total field of view, and such that a third optical channel is configured to completely image a second total field of view, and such that the second total field of view is an incomplete section of the first total field of view. In step 1230, beam-deflecting means for deflecting an optical path of the optical channels is arranged.

Figure 13:
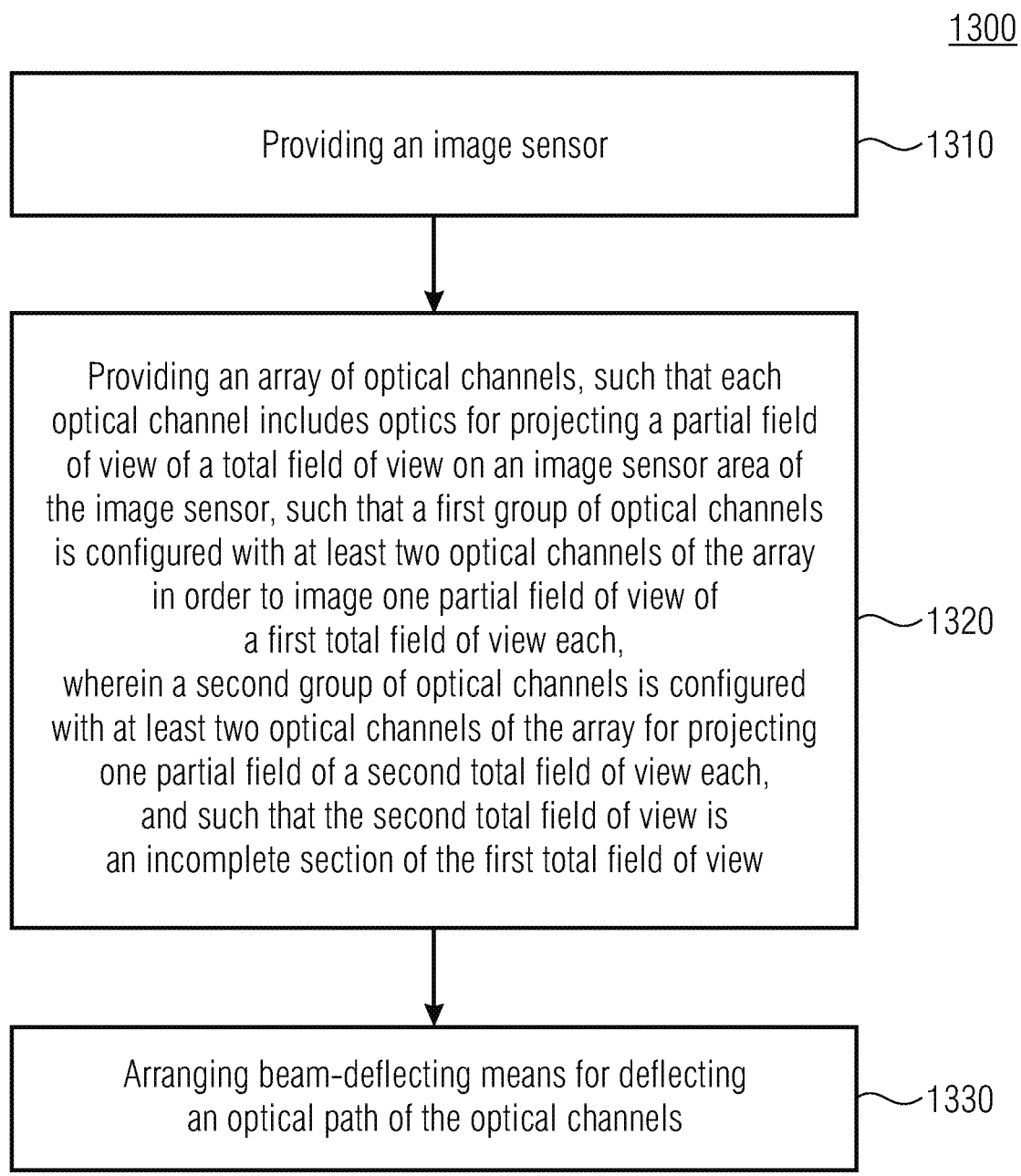
FIG. 13 a schematic flow diagram of a method of providing a multi-aperture imaging device according to a further embodiment.

FIG. 13 shows a schematic flow diagram of a method 1300 for providing a multi-aperture imaging device according to an embodiment, such as the multi-aperture imaging device 10". In a step 1310, an image sensor is provided. In a step 1320, an array of optical channels is provided, such that each optical channel comprises optics for projecting at least one partial field of view of a total field of view on an image sensor area of the image sensor, such that a first optical channel of the array is configured to image a first partial field of view of a first total field of view, such that a second optical channel of the array is configured to image a second partial field of view of the first total field of view, and such that a third optical channel is configured to completely image a second total field of view, and such that the second total field of view is an incomplete section of the first total field of view. In a step 1330, beam-deflecting means for deflecting an optical path of the optical channels is arranged.

Figure 14:
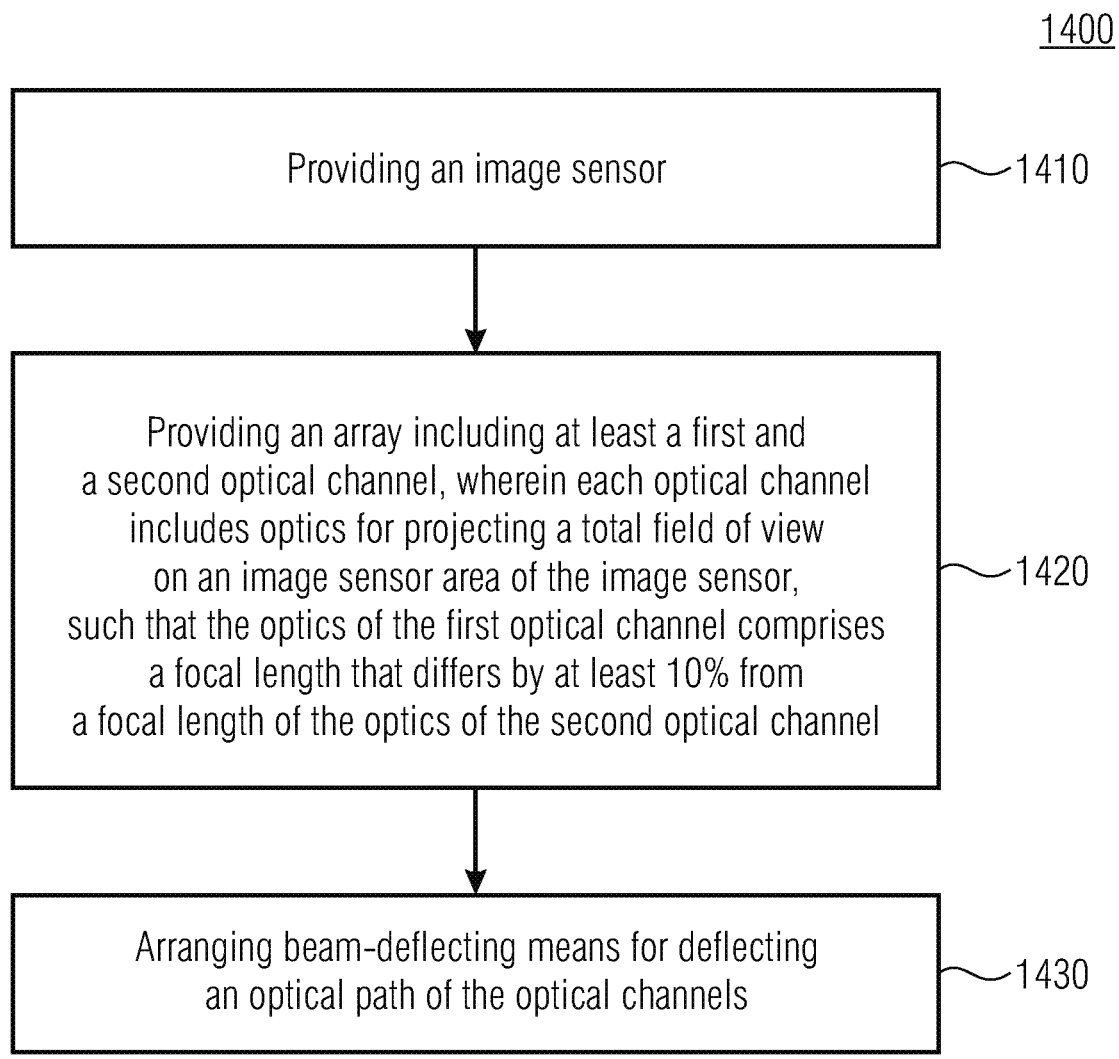
FIG. 14 a schematic illustration of a method of providing a multi-aperture imaging device according to a further embodiment.

FIG. 14 shows a schematic flow diagram of a method 1400 for providing a further multi-aperture imaging device according to a further embodiment. In a step 1410, an image sensor is provided. In a step 1420, an array including at least a first and second optical channel is provided, such that each optical channel includes optics for projecting a total field of view on an image sensor area of the image sensor and such that the optics of the first optical channel comprises a focal length that differs by at least 10% from a focal length of the optics of the second optical channel. In a step 1430, beam-deflecting means for commonly deflecting an optical path of the optical channels is arranged.

The statements made in the context of the electronic image stabilizer and a combination of the optical image stabilizer with the electronic image stabilizer, respectively, and explained for the multi-aperture imaging device 10, also apply to the other multi-aperture imaging devices described herein, in particular the multi-aperture imaging device 10" and 10'''. The different optical characteristics of the optics in combination with the common beam-deflecting means and the common array can be compensated via channel-individual electronic image stabilization, possibly by determining a reference channel that is linked with respect to the at least one other optical channel. A possibly arranged optical image stabilizer can be configured to obtain optimum or highest possible optical stabilization for a channel, such that the electronic stabilization is performed in the remaining channels. Alternatively, the optical image stabilizer can be configured to reduce a total image error across all images and the electronic image stabilizer can be configured to perform electronic stabilization in all channels. The optical image stabilizer can be configured to perform optical image stabilization such that the optical image stabilization is one of the first and second total fields of view in relation to a reference image. The electronic image stabilizer is configured to stabilize an image of a different total field of view in relation to the reference image. Here, the multi-aperture imaging device can also be configured to stabilize the reference image exclusively in an optical manner. Further, the electronic image stabilizer can be configured to perform channel-individual image stabilization in each channel according to a defined functional context that depends on the relative movements between the image sensor, the array and the beam-deflecting means as described above in the context of FIG. 5*b*.

Embodiments described herein enable multi-aperture imaging systems having a linear channel arrangement, i.e., in a single line or in multiple lines along a line extension direction, having an optical image stabilization using a single-axis translational movement between an image sensor and an imaging optic, and a single-axis rotational movement of a beam-deflecting mirror array.

Although embodiments described above have been described such that a number of four optical channels or a multitude thereof is arranged, multi-aperture imaging devices according to further embodiments may include any number of optical channels, e.g., at least two, at least three, at least four, at least ten or a higher number of optical channels may be arranged.

Although above-described embodiments have been described such that the optical image stabilizer 22 includes the actuator 36 and the actuator 42, according to further embodiments, the actuators 36 and 42 may also be configured as a mutual actuator. For example, a movement generated by the actuator may be directed on to the image sensor 12, the optical array 14 and/or the beam-deflecting means 18 by means of a force converter and/or distance converter (transmission) in order to obtain a respective movement. Alternatively or additionally, one or several components may also be moved by several actuators, e.g., as is described in connection with the multi-aperture imaging device 50.

For example, the image sensor may be configured as a complementary metal-oxide-semiconductor (CMOS) or as a technology different thereto. The optical channels of a respective array may be understood such that the same define an area in which an optical path that is directed onto a respective image sensor area is optically changed. Thus, an optical path associated with an image sensor area may travel through the optical channel of the array.

It has been pointed out above that the optical paths and/or the optical axes may be directed, starting from the beam-deflecting means, in different directions. This may be obtained by directing the optical paths, during a deflection at the beam-deflecting means and/or by the optics, in a manner that deviates from a parallelism with respect to each other. The optical paths and/or the optical axes may deviate from a parallelism before and/or without a beam-deflection. In the following, this fact is described in that the channels may be provided with a type of pre-divergence. With this pre-divergence of the optical axes, it would be possible, e.g., that not all facets inclinations of facets of the beam-deflecting means differ from each other, but that some groups of channels, e.g., have the facets with the same inclination or are directed thereto. The latter may be formed as a single piece and/or continuously merging into each other, i.e., as a facet that is assigned to this group of channels neighboring in the line extension direction. The divergence of the optical axes of these channels could then come from the divergence of these optical axes, as it is obtained by a lateral offset between optical centers of the optics of the optical channels and image sensor areas of the channels. For example, the pre-divergence could be limited to one plane. For example, the optical axes could extend in a common plane before and/or without a beam-deflection, however, extending in a divergent manner in this plane, and the facets solely causing an additional divergence in the other transversal plane, i.e., the same are all inclined in parallel to the line extension direction and differently with respect to the above-mentioned mutual plane of the optical axes, wherein, in turn, several facets may have the same inclination and/or could be mutually associated with a group of channels whose optical axes already differ, e.g., in pairs in the above-mentioned mutual plane of the optical axes before and/or without a beam-deflection. Simply put, the optics may enable a (pre-) divergence of the optical paths along a first (image) direction and the beam-deflecting means may enable a divergence of the optical paths along a second (image) direction.

For example, the above-mentioned possibly present pre-divergence may be achieved by placing the optical centers of the optics on a straight line along the line extension direction, while the centers of the image center areas are arranged to deviate from the projection of the optical centers along the normal of the plane of the image sensor areas onto points on a straight line in the image sensor plane, e.g., at points that deviate from the points on the above-mentioned straight line in the image sensor plane in a channel-individual manner along the line extension direction and/or along the direction perpendicular both to the line extension direction and also to the image sensor normal. Alternatively, a pre-divergence may be achieved by placing the centers of the image sensors on a straight line along the line extension direction, while the centers of the optics are arranged to deviate from the projection of the optical centers of the image sensors along the normal of the plane of the optical centers of the optics onto points on a straight line in the optic center plane, e.g., at points that deviate from the points on the above-mentioned straight line in the optic center plane in a channel-individual manner along the line extension direction and/or along the direction perpendicular both to the line extension direction and also to the normal of the optic center plane. It is preferred that the above-mentioned channel-individual deviation from the respective projection extends solely in the line extension direction, i.e., that the optical axes are solely located in a mutual plane and are provided with a pre-divergence. The optical centers and also the image sensor area centers are then each located on a straight line parallel to the line extension direction, however, having different intermediate distances. In contrast, a lateral offset between lenses and image sensors in a lateral direction perpendicular to the line extension direction led to an increase in the installation height. A purely in-plane offset in the line extension direction does not change the installation height, however, as a result there may possibly be fewer facets and/or the facets only comprise a tilt in an angle orientation, which simplifies the structure. Thus, e.g., neighboring optical channels may each comprise optical axes that extend in the same plane, that each squint with respect to each other, i.e., that are provided with a pre-divergence. A facet may be arranged with respect to a group of optical channels, may solely be inclined in a direction and may be parallel to the line extension direction.

Furthermore, it could be provided that some optical channels are associated to the same partial field of view, e.g., for the purpose of super resolution or to increase the resolution with which the corresponding partial field of view is scanned by means of these channels. Before a beam-deflection, the optical channel in such a group would then extend in parallel and would be deflected by a facet on a partial field of view. Advantageously, pixel images of the image sensor of a channel of a group would be located in an intermediate position between images of the pixels of the image sensor of a different channel of this group.

For example, without the purpose of super resolution, however, solely for the purpose of stereoscopy, an implementation would also be conceivable, in which a group of immediately neighboring channels in the line extension direction cover the total field of view entirely with their partial fields of view and that a further group of immediately neighboring channels entirely cover the total field of view on their part.

Thus, the above embodiments may be implemented in form of a multi-aperture imaging device and/or an imaging system including such a multi-aperture imaging device, namely with a single line channel arrangement, wherein each channel transmits a partial field of view of a total field of view and the partial fields of view partially overlap. A structure having several such multi-aperture imaging devices for stereo structures, trio structures, quartet structures, etc., for the capturing 3D images is possible. The plurality of modules may be implemented as a joined line. The joined line could use identical actuators and a mutual beam-deflecting element. One or several amplifying substrates possibly present in the optical path could extend across the entire line that may form a stereo structure, trio structure, quattro structure. Methods of super resolution may be used, wherein several channels image the same partial image areas.

The optical axes may also extend in a divergent manner without a beam-deflecting device so that fewer facets are used on the beam-deflecting unit. Then, the facets advantageously include only one angle component. The image sensor may be a single piece, may comprise only one joined pixel matrix or several discontinuous pixel matrices. The image sensor may be composed of many partial sensors, e.g., that are arranged next to each other on a circuit board.

An autofocus drive may be implemented such that the beam-deflecting element is moved synchronously with the optics or such that the same is idle.

In the following, additional embodiments and aspects of the invention will be described which can be used individually or in combination with any of the features and functionalities and details described herein.

1. Multi-aperture imaging device (10; 10'; 10"; 10'"; 20; 30; 40) comprising:
   an image sensor (12);
   an array (14) of optical channels (16a-h), wherein each optical channel (16a-h) includes optics (64a-h) for projecting at least one partial field of view (72a-d) of a total field of view (70) on an image sensor area (24a-h) of the image sensor (12); and
   beam-deflecting means (18) for deflecting an optical path (26a-h) of the optical channels (16a-h);
   wherein a first optical channel (16d) of the array (14) is configured to image a first partial field of view (72d) of a first total field of view (70a), wherein a second optical channel (16c) of the array (14) is configured to image a second partial field of view (72c) of the first total field of view (70a), and wherein a third optical channel (16e) is configured to completely image a second total field of view (70b); and
   wherein the second total field of view (70b) is an incomplete section of the first total field of view (70a);
   wherein the multi-aperture imaging device further comprises:
   image-evaluation means reading out the image sensor areas that is configured to combine and provide an image of the first partial field of view (72a) and an image of the second partial field of view (72c) to a first total image of the first total field of view (70a), and to provide a second total image of the second total field of view (70b).

2. Multi-aperture imaging device according to aspect 1, wherein a first value of an optical characteristic of the optics of the first optical channel and the optics of the second optical channel is the same within a tolerance range of at most 10%, and wherein a second value of the optical characteristic of the optics of the third optical channels deviates by at least 10% from the first value.

3. Multi-aperture imaging device according to aspect 2, wherein the optical characteristic is a focal length.

4. Multi-aperture imaging device according to one of the preceding aspects, wherein the beam-deflecting means (18) comprises a plurality of facets (46a-d), wherein the first optical channel (16d) is allocated to a first facet (46d), the second optical channel (16c) is allocated to a second facet (46c) and the third optical channel (16e) is allocated to the first (46d) or a third facet (46e).

5. Multi-aperture imaging device according to aspect 4, wherein the third optical channel (16e) is allocated to the third facet (46d);
   wherein the first, second and third facet (46a, 46b, 46e) each comprise a first and a second reflecting main side, wherein the beam-deflecting means (18) is configured to deflect, in a first rotational position of the beam-deflecting means (18), the optical channels (16a, 16b, 16e) with the first main sides in a first direction and to deflect, in a second rotational position of the beam-deflecting means (18), the optical channels (16a, 16b, 16e) with the second man sides in a second direction; and
   wherein the main sides of the first and the second facets (16a, 16b) are tilted with respect to one another at a first angle ($\delta_1$), and wherein the main sides of the third facet (46*e*) are tilted with respect to one another at a second angle ($\delta_2$).

6. Multi-aperture imaging device according to aspect 5, wherein the first angle ($\delta_1$) is smaller than the second angle ($\delta_2$) or wherein the second angle ($\delta_2$) is smaller than the first angle ($\delta_1$).

7. Multi-aperture imaging device according to one of the preceding aspects, wherein the first optical channel (16*d*) is configured to project the first partial field of view (72*d*) on a first image sensor area (24*d*) of the image sensor (12), wherein the second optical channel (16*c*) is configured to project the second partial field of view (72*c*) on a second image sensor area (24*c*) of the image sensor (12), and wherein the third optical channel (16*e*) is configured to project the second total field of view (70*b*) on a third image sensor area (24*e*).

8. Multi-aperture imaging device according to aspect 7, wherein the third image sensor area (24*e*) overlaps at least partly with the first image sensor area (24*d*).

9. Multi-aperture imaging device according to one of the preceding aspects, further comprising:
an optical image stabilizer (22) for image stabilization along a first image axis (28) by generating a first relative movement (34; 39*a*) between the image sensor (12), the array (14) and the beam-deflecting means (18), and for image stabilization along a second image axis (32) by generating a second relative movement (38; 39*b*) between the image sensor (12), the array (14) and the beam-deflecting means (18); and
an electronic image stabilizer (41) for image stabilization of the first optical channel (16*a*) of the array (14) along the first and the second image axis (28, 32).

10. Multi-aperture imaging device according to aspect 9, wherein the first relative movement (34; 39*a*) includes at least one of a translational relative movement (34) between the image sensor (12) and the array (14), a translational relative movement (39*a*) between the image sensor (12) and the beam-deflecting means (18), and a translational relative movement (39*a*) between the array (14) and the beam-deflecting means (18), and wherein the second relative movement (38; 39*b*) includes at least one of a rotational movement (38) of the beam-deflecting means (18), a translational relative movement between the image sensor (12) and the array (14), and a translational relative movement (39*b*) between the array (14) and the beam-deflecting means (18).

11. Multi-aperture imaging device according to aspect 9 or 10, wherein the electronic image stabilizer (41) is configured to stabilize the first optical channel (16*a-h*) to a first extent along the first and the second image axis (28, 32) and is further configured for image stabilization of a different optical channel (16*a-h*) of the array (14) to a second extent along the first and the second image axis (28, 32).

12. Multi-aperture imaging device according to one of aspects 9 to 11, wherein the optical image stabilizer (22) is configured to perform optical image stabilization such that the optical image stabilization is related to an image of a first one of the partial fields of view (72*a-d*), wherein the electronic image stabilizer (41) is configured to stabilize an image of a second partial field of view (72*a-d*) related to the image of the first partial field of view (72*a-d*).

13. Multi-aperture imaging device according to one of aspects 9 to 12, wherein the optical image stabilizer (22) is configured to stabilize an image of the imaged partial field of view (72*a-d*) of a reference channel of a group including the first optical channel (16*a-h*) and the second optical channel (16*a-h*), and wherein the electronic image stabilizer (41) is configured to perform image stabilization in a channel-individual manner for optical channels (16*a-h*) that differ from the reference channel, wherein the multi-aperture imaging device is configured to stabilize the reference channel exclusively in an optical manner.

14. Multi-aperture imaging device according to one of aspects 9 to 13, wherein the electronic image stabilizer (41) is configured to perform image stabilization for each optical channel (16*a-h*) in a channel-individual manner.

15. Multi-aperture imaging device according to aspect 14, wherein the electronic image stabilizer (41) is configured to perform the channel-individual electronic image stabilization in each channel according to a predetermined functional context that depends on the relative movements between the image sensor (12), the array (14) and the beam-deflecting means (18).

16. Multi-aperture imaging device according to aspect 15, wherein the functional context is a linear function.

17. Multi-aperture imaging device according to one of aspects 14 to 16, wherein the optical image stabilizer (22) is configured to provide the optical image stabilization along one of the image directions based on a rotational movement of the beam-deflecting means, wherein the functional context is an angular function that projects a rotation angle of the beam-deflecting means on an extent of the electronic image stabilization along the image direction.

18. Multi-aperture imaging device according to one of aspects 14 to 17, wherein the electronic image stabilizer (41) is configured to identify a matching feature in a first partial image of a first partial field of view (72*a-d*) and in a second image of a second partial field of view (72*a-d*), and to provide the electronic image stabilization based on a comparison of movements of the feature in the first and second image.

19. Multi-aperture imaging device according to one of aspects 14 to 18, wherein the electronic image stabilizer (41) is configured to identify a matching feature in a first partial image of a first partial field of view (72*a-d*) at a first time and at a second time, and to provide the electronic image stabilization based on a comparison of movements of the feature in the first image.

20. Multi-aperture imaging device according to one of aspects 9 to 19, wherein focal lengths of optics (64*a-d*) of the first and the second optical channels (16*a-h*) differ and a movement of the beam-deflecting means (18) results in differing changes of projections on the image sensor areas (24*a-h*), wherein the electronic image stabilizer (41) is configured to compensate differences between the different changes of the images.

21. Multi-aperture imaging device according to one of aspects 9 to 20, wherein first optics (64*a*) allocated to the first optical channel (16*a*) and second optics (64*b*) allocated to the second optical channel (16*b*) are formed in the same manner within a tolerance range of at most 10%, wherein, due to deviations in the tolerance range, image stabilization of the optical image stabilizer (22) results in differing changes of the projections on the image sensor areas (24*a*, 24*b*) effected by the first optics (64*a*) and the second optics (64*b*).

22. Multi-aperture imaging device according to one of aspects 9 to 21, wherein the optical image stabilizer (22) includes at least one actuator (36, 37, 42) and is arranged such that the same is arranged at least partly between two planes (52a, 52b) that are spanned by sides of a cuboid (55), wherein the sides of the cuboid are oriented in parallel to one another as well as to a line extension direction (35, 65, z) of the array (14) and a part of the optical path of the optical channels (16a-h) between the image sensor (12) and the optics (64a-h), and the same has a minimum volume but still includes the image sensor (12) and the array (14).

23. Multi-aperture imaging device according to aspect 22, wherein the optical image stabilizer (22) extends out of an area between the planes (52a, 52b) by at most 50%.

24. Multi-aperture imaging device according to one of aspects 9 to 23 that is configured to receive a sensor signal from a sensor and to evaluate the sensor signal with respect to information that is correlated with a relative movement between the multi-aperture imaging device and the object, and to perform control of the optical or electronic image stabilizer (22; 41) by using the information.

25. Multi-aperture imaging device (10; 10'; 10"; 10'"; 20; 30; 40) comprising:
    an image sensor (12);
    an array (14) of optical channels (16a-h), wherein each optical channel (16a-h) includes optics (64a-h) for projecting at least one partial field of view (72a-d) of a total field of view (70) on an image sensor area (24a-h) of the image sensor (12); and
    beam-deflecting means (18) for deflecting an optical path (26a-h) of the optical channels (16a-h);
    wherein a first optical channel (16d) of the array (14) is configured to image a first partial field of view (72d) of a first total field of view (70a), wherein a second optical channel (16c) of the array (14) is configured to image a second partial field of view (72c) of the first total field of view (70a), and wherein a third optical channel (16e) is configured to completely image a second total field of view (70b); and
    wherein the second total field of view (70b) is an incomplete section of the first total field of view (70a);
    wherein the multi-aperture imaging device further comprises:
    an optical image stabilizer (22) for image stabilization along a first image axis (28) by generating a first relative movement (34; 39a) between the image sensor (12), the array (14) and the beam-deflecting means (18), and for image stabilization along a second image axis (32) by generating a second relative movement (38; 39b) between the image sensor (12), the array (14) and the beam-deflecting means (18); and
    an electronic image stabilizer (41) for image stabilization of the first optical channel (16a) of the array (14) along the first and the second image axis (28, 32);
    wherein the optical image stabilizer (22) is configured to stabilize an image of the imaged partial field of view (72a-d) of a reference channel of a group including the first optical channel (16a-h) and the second optical channel (16a-h), and wherein the electronic image stabilizer (41) is configured to perform image stabilization in a channel-individual manner for optical channels (16a-h) that differ from the reference channel, wherein the multi-aperture imaging device is configured to stabilize the reference channel exclusively in an optical manner.

26. Multi-aperture imaging device (10"), comprising:
    an image sensor (12);
    an array (14) of optical channels (16a-d), wherein each optical channel (16a-d) includes optics (64a-d) for projecting a partial field of view (72a-d) of a total field of view (70a-b) on an image sensor area (24a-d) of the image sensor (12); and beam-deflecting means (18) for deflecting an optical path of the optical channels (16a-d);
    wherein a first group of optical channels is configured with at least two optical channels (16a, 16b) of the array (14) to image one partial field of view (72a, 72b) each of a first total field of view (70a), wherein a second group of optical channels is configured with at least two optical channels (16c, 16d) of the array (14) to image one partial field of view (72c, 72d) each of a second total field of view (70b); and
    wherein the second total field of view (70b) is an incomplete section of the first total field of view (70a);
    wherein the multi-aperture imaging device further comprises:
    image-evaluation means reading out the image sensor areas that is configured to combine and provide an image of the first partial field of view (72a) and an image of the second partial field of view (72c) to a first total image of the first total field of view (70a), and to provide a second total image of the second total field of view (70b).

27. Multi-aperture imaging device according to aspect 26, wherein an optical characteristic of optics (64a, 64b) of the first group of optical channels is equal to a first value within a tolerance range of at most 10%, and wherein a second value of the optical characteristic of the optics of the second group of optical channels deviates by at least 10% from the first value.

28. Multi-aperture imaging device according to aspect 27, wherein the optical characteristic is a focal length.

29. Multi-aperture imaging device according to one of aspects 26 to 28, wherein the beam-deflecting means (18) comprises a plurality of facets (46a-e), wherein each optical channel (16a, 16b) of the first group of optical channels is allocated to a facet (46a, 46b) of a first group of facets, and wherein each optical channel (16c, 16d) of the second group of optical channels is allocated to a facet (46e) of a second group of facets or a facet of the first group of facets.

30. Multi-aperture imaging device according to aspect 29, wherein each optical channel (16c, 16d) of the second group of optical channels is allocated to a facet of a second group of facets;
    wherein the facets (46a-e) of the first and second group of optical channels each comprise a first and second reflecting main side, wherein the beam-deflecting means (18) is configured to deflect, in a first rotational position of the beam-deflecting means (18), the optical channels (16a-d) with the first main sides in a first direction and to deflect, in a second rotational position of the beam-deflecting means (18), the optical channels (16a-d) with the second main sides in the second direction,
    and wherein the main sides of the first group of facets (46a, 46b) are tilted with respect to another at a first angle ($\delta_1$), and wherein the main sides of the second group of facets are tilted with respect to one another at a second angle ($\delta_2$).

31. Multi-aperture imaging device according to aspect 30, wherein the first angle ($\delta_1$) is smaller than the second angle ($\delta_2$) or wherein the second angle ($\delta_2$) is smaller than the first angle ($\delta_1$).

32. Multi-aperture imaging device according to one of aspects 26 to 31, wherein each optical channel (16a-d) of the first and second group of optical channels is configured to project the partial field of view (72a-d) on an image sensor area (24a-d) of the image sensor (12) allocated to the optical channel (16a-d).

33. Multi-aperture imaging device according to aspect 32, wherein at least one image sensor area that is allocated to an optical channel (16c, 16d) of the second group of optical channels overlaps with an image sensor area (24a, 24b) that is allocated to an optical channel (16a, 16b) of the first group of optical channels.

34. Multi-aperture imaging device according to one of aspects 26 to 33, further comprising:
    an optical image stabilizer (22) for image stabilization along a first image axis (28) by generating a first relative movement (34; 39a) between the image sensor (12), the array (14) and the beam-deflecting means (18), and for image stabilization along a second image axis (32) by generating a second relative movement (38; 39b) between the image sensor (12), the array (14) and the beam-deflecting means (18); and
    an electronic image stabilizer (41) for image stabilization of the first optical channel (16a) of the array (14) along the first and the second image axis (28, 32).

35. Multi-aperture imaging device according to aspect 34, wherein the first relative movement (34; 39a) includes at least one of a translational relative movement (34) between the image sensor (12) and the array (14), a translational relative movement (39a) between the image sensor (12) and the beam-deflecting means (18) and a translational relative movement (39a) between the array (14) and the beam-deflecting means (18), and wherein the second relative movement (38; 39b) includes at least one of a rotational movement (38) of the beam-deflecting means (18), a translational relative movement between the image sensor (12) and the array (14) and a translational relative movement (39b) between the array (14) and the beam-deflecting means (18).

36. Multi-aperture imaging device according to aspect 34 or 35, wherein the electronic image stabilizer (41) is configured to stabilize the first optical channel (16a-h) to a first extent along the first and the second image axis (28, 32) and is further configured for image stabilization of a different optical channel (16a-h) of the array (14) to a second extent along the first and the second image axis (28, 32).

37. Multi-aperture imaging device according to one of aspects 34 to 36, wherein the optical image stabilizer (22) is configured to perform optical image stabilization such that the optical image stabilization is related to an image of a first one of the partial fields of view (72a-d), wherein the electronic image stabilizer (41) is configured to stabilize an image of a second partial field of view (72a-d) related to the image of the first partial field of view (72a-d).

38. Multi-aperture imaging device according to one of aspects 34 to 37, wherein the optical image stabilizer (22) is configured to stabilize an image of the imaged partial field of view (72a-d) of a reference channel of a group including the first optical channel (16a-h) and the second optical channel (16a-h), and wherein the electronic image stabilizer (41) is configured to perform image stabilization in a channel-individual manner for optical channels (16a-h) that differ from the reference channel, wherein the multi-aperture imaging device is configured to stabilize the reference channel exclusively in an optical manner.

39. Multi-aperture imaging device according to one of aspects 34 to 38, wherein the electronic image stabilizer (41) is configured to perform image stabilization for each optical channel (16a-h) in a channel-individual manner.

40. Multi-aperture imaging device according to aspect 39, wherein the electronic image stabilizer (41) is configured to perform the channel-individual electronic image stabilization in each channel according to a predetermined functional context that depends on the relative movements between the image sensor (12), the array (14) and the beam-deflecting means (18).

41. Multi-aperture imaging device according to aspect 40, wherein the functional context is a linear function.

42. Multi-aperture imaging device according to one of aspects 39 to 41, wherein the optical image stabilizer (22) is configured to provide the optical image stabilization along one of the image directions based on a rotational movement of the beam-deflecting means, wherein the functional context is an angular function that projects a rotation angle of the beam-deflecting means (18) on an extent of the electronic image stabilization along the image direction.

43. Multi-aperture imaging device according to one of aspects 39 to 42, wherein the electronic image stabilizer (41) is configured to identify a matching feature in a first partial image of a first partial field of view (72a-d) and in a second image of a second partial field of view (72a-d), and to provide electronic image stabilization based on a comparison of movements of the feature in the first and second image.

44. Multi-aperture imaging device according to one of aspects 39 to 43, wherein the electronic image stabilizer (41) is configured to identify a matching feature in a first partial image of a first partial field of view (72a-d) at a first time and at a second time, and to provide the electronic image stabilization based on a comparison of movements of the feature in the first image.

45. Multi-aperture imaging device according to one of aspects 34 to 44, wherein focal lengths of optics (64a-d) of the first and second optical channel (16a-h) differ and a movement of the beam-deflecting means (18) results in differing changes of the projections on the image sensor areas (24a-h), wherein the electronic image stabilizer (41) is configured to compensate differences between the different changes of the images.

46. Multi-aperture imaging device according to one of aspects 34 to 45, wherein first optics (64a) allocated to the first optical channel and second optics (64b) allocated to the second optical channel (16b) are formed in the same manner within a tolerance range of at most 10%, wherein, due to deviations within the tolerance range, image stabilization of the optical image stabilizer (22) results in differing changes of the images or projections on the image sensor areas (24a, 24b) effected by the first optics (64a) and the second optics (64b).

47. Multi-aperture imaging device according to one of aspects 34 to 46, wherein the optical image stabilizer (22) includes at least one actuator (36, 37, 42) and is arranged such that the same is arranged at least partly between two planes (52a, 52b) that are spanned by sides of a cuboid (55), wherein the sides of the cuboids are oriented in parallel to one another as well as to a line extension direction (35, 65, z) of the array (14) and a part of the optical path of the optical channels (16a-h) between the image sensor (12) and the optics (64a-h), and the same has a minimum volume but still includes the image sensor (12) and the array (14).

48. Multi-aperture imaging device according to aspect 47, wherein the optical image stabilizer (22) extends out of an area between the planes (52a, 52b) by at most 50%.
49. Multi-aperture imaging device according to one of aspects 34 to 48 that is configured to receive a sensor signal from a sensor and to evaluate the sensor signal with respect to information that is correlated with a relative movement between the multi-aperture imaging device and the object, and to perform control of the optical or electronic image stabilizer (22; 41) by using the information.
50. Multi-aperture imaging device (10'''), comprising:
   an image sensor (12);
   an array (14) including at least a first and a second optical channel (16a, 16b), wherein each optical channel (16a-b) includes optics (64a, 64b) for projecting a total field of view (70a, 70b) on an image sensor area (24) of the image sensor (12); and
   beam-deflecting means (18) for commonly deflecting an optical path of the optical channels (16a-b);
   wherein the optics of the first optical channel (16a) comprises a focal length that differs by at least 10% from a focal length of the optics of the second optical channel (16b).
51. Multi-aperture imaging device according to aspect 50, further comprising:
   an optical image stabilizer (22) for image stabilization along a first image axis (28) by generating a first relative movement (34; 39a) between the image sensor (12), the array (14) and the beam-deflecting means (18) and for image stabilization along a second image axis (32) by generating a second relative movement (38; 39b) between the image sensor (12), the array (14) and the beam-deflecting means (18); and
   an electronic image stabilizer (41) for image stabilization of the first optical channel (16a) of the array (14) along the first and the second image axis (28, 32).
52. Multi-aperture imaging device according to aspect 51, wherein the electronic image stabilizer (41) is configured to stabilize the first optical channel (16a-b) to a first extent along the first and the second image axis (28, 32) and is further configured for image stabilization of the second optical channel (16a-b) to a second extent along the first and the second image axis (28, 32).
53. Multi-aperture imaging device according to aspect 51 or 52, wherein the optical image stabilizer (22) is configured to perform optical image stabilization such that the optical image stabilization is related to a reference image of one of the first and second total fields of view (70a), wherein the electronic image stabilizer (41) is configured to stabilize an image of another total field of view (70b) related to the reference image.
54. Multi-aperture imaging device according to aspect 53 that is configured to stabilize the reference image exclusively in an optical manner.
55. Multi-aperture imaging device according to one of aspects 51 to 54, wherein the electronic image stabilizer (41) is configured to perform image stabilization for each optical channel (16a-b) in a channel-individual manner.
56. Multi-aperture imaging device according to aspect 55, wherein the electronic image stabilizer (41) is configured to perform channel-individual electronic image stabilization in each channel according to a predetermined functional context that depends on the relative movements between the image sensor (12), the array (14) and the beam-deflecting means (18).
57. Multi-aperture imaging device according to aspect 55, wherein the functional context is a linear function.
58. Multi-aperture imaging device according to aspect 56 or 57, wherein the optical image stabilizer (22) is configured to provide the optical image stabilization along one of the image directions based on a rotational movement of the beam-deflecting means, wherein the functional context is an angular function projecting a rotation angle of the beam-deflecting means (18) to an extent of the electronic image stabilization along the image direction.
59. Multi-aperture imaging device according to one of aspects 51 to 58, wherein focal lengths of optics (64a-b) of the first and second optical channels (16a-b) differ and a movement of the beam-deflecting means (18) results in differing changes of the projections on the image sensor areas (24a-h), wherein the electronic image stabilizer (41) is configured to compensate differences between the different changes of the images.
60. Multi-aperture imaging device according to one of aspects 51 to 59, wherein the optical image stabilizer (22) includes at least one actuator (36, 37, 42) and is arranged such that the same is at least partly arranged between two planes (52a, 52b) that are spanned by sides of a cuboid (55), wherein the sides of the cuboid are oriented in parallel to one another as well as to a line extension direction (35, 65, z) of the array (14) and a part of the optical path of the optical channels (16a-b) between the image sensor (12) and the optics (64a-b), and the same has a minimum volume but still includes the image sensor (12) and the array (14).
61. Multi-aperture imaging device according to aspect 60, wherein the optical image stabilizer (22) extends out of an area between the planes (52a, 52b) by at most 50%.
62. Multi-aperture imaging device according to one of aspects 51 to 61 that is configured to receive a sensor signal from a sensor and to evaluate the sensor signal with respect to information that is correlated with a relative movement between the multi-aperture imaging device and the object, and to perform control of the optical or electronic image stabilizer (22; 41) by using the information.
63. Multi-aperture imaging device according to one of the preceding aspects, wherein the beam-deflecting means (18) comprises a first main side (174a) and a second main side (174b) and is configured to deflect, in a first operating state, optical paths of the optical channels (64a-h) with the first main side (174a) in a first viewing direction of the multi-aperture imaging device and to deflect, in a second operating state, the optical paths of the optical channel (64a-h) with the second main side (174b) in a second viewing direction of the multi-aperture imaging device.
64. Multi-aperture imaging device according to aspect 63, wherein the first main side (174a) and the second main side (174b) are arranged tilted with respect to one another at an angle ($\delta$, $\delta_1$, $\delta_2$) of at most 60°.
65. Multi-aperture imaging device according to aspect 63 or 64 that is configured to perform a change between the first and second operating state by a rotational movement (38), wherein, during the rotational movement, a first surface normal (51a) of the first main side and a second surface normal (51b) of the second main side have, at any time, an angle ($\gamma_1$, $\gamma_2$) of at least 10° with respect to a direction towards the image sensor (12).
66. Imaging system (60; 80) having a first and a second multi-aperture imaging device (10; 10'; 20; 30; 40)

according to one of the preceding aspects that is configured to capture a total field of view (70) at least partly in a stereoscopic manner.

67. Method of providing a multi-aperture imaging device (10; 10'; 10''; 10'''; 20; 30; 40), comprising:
providing an image sensor;
providing an array of optical channels, such that each optical channel includes optics for projecting at least one partial field of view of a total field of view on an image sensor area of the image sensor; and
arranging beam-deflecting means for deflecting an optical path of the optical channels;
such that a first optical channel of the array is configured to image a first partial field of view of a first total field of view, such that a second optical channel of the array is configured to image a second partial field of view of the first total field of view, and such that a third optical channel is configured to completely image a second total field of view; and
such that the second total field of view (70b) is an incomplete section of the first total field of view (70a); wherein the method further comprises:
providing an image-evaluation means reading out the image sensor areas such that the image-evaluation means is configured to combine and provide an image of the first partial field of view (72a) and an image of the second partial field of view (72c) to a first total image of the first total field of view (70a), and to provide a second total image of the second total field of view (70b).

68. Method of providing a multi-aperture imaging device (10''), comprising the steps of:
providing an image sensor;
providing an array of optical channels, such that each optical channel includes optics for projecting a partial field of view of a total field of view on an image sensor area of the image sensor; and
arranging beam-deflecting means for deflecting an optical path of the optical channels;
such that a first group of optical channels is configured with at least two optical channels (16a, 16b) of the array (14) to image one partial field of view (72a, 72b) each of a first total field of view (70a), wherein a second group of optical channels is configured with at least two optical channels (16c, 16d) of the array (14) to image one partial field of view (72c, 72d) each of a second total field of view (70b); and
such that the second total field of view (70b) is an incomplete section of the first total field of view (70a), wherein the method further comprises:
arranging an optical image stabilizer (22) for image stabilization along a first image axis (28) by generating a first relative movement (34; 39a) between the image sensor (12), the array (14) and the beam-deflecting means (18), and for image stabilization along a second image axis (32) by generating a second relative movement (38; 39b) between the image sensor (12), the array (14) and the beam-deflecting means (18); and
arranging an electronic image stabilizer (41) for image stabilization of the first optical channel (16a) of the array (14) along the first and the second image axis (28, 32);
such that the optical image stabilizer (22) is configured to stabilize an image of the imaged partial field of view (72a-d) of a reference channel of a group including the first optical channel (16a-h) and the second optical channel (16a-h), and such that the electronic image stabilizer (41) is configured to perform image stabilization in a channel-individual manner for optical channels (16a-h) that differ from the reference channel, such that the multi-aperture imaging device is configured to stabilize the reference channel exclusively in an optical manner.

69. Method of providing a multi-aperture imaging device (10''), comprising the steps of:
providing an image sensor;
providing an array of optical channels, such that each optical channel includes optics for projecting a partial field of view of a total field of view on an image sensor area of the image sensor; and
arranging beam-deflecting means for deflecting an optical path of the optical channels;
such that a first group of optical channels is configured with at least two optical channels (16a, 16b) of the array (14) to image one partial field of view (72a, 72b) each of a first total field of view (70a), wherein a second group of optical channels is configured with at least two optical channels (16c, 16d) of the array (14) to image one partial field of view (72c, 72d) each of a second total field of view (70b); and
such that the second total field of view (70b) is an incomplete section of the first total field of view (70a), wherein the method further comprises:
providing an image-evaluation means reading out the image sensor areas such that the image-evaluation means is configured to combine and provide an image of the first partial field of view (72a) and an image of the second partial field of view (72c) to a first total image of the first total field of view (70a), and to provide a second total image of the second total field of view (70b).

70. Method (1400) of providing a multi-aperture imaging device (10''') comprising the steps of:
providing (1410) an image sensor;
providing (1420) an array including at least a first and a second optical channel, wherein each optical channel includes optics for projecting a total field of view on an image sensor area of the image sensor; and
arranging (1430) beam-deflecting means for commonly deflecting an optical path of the optical channels;
such that the optics of the first optical channel comprises a focal length that differs by at least 10% from a focal length of the optics of the second optical channel.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A multi-aperture imaging device comprising:
an image sensor;
an array of optical channels, wherein each optical channel comprises optics for projecting at least one partial field of view of a total field of view on an image sensor area of the image sensor; and
a beam deflector for deflecting an optical path of the optical channels;
wherein a first optical channel of the array is configured to image a first partial field of view of a first total field of view, wherein a second optical channel of the array is configured to image a second partial field of view of the first total field of view, and wherein a third optical channel is configured to completely image a second total field of view; and
wherein the second total field of view is an incomplete section of the first total field of view;
wherein the multi-aperture imaging device further comprises:
an image evaluator reading out the image sensor areas that is configured to combine and provide an image of the first partial field of view and an image of the second partial field of view to a first total image of the first total field of view, and to provide a second total image of the second total field of view;
an optical image stabilizer for image stabilization along a first image axis by generating a first relative movement between the image sensor, the array and the beam deflector, and for image stabilization along a second image axis by generating a second relative movement between the image sensor, the array and the beam deflector; and
an electronic image stabilizer for image stabilization of the first optical channel of the array along the first and the second image axis.

2. The multi-aperture imaging device according to claim 1, wherein a first value of an optical characteristic of the optics of the first optical channel and the optics of the second optical channel is the same within a tolerance range of at most 10%, and wherein a second value of the optical characteristic of the optics of the third optical channels deviates by at least 10% from the first value.

3. The multi-aperture imaging device according to claim 2, wherein the optical characteristic is a focal length.

4. The multi-aperture imaging device according to claim 1, wherein the beam deflector comprises a plurality of facets, wherein the first optical channel is allocated to a first facet, the second optical channel is allocated to a second facet and the third optical channel is allocated to the first or a third facet.

5. The multi-aperture imaging device according to claim 4,
wherein the third optical channel is allocated to the third facet;
wherein the first, second and third facet each comprise a first and a second reflecting main side, wherein the beam deflector is configured to deflect, in a first rotational position of the beam deflector, the optical channels with the first main sides in a first direction and to deflect, in a second rotational position of the beam deflector, the optical channels with the second man sides in a second direction; and
wherein the main sides of the first and the second facets are tilted with respect to one another at a first angle, and wherein the main sides of the third facet are tilted with respect to one another at a second angle.

6. The multi-aperture imaging device according to claim 5, wherein the first angle is smaller than the second angle or wherein the second angle is smaller than the first angle.

7. The multi-aperture imaging device according to claim 1, wherein the first optical channel is configured to project the first partial field of view on a first image sensor area of the image sensor, wherein the second optical channel is configured to project the second partial field of view on a second image sensor area of the image sensor, and wherein the third optical channel is configured to project the second total field of view on a third image sensor area.

8. The multi-aperture imaging device according to claim 7, wherein the third image sensor area overlaps at least partly with the first image sensor area.

9. The multi-aperture imaging device according to claim 1, wherein the first relative movement comprises at least one of a translational relative movement between the image sensor and the array, a translational relative movement between the image sensor and the beam deflector, and a translational relative movement between the array and the beam deflector, and wherein the second relative movement comprises at least one of a rotational movement of the beam deflector, a translational relative movement between the image sensor and the array, and a translational relative movement between the array and the beam deflector.

10. The multi-aperture imaging device according to claim 1, wherein the electronic image stabilizer is configured to stabilize the first optical channel to a first extent along the first and the second image axis and is further configured for image stabilization of a different optical channel of the array to a second extent along the first and the second image axis.

11. The multi-aperture imaging device according to claim 1, wherein the optical image stabilizer is configured to perform optical image stabilization such that the optical image stabilization is related to an image of a first one of the partial fields of view, wherein the electronic image stabilizer is configured to stabilize an image of a second partial field of view related to the image of the first partial field of view.

12. The multi-aperture imaging device according to claim 1, wherein the optical image stabilizer is configured to stabilize an image of the imaged partial field of view of a reference channel of a group including the first optical channel and the second optical channel, and wherein the electronic image stabilizer is configured to perform image stabilization in a channel-individual manner for optical channels that differ from the reference channel, wherein the multi-aperture imaging device is configured to stabilize the reference channel exclusively in an optical manner.

13. The multi-aperture imaging device according to claim 1, wherein the electronic image stabilizer is configured to perform image stabilization for each optical channel in a channel-individual manner.

14. The multi-aperture imaging device according to claim 13, wherein the electronic image stabilizer is configured to perform the channel-individual electronic image stabilization in each channel according to a predetermined functional context that depends on the relative movements between the image sensor, the array and the beam deflector.

15. The multi-aperture imaging device according to claim 14, wherein the functional context is a linear function.

16. The multi-aperture imaging device according to claim 13, wherein the optical image stabilizer is configured to provide the optical image stabilization along one of the image directions based on a rotational movement of the beam deflector, wherein the functional context is an angular function that projects a rotation angle of the beam deflector on an extent of the electronic image stabilization along the image direction.

17. The multi-aperture imaging device according to claim 13, wherein the electronic image stabilizer is configured to identify a matching feature in a first partial image of a first partial field of view and in a second image of a second partial field of view, and to provide the electronic image stabilization based on a comparison of movements of the feature in the first and second image.

18. The multi-aperture imaging device according to claim 13, wherein the electronic image stabilizer is configured to identify a matching feature in a first partial image of a first partial field of view at a first time and at a second time, and to provide the electronic image stabilization based on a comparison of movements of the feature in the first image.

19. The multi-aperture imaging device according to claim 1, wherein focal lengths of optics of the first and the second optical channels differ and a movement of the beam deflector results in differing changes of projections on the image sensor areas, wherein the electronic image stabilizer is configured to compensate differences between the different changes of the images.

20. The multi-aperture imaging device according to claim 1, wherein first optics allocated to the first optical channel and second optics allocated to the second optical channel are formed in the same manner within a tolerance range of at most 10%, wherein, due to deviations in the tolerance range, image stabilization of the optical image stabilizer results in differing changes of the projections on the image sensor areas effected by the first optics and the second optics.

21. The multi-aperture imaging device according to claim 1, wherein the optical image stabilizer comprises at least one actuator and is arranged such that the same is arranged at least partly between two planes that are spanned by sides of a cuboid, wherein the sides of the cuboid are oriented in parallel to one another as well as to a line extension direction of the array and a part of the optical path of the optical channels between the image sensor and the optics, and the same comprises a minimum volume but still comprises the image sensor and the array.

22. The multi-aperture imaging device according to claim 21, wherein the optical image stabilizer extends out of an area between the planes by at most 50%.

23. The multi-aperture imaging device according to claim 1 that is configured to receive a sensor signal from a sensor and to evaluate the sensor signal with respect to information that is correlated with a relative movement between the multi-aperture imaging device and an object, and to perform control of the optical or electronic image stabilizer by using the information.

24. The multi-aperture imaging device according to claim 1, wherein the beam deflector comprises a first main side and a second main side and is configured to deflect, in a first operating state, optical paths of the optical channels with the first main side in a first viewing direction of the multi-aperture imaging device and to deflect, in a second operating state, the optical paths of the optical channel with the second main side in a second viewing direction of the multi-aperture imaging device.

25. The multi-aperture imaging device according to claim 24, wherein the first main side and the second main side are arranged tilted with respect to one another at an angle of at most 60°.

26. The multi-aperture imaging device according to claim 24 that is configured to perform a change between the first and second operating state by a rotational movement, wherein, during the rotational movement, a first surface normal of the first main side and a second surface normal of the second main side comprise, at any time, an angle of at least 10° with respect to a direction towards the image sensor.

27. An imaging system comprising a first and a second multi-aperture imaging device according to claim 1 that is configured to capture a total field of view at least partly in a stereoscopic manner.

28. A multi-aperture imaging device comprising:
an image sensor;
an array of optical channels, wherein each optical channel comprises optics for projecting at least one partial field of view of a total field of view on an image sensor area of the image sensor; and
a beam deflector for deflecting an optical path of the optical channels;
wherein a first optical channel of the array is configured to image a first partial field of view of a first total field of view, wherein a second optical channel of the array is configured to image a second partial field of view of the first total field of view, and wherein a third optical channel is configured to completely image a second total field of view; and
wherein the second total field of view is an incomplete section of the first total field of view;
wherein the multi-aperture imaging device further comprises:
an optical image stabilizer for image stabilization along a first image axis by generating a first relative movement between the image sensor, the array and the beam deflector, and for image stabilization along a second image axis by generating a second relative movement between the image sensor, the array and the beam deflector; and
an electronic image stabilizer for image stabilization of the first optical channel of the array along the first and the second image axis;
wherein the optical image stabilizer is configured to stabilize an image of the imaged partial field of view of a reference channel of a group including the first optical channel and the second optical channel, and wherein the electronic image stabilizer is configured to perform image stabilization in a channel-individual manner for optical channels that differ from the reference channel, wherein the multi-aperture imaging device is configured to stabilize the reference channel exclusively in an optical manner.

29. A multi-aperture imaging device comprising:
an image sensor;
an array of optical channels, wherein each optical channel comprises optics for projecting a partial field of view of a total field of view on an image sensor area of the image sensor; and
a beam deflector for deflecting an optical path of the optical channels;
wherein a first group of optical channels is configured with at least two optical channels of the array to image one partial field of view each of a first total field of view, wherein a second group of optical channels is configured with at least two optical channels of the array to image one partial field of view each of a second total field of view; and
wherein the second total field of view is an incomplete section of the first total field of view;

wherein the multi-aperture imaging device further comprises:
an image-evaluator reading out the image sensor areas that is configured to combine and provide images of the first group of optical channels to a first total image of the first total field of view, and to provide a second total image of the second total field of view;
an optical image stabilizer for image stabilization along a first image axis by generating a first relative movement between the image sensor, the array and the beam deflector, and for image stabilization along a second image axis by generating a second relative movement between the image sensor, the array and the beam deflector; and
an electronic image stabilizer for image stabilization of the first optical channel of the array along the first and the second image axis.

30. The multi-aperture imaging device according to claim 29, wherein an optical characteristic of optics of the first group of optical channels is equal to a first value within a tolerance range of at most 10%, and wherein a second value of the optical characteristic of the optics of the second group of optical channels deviates by at least 10% from the first value.

31. The multi-aperture imaging device according to claim 30, wherein the optical characteristic is a focal length.

32. The multi-aperture imaging device according to claim 29, wherein the beam deflector comprises a plurality of facets, wherein each optical channel of the first group of optical channels is allocated to a facet of a first group of facets, and wherein each optical channel of the second group of optical channels is allocated to a facet of a second group of facets or a facet of the first group of facets.

33. The multi-aperture imaging device according to claim 32,
wherein each optical channel of the second group of optical channels is allocated to a facet of a second group of facets;
wherein the facets of the first and second group of optical channels each comprise a first and second reflecting main side, wherein the beam deflector is configured to deflect, in a first rotational position of the beam deflector, the optical channels with the first main sides in a first direction and to deflect, in a second rotational position of the beam deflector, the optical channels with the second main sides in the second direction,
and wherein the main sides of the first group of facets are tilted with respect to another at a first angle, and wherein the main sides of the second group of facets are tilted with respect to one another at a second angle.

34. The multi-aperture imaging device according to claim 33, wherein the first angle is smaller than the second angle or wherein the second angle is smaller than the first angle.

35. The multi-aperture imaging device according to claim 29, wherein each optical channel of the first and second group of optical channels is configured to project the partial field of view on an image sensor area of the image sensor allocated to the optical channel.

36. The multi-aperture imaging device according to claim 35, wherein at least one image sensor area that is allocated to an optical channel of the second group of optical channels overlaps with an image sensor area that is allocated to an optical channel of the first group of optical channels.

37. The multi-aperture imaging device according to claim 29, wherein the first relative movement comprises at least one of a translational relative movement between the image sensor and the array, a translational relative movement between the image sensor and the beam deflector and a translational relative movement between the array and the beam deflector, and wherein the second relative movement comprises at least one of a rotational movement of the beam deflector, a translational relative movement between the image sensor and the array and a translational relative movement between the array and the beam deflector.

38. The multi-aperture imaging device according to claim 29, wherein the electronic image stabilizer is configured to stabilize the first optical channel to a first extent along the first and the second image axis and is further configured for image stabilization of a different optical channel of the array to a second extent along the first and the second image axis.

39. The multi-aperture imaging device according to claim 29, wherein the optical image stabilizer is configured to perform optical image stabilization such that the optical image stabilization is related to an image of a first one of the partial fields of view, wherein the electronic image stabilizer is configured to stabilize an image of a second partial field of view related to the image of the first partial field of view.

40. The multi-aperture imaging device according to claim 29, wherein the optical image stabilizer is configured to stabilize an image of the imaged partial field of view of a reference channel of a group including the first optical channel and the second optical channel, and wherein the electronic image stabilizer is configured to perform image stabilization in a channel-individual manner for optical channels that differ from the reference channel, wherein the multi-aperture imaging device is configured to stabilize the reference channel exclusively in an optical manner.

41. The multi-aperture imaging device according to claim 29, wherein the electronic image stabilizer is configured to perform image stabilization for each optical channel in a channel-individual manner.

42. The multi-aperture imaging device according to claim 41, wherein the electronic image stabilizer is configured to perform the channel-individual electronic image stabilization in each channel according to a predetermined functional context that depends on the relative movements between the image sensor, the array and the beam deflector.

43. The multi-aperture imaging device according to claim 42, wherein the functional context is a linear function.

44. The multi-aperture imaging device according to claim 41, wherein the optical image stabilizer is configured to provide the optical image stabilization along one of the image directions based on a rotational movement of the beam deflector, wherein the functional context is an angular function that projects a rotation angle of the beam deflector on an extent of the electronic image stabilization along the image direction.

45. The multi-aperture imaging device according to claim 41, wherein the electronic image stabilizer is configured to identify a matching feature in a first partial image of a first partial field of view and in a second image of a second partial field of view, and to provide electronic image stabilization based on a comparison of movements of the feature in the first and second image.

46. The multi-aperture imaging device according to claim 41, wherein the electronic image stabilizer is configured to identify a matching feature in a first partial image of a first partial field of view at a first time and at a second time, and to provide the electronic image stabilization based on a comparison of movements of the feature in the first image.

47. The multi-aperture imaging device according to claim 29, wherein focal lengths of optics of the first and second optical channel differ and a movement of the beam deflector results in differing changes of the projections on the image sensor areas, wherein the electronic image stabilizer is configured to compensate differences between the different changes of the images.

48. The multi-aperture imaging device according to claim 29, wherein first optics allocated to the first optical channel and second optics allocated to the second optical channel are formed in the same manner within a tolerance range of at most 10%, wherein, due to deviations within the tolerance range, image stabilization of the optical image stabilizer results in differing changes of the images or projections on the image sensor areas effected by the first optics and the second optics.

49. The multi-aperture imaging device according to claim 29, wherein the optical image stabilizer comprises at least one actuator and is arranged such that the same is arranged at least partly between two planes that are spanned by sides of a cuboid, wherein the sides of the cuboids are oriented in parallel to one another as well as to a line extension direction of the array and a part of the optical path of the optical channels between the image sensor and the optics, and the same comprises a minimum volume but still comprises the image sensor and the array.

50. The multi-aperture imaging device according to claim 49, wherein the optical image stabilizer extends out of an area between the planes by at most 50%.

51. The multi-aperture imaging device according to claim 29 that is configured to receive a sensor signal from a sensor and to evaluate the sensor signal with respect to information that is correlated with a relative movement between the multi-aperture imaging device and an object, and to perform control of the optical or electronic image stabilizer by using the information.

52. A multi-aperture imaging device comprising:
an image sensor;
an array including at least a first and a second optical channel, wherein each optical channel comprises optics for projecting a total field of view on an image sensor area of the image sensor; and
a beam deflector for commonly deflecting an optical path of the optical channels;
wherein the optics of the first optical channel comprises a focal length that differs by at least 10% from a focal length of the optics of the second optical channel;
wherein the multi-aperture imaging device further comprises:
an optical image stabilizer for image stabilization along a first image axis by generating a first relative movement between the image sensor, the array and the beam deflector and for image stabilization along a second image axis by generating a second relative movement between the image sensor, the array and the beam deflector; and
an electronic image stabilizer for image stabilization of the first optical channel of the array along the first and the second image axis;
wherein the optical image stabilizer is configured to perform optical image stabilization such that the optical image stabilization is related to a reference image of one of the first and second total fields of view, wherein the electronic image stabilizer is configured to stabilize an image of another total field of view related to the reference image.

53. The multi-aperture imaging device according to claim 52, wherein the electronic image stabilizer is configured to stabilize the first optical channel to a first extent along the first and the second image axis and is further configured for image stabilization of the second optical channel to a second extent along the first and the second image axis.

54. The multi-aperture imaging device according to claim 52 that is configured to stabilize the reference image exclusively in an optical manner.

55. The multi-aperture imaging device according to claim 52, wherein the electronic image stabilizer is configured to perform image stabilization for each optical channel in a channel-individual manner.

56. The multi-aperture imaging device according to claim 55, wherein the electronic image stabilizer is configured to perform channel-individual electronic image stabilization in each channel according to a predetermined functional context that depends on the relative movements between the image sensor, the array and the beam deflector.

57. The multi-aperture imaging device according to claim 56, wherein the functional context is a linear function.

58. The multi-aperture imaging device according to claim 55, wherein the optical image stabilizer is configured to provide the optical image stabilization along one of the image directions based on a rotational movement of the beam deflector, wherein the functional context is an angular function projecting a rotation angle of the beam deflector to an extent of the electronic image stabilization along the image direction.

59. The multi-aperture imaging device according to claim 52, wherein focal lengths of optics of the first and second optical channels differ and a movement of the beam deflector results in differing changes of the projections on the image sensor areas, wherein the electronic image stabilizer is configured to compensate differences between the different changes of the images.

60. The multi-aperture imaging device according to claim 52, wherein the optical image stabilizer comprises at least one actuator and is arranged such that the same is at least partly arranged between two planes that are spanned by sides of a cuboid, wherein the sides of the cuboid are oriented in parallel to one another as well as to a line extension direction of the array and a part of the optical path of the optical channels between the image sensor and the optics, and the same comprises a minimum volume but still comprises the image sensor and the array.

61. The multi-aperture imaging device according to claim 60, wherein the optical image stabilizer extends out of an area between the planes by at most 50%.

62. The multi-aperture imaging device according to claim 52 that is configured to receive a sensor signal from a sensor and to evaluate the sensor signal with respect to information that is correlated with a relative movement between the multi-aperture imaging device and an object, and to perform control of the optical or electronic image stabilizer by using the information.

63. A method of providing a multi-aperture imaging device, comprising:
providing an image sensor;
providing an array of optical channels, such that each optical channel comprises optics for projecting at least one partial field of view of a total field of view on an image sensor area of the image sensor; and
arranging a beam deflector for deflecting an optical path of the optical channels;
such that a first optical channel of the array is configured to image a first partial field of view of a first total field of view, such that a second optical channel of the array is configured to image a second partial field of view of the first total field of view, and such that a third optical channel is configured to completely image a second total field of view; and such that the second total field of view is an incomplete section of the first total field of view; wherein the method further comprises:

providing an image evaluator reading out the image sensor areas such that the image evaluator is configured to combine and provide an image of the first partial field of view and an image of the second partial field of view to a first total image of the first total field of view, and to provide a second total image of the second total field of view;

arranging an optical image stabilizer for image stabilization along a first image axis by generating a first relative movement between the image sensor, the array and the beam deflector, and for image stabilization along a second image axis by generating a second relative movement between the image sensor, the array and the beam deflector; and providing an electronic image stabilizer for image stabilization of the first optical channel of the array along the first and the second image axis.

64. A method of providing a multi-aperture imaging device, comprising:

providing an image sensor;

providing an array of optical channels, such that each optical channel comprises optics for projecting a partial field of view of a total field of view on an image sensor area of the image sensor; and arranging a beam deflector for deflecting an optical path of the optical channels;

such that a first group of optical channels is configured with at least two optical channels of the array to image one partial field of view each of a first total field of view, wherein a second group of optical channels is configured with at least two optical channels of the array to image one partial field of view each of a second total field of view; and such that the second total field of view is an incomplete section of the first total field of view, wherein the method further comprises:

arranging an optical image stabilizer for image stabilization along a first image axis by generating a first relative movement between the image sensor, the array and the beam deflector, and for image stabilization along a second image axis by generating a second relative movement between the image sensor, the array and the beam deflector; and arranging an electronic image stabilizer for image stabilization of the first optical channel of the array along the first and the second image axis;

such that the optical image stabilizer is configured to stabilize an image of the imaged partial field of view of a reference channel of a group including the first optical channel and the second optical channel, and such that the electronic image stabilizer is configured to perform image stabilization in a channel-individual manner for optical channels that differ from the reference channel, such that the multi-aperture imaging device is configured to stabilize the reference channel exclusively in an optical manner.

65. A method of providing a multi-aperture imaging device, comprising:

providing an image sensor;

providing an array of optical channels, such that each optical channel comprises optics for projecting a partial field of view of a total field of view on an image sensor area of the image sensor; and arranging a beam deflector for deflecting an optical path of the optical channels;

such that a first group of optical channels is configured with at least two optical channels of the array to image one partial field of view each of a first total field of view, wherein a second group of optical channels is configured with at least two optical channels of the array to image one partial field of view each of a second total field of view; and such that the second total field of view is an incomplete section of the first total field of view, wherein the method further comprises:

providing an image evaluator reading out the image sensor areas such that the image evaluator is configured to combine and provide images of the first group of optical channels to a first total image of the first total field of view, and to provide a second total image of the second total field of view;

arranging an optical image stabilizer for image stabilization along a first image axis by generating a first relative movement between the image sensor, the array and the beam deflector, and for image stabilization along a second image axis by generating a second relative movement between the image sensor, the array and the beam deflector; and providing an electronic image stabilizer for image stabilization of the first optical channel of the array along the first and the second image axis.

66. A method of providing a multi-aperture imaging device, comprising:

providing an image sensor;

providing an array including at least a first and a second optical channel, wherein each optical channel comprises optics for projecting a total field of view on an image sensor area of the image sensor; and arranging a beam deflector for commonly deflecting an optical path of the optical channels;

such that the optics of the first optical channel comprises a focal length that differs by at least 10% from a focal length of the optics of the second optical channel, wherein the method further comprises:

arranging an optical image stabilizer for image stabilization along a first image axis by generating a first relative movement between the image sensor, the array and the beam deflector, and for image stabilization along a second image axis by generating a second relative movement between the image sensor, the array and the beam deflector; and providing an electronic image stabilizer for image stabilization of the first optical channel of the array along the first and the second image axis;

such that the optical image stabilizer is configured to perform optical image stabilization such that the optical image stabilization is related to a reference image of one of the first and second total fields of view, so that the electronic image stabilizer is configured to stabilize an image of another total field of view related to the reference image.

* * * * *